(12) United States Patent
Wynne et al.

(10) Patent No.: US 12,409,638 B2
(45) Date of Patent: Sep. 9, 2025

(54) HIGH-SHRINK, HIGH-STRENGTH PACKAGING ARTICLE EXHIBITING DIRECTIONAL TEAR

(71) Applicant: Cryovac, LLC, Charlotte, NC (US)

(72) Inventors: Ashley Wynne, Woodruff, SC (US);
Kelly Ahlgren, Greenville, SC (US);
Miles Johnston, Tega Cay, SC (US);
Rebecca Higginbotham, Greenville, SC (US)

(73) Assignee: Cryovac, Inc., Charlotte, NC (US)

( * ) Notice: Subject to any disclaimer, the term of this patent is extended or adjusted under 35 U.S.C. 154(b) by 958 days.

(21) Appl. No.: 16/604,580

(22) PCT Filed: Apr. 12, 2018

(86) PCT No.: PCT/US2018/027315
§ 371 (c)(1),
(2) Date: Oct. 11, 2019

(87) PCT Pub. No.: WO2018/191506
PCT Pub. Date: Oct. 18, 2018

(65) Prior Publication Data
US 2021/0114356 A1   Apr. 22, 2021

Related U.S. Application Data

(60) Provisional application No. 62/485,122, filed on Apr. 13, 2017.

(51) Int. Cl.
*B32B 27/08* (2006.01)
*B32B 1/00* (2006.01)
(Continued)

(52) U.S. Cl.
CPC .............. *B32B 27/08* (2013.01); *B32B 1/00* (2013.01); *B32B 27/16* (2013.01); *B32B 27/20* (2013.01);
(Continued)

(58) Field of Classification Search
CPC ........... B32B 27/08; B32B 1/00; B32B 27/16; B32B 27/20; B32B 27/304; B32B 27/306;
(Continued)

(56) References Cited

U.S. PATENT DOCUMENTS 4,064,296 A   12/1977   Bornstein et al.
4,113,139 A   9/1978    Berry et al.
(Continued)

FOREIGN PATENT DOCUMENTS

EP   913338    5/1999
EP   1731304   12/2006
(Continued)

*Primary Examiner* — James C Yager
(74) *Attorney, Agent, or Firm* — Jason R. Womer

(57) ABSTRACT

A packaging article comprises a heat-shrinkable film having a total free shrink at 85° C. of at least 90%. The film has an inside seal layer, an outside polyester layer, and an inner oxygen barrier layer. A portion of the film contains a crosslinked polymer network. At least one film layer comprises an incompatible polymer blend. The article has tear initiators. The package provides post-shrink, full-length tear from the tear initiators to the opposite edge of the article, for easy product removal. The film has an instrumented impact energy-to-break of at least 0.65 J/mil, and/or an instrumented impact peak load strength of at least 66 Newtons/mil, and/or Truburst strength of at least 8 psi/mil.

20 Claims, 23 Drawing Sheets

(51) Int. Cl.
  *B32B 27/16* (2006.01)
  *B32B 27/20* (2006.01)
  *B32B 27/30* (2006.01)
  *B32B 27/32* (2006.01)
  *B32B 27/34* (2006.01)
  *B32B 27/36* (2006.01)
  *B65D 75/00* (2006.01)
  *B65D 75/26* (2006.01)
  *B65D 75/58* (2006.01)

(52) U.S. Cl.
  CPC ......... *B32B 27/304* (2013.01); *B32B 27/306* (2013.01); *B32B 27/32* (2013.01); *B32B 27/34* (2013.01); *B32B 27/36* (2013.01); *B65D 75/002* (2013.01); *B65D 75/26* (2013.01); *B65D 75/5805* (2013.01); *B32B 2270/00* (2013.01); *B32B 2272/00* (2013.01); *B32B 2307/31* (2013.01); *B32B 2307/558* (2013.01); *B32B 2307/582* (2013.01); *B32B 2307/72* (2013.01); *B32B 2307/7244* (2013.01); *B32B 2307/736* (2013.01); *B32B 2439/70* (2013.01); *B65D 2275/00* (2013.01)

(58) Field of Classification Search
  CPC ......... B32B 27/32; B32B 27/34; B32B 27/36; B32B 2270/00; B32B 2272/00; B32B 2307/31; B32B 2307/558; B32B 2307/582; B32B 2307/72; B32B 2307/7244; B32B 2307/736; B32B 2439/70; B32B 2262/101; B32B 2264/10; B32B 2264/101; B32B 2264/102; B32B 2264/104; B32B 2264/108; B32B 2274/00; B32B 2307/30; B32B 2307/732; B32B 27/302; B32B 7/12; B32B 27/40; B32B 1/08; B32B 7/028; B29C 48/00; B65D 65/40; B65D 2275/00; B65D 75/002; B65D 75/26; B65D 75/5805
  See application file for complete search history.

(56) References Cited

U.S. PATENT DOCUMENTS

| | | |
|---|---|---|
| 4,278,738 A | 7/1981 | Brax et al. |
| 4,734,324 A * | 3/1988 | Hill .................. B32B 27/32 |
| | | 428/317.9 |
| 4,755,403 A | 7/1988 | Ferguson |
| 4,768,411 A | 9/1988 | Su |
| 4,861,414 A | 8/1989 | Vogan |
| 4,905,452 A | 3/1990 | Vogan |
| 5,055,328 A | 10/1991 | Evert et al. |
| 5,078,509 A * | 1/1992 | Center .................. B65D 33/18 |
| | | 383/107 |
| 5,079,051 A | 1/1992 | Garland et al. |
| 5,206,075 A | 4/1993 | Hodgson |
| 5,241,031 A | 8/1993 | Mehta |
| 5,272,236 A | 12/1993 | Lai et al. |
| 5,278,272 A | 1/1994 | Lai et al. |
| 5,491,019 A | 2/1996 | Kuo |
| 5,540,646 A | 7/1996 | Williams et al. |
| 5,545,419 A | 8/1996 | Brady et al. |
| 5,834,077 A | 11/1998 | Babrowicz |
| 6,270,819 B1 | 8/2001 | Wiese |
| 6,296,886 B1 | 10/2001 | Depoorter et al. |
| 6,383,537 B1 | 5/2002 | Brady et al. |
| 6,499,274 B1 | 12/2002 | McDonald et al. |
| 6,663,905 B1 | 12/2003 | Ennis et al. |
| 6,699,549 B1 | 3/2004 | Jeyama et al. |
| 6,764,729 B2 | 7/2004 | Ramesh et al. |
| 6,790,468 B1 | 9/2004 | Mize et al. |
| 6,970,468 B2 | 11/2005 | Doidge et al. |
| 7,207,157 B2 | 4/2007 | Wolf et al. |
| 7,687,123 B2 | 3/2010 | Broadus et al. |
| 7,744,806 B2 | 6/2010 | Broadus et al. |
| 8,273,447 B2 | 9/2012 | Forloni et al. |
| 10,239,296 B2 | 3/2019 | Fusarpoli et al. |
| 2008/0292821 A1 | 11/2008 | Dayrit et al. |
| 2009/0116768 A1 | 5/2009 | Huerta et al. |
| 2010/0086711 A1 | 4/2010 | Kaneta et al. |
| 2010/0330372 A1 | 12/2010 | Ludtke et al. |
| 2017/0144416 A1 | 5/2017 | Broadus et al. |
| 2017/0198123 A1 | 7/2017 | Zanaboni et al. |

FOREIGN PATENT DOCUMENTS

| | | |
|---|---|---|
| WO | 90/03414 | 4/1990 |
| WO | 93/03093 | 2/1993 |
| WO | 9944823 | 9/1999 |
| WO | 2010059887 | 5/2010 |
| WO | 2015066570 | 5/2015 |
| WO | 2015107127 | 7/2015 |
| WO | 2015181333 | 12/2015 |
| WO | 2018134224 | 7/2018 |

* cited by examiner (COMPARATIVE)

HIGH-SHRINK, HIGH-STRENGTH PACKAGING ARTICLE EXHIBITING DIRECTIONAL TEAR

BACKGROUND

The present invention pertains to heat-shrinkable packaging articles that are easy to open, particularly packaging articles for food packaging end use.

Heat-shrinkable packaging articles have been used for the packaging of a variety of products. Food, particularly meat, has been vacuum packaged in such packaging articles. These heat-shrinkable packaging articles have become tougher and easier to seal, with improved oxygen and moisture barrier properties, and having higher total free shrink at lower temperatures.

Recently there has been the introduction of bags made from a heat-shrinkable film having an inside polyolefin-based heat seal layer in combination with an outside polyester layer, an internal oxygen-barrier layer comprising polyvinylidene chloride (PVDC), and one or more internal layers comprising polyamide. The outside polyester layer provides clarity, high gloss, and high tensile strength. The internal polyamide layer(s) provide the film with a high level of toughness and strength. However, polyamide is expensive relative to polyolefin.

For the packaging of relatively low abuse meat products, such as boneless meat products, it would be desirable to eliminate most or all of the polyamide from the film structure, while retaining the optical advantages from the outer polyester layer. It would also be desirable to provide a package with a high level of heat-shrinkability, while also providing the package with post-shrink, full-length easy open via full length manual tear in the machine direction, all with a film strong enough to withstand the abuse of processing, shipping, and handling, in a thin film to minimize cost and minimize the flow of waste into the environment.

SUMMARY

It has been surprisingly discovered that in addition to the presence of an incompatible polymer blend, the presence of a crosslinked polymer network is required in order to provide a high shrink, high energy-to-break film with the characteristic of a post-shrink, full-length manual tear in the machine direction down the full length of the package. In an embodiment, the crosslinked polymer network is formed by irradiating a portion of the film.

A first aspect is directed to a packaging article-comprising a multilayer, heat-shrinkable film comprising a first film portion laminated to a second film portion. The first film portion comprises a first layer which is a first outer layer and which is an inside layer of the packaging article and which serves as a heat-seal layer. The first film portion comprises a cross-linked polymer network. The second film portion comprises: (b)(i) a second layer which is a second outer layer and which comprises polyester, the second outer layer being an outside layer of the packaging article, and (b)(ii) a third layer which is an oxygen barrier layer comprising at least one member selected from the group consisting of polyvinylidene chloride, saponified ethylene/vinyl acetate copolymer, polyamide (particularly polyamide MXD6, polyamide 6I/6T, and/or polyamide 6), polyester, polypropylene, ethylene homopolymer, polyethylene naphthalate, polytrimethylene terephthalate, liquid crystal polymer, and $O_2$-scavenger. The third layer is between the first layer and the second layer. The multilayer, heat-shrinkable film further comprises an ethylene/alpha-olefin plastomer having peak melt point of less than 90° C. The plastomer may be present in the first film portion or the second film portion. The plastomer is present in the multilayer, heat-shrinkable film in an amount of at least 3 wt %, based on total film weight. The multilayer, heat-shrinkable film further comprises an incompatible polymer blend comprising at least one member selected from the group consisting of: (c)(i) a blend of from 90 to 30 weight percent ethylene homopolymer and/or ethylene/alpha-olefin copolymer with from 10 to 70 weight percent ethylene/unsaturated ester copolymer having an unsaturated ester content of at least 10 weight percent; (c)(ii) a blend of ionomer resin with ethylene/unsaturated ester copolymer, and/or polybutylene, and/or propylene homopolymer and/or propylene copolymer; (c)(iii) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, and anhydride-modified ethylene/alpha-olefin copolymer; (c)(iv) a blend of from 10 to 75 weight percent ethylene/unsaturated ester copolymer with from 90 to 15 weight percent polypropylene and/or propylene/ethylene copolymer, and/or polybutylene, and/or modified ethylene/alpha-olefin copolymer, and/or styrene homopolymer, and/or styrene/butadiene copolymer; (c)(v) a blend of ethylene/norbornene copolymer with ethylene/unsaturated ester copolymer and/or polypropylene and/or polybutylene; (c) (vi) a blend of from 90 to 15 weight percent ethylene/alpha-olefin copolymer with from 10 to 75 weight percent polypropylene and/or polybutylene and/or ethylene/norbornene; (c)(vii) a blend of from 90 to 25 weight percent homogeneous propylene homopolymer and/or homogeneous propylene copolymer with from 10 to 75 weight percent homogeneous ethylene/alpha-olefin copolymer and/or ethylene/unsaturated ester copolymer; (c)(viii) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer; (c)(ix) a blend of polyamide with polystyrene and/or ethylene/alpha-olefin copolymer and/or ethylene/vinyl acetate copolymer and/or styrene/butadiene copolymer, and (c)(x) a blend of polyamide 6 and polyamide 6I6T. The incompatible polymer blend may be present in the first film portion and/or the second film portion. The incompatible polymer blend is present in the multilayer, heat-shrinkable film in an amount of at least 10 wt %, on a total film weight basis. The inside layer of the packaging article is heat sealed to itself at a heat seal. The packaging article has a first side and a second side, with the packaging article having a skirt or header outward of the heat seal. The skirt or header comprises an article edge and a pair of tear initiators. Each pair of tear initiators has a first tear initiator and a second tear initiator. The first tear initiator of the pair is in the first side of the article, and the second tear initiator of the pair is in the second side of the article. The article is capable of having a manually-initiated, manually-propagated first tear in the first side of the article, and a manually-initiated and manually-propagated second tear in the second side of the article. The first tear and the second tear are capable of being propagated in a machine direction from the pair of first and second tear initiators, with each tear being propagated in the machine direction through the heat seal and down the length of the article, or across the article, with each tear being capable of being manually propagated in the machine direction through and to an opposite article edge, so that upon using the multilayer film to make a packaged product by placing a product inside the article with the article being sealed closed around the product so that a package is formed, and thereafter shrinking the film around the product, the resulting package can be manually opened, and the product readily removed from the package, by manually initiating machine-direction tears from the first and second tear initiators, with the tears being manually propagated through the seal and to the opposite edge of the article. The multilayer film has a total free shrink at 85° C. of at least 90% measured in accordance with ASTM D2732. In an embodiment, the multilayer, heat-shrinkable film has (i) an instrumented impact energy-to-break of at least 0.65 J/mil, measured in accordance with ASTM D3763, and/or (ii) and an instrumented impact peak load strength of at least 66 Newtons/mil, measured in accordance with ASTM D3763, and/or (iii) a packaging article made by sealing the film to itself exhibits a Truburst strength of at least 8 psi.

In an embodiment of the first aspect, the plastomer is present in the seal layer.

In an embodiment of the first aspect, the plastomer is present in a core layer in the first film portion. In an embodiment of the first aspect, the core layer in the first film portion comprises the incompatible polymer blend.

In an embodiment, the polyester in the second outer layer makes up from 2 to 20 wt % based on total film weight, and the oxygen barrier layer comprises polyvinylidene chloride and the oxygen barrier layer makes up from 2 to 20 wt % based on total film weight, and the film further comprises an ethylene-based polymer having a peak melting point ≥95° C. and at least one ethylene/unsaturated ester copolymer. The ethylene-based polymer makes up from 30 to 80 wt %, based on total film weight, and the ethylene/unsaturated ester making up from 10 to 55 wt %, based on total film weight.

In an embodiment, the polyester in the second outer layer makes up from 2 to 10 wt % based on total film weight, and the polyvinylidene chloride in the oxygen barrier layer makes up from 5 to 15 wt % based on total film weight. The film further comprises an ethylene-based polymer having a peak melting point ≥95° C. and at least one ethylene/unsaturated ester copolymer. The ethylene-based polymer makes up from 40 to 70 wt %, based on total film weight, and the ethylene/unsaturated ester makes up from 25 to 45 wt %, based on total film weight.

In an embodiment, the polyester in the second outer layer makes up from 4 to 8 wt % based on total film weight, and the polyvinylidene chloride in the oxygen barrier layer makes up from 5 to 15 wt % based on total film weight. The film further comprises an ethylene-based polymer having a peak melting point ≥95° C. and at least one ethylene/unsaturated ester copolymer. The ethylene-based polymer makes up from 45 to 65 wt %, based on total film weight, and the ethylene/unsaturated ester makes up from 30 to 40 wt %, based on total film weight. The film does not comprise polyamide.

In an embodiment of the first aspect, the incompatible polymer blend further comprises an ethylene/unsaturated ester copolymer having an ester content of at least 12 wt %, based on weight of ethylene/unsaturated ester copolymer.

In an embodiment of the first aspect in which the incompatible polymer blend comprises blend (c)(i), the incompatible polymer blend further comprises the plastomer, with the ethylene homopolymer and/or ethylene/α-olefin copolymer being present in the incompatible polymer blend in an amount at least twice the weight percent of the plastomer in the blend, based on total blend weight. In a further embodiment of the first aspect in which the incompatible polymer blend comprises blend (c)(i), the ethylene homopolymer and/or ethylene/α-olefin copolymer is present in the incompatible polymer blend in an amount of from 40 to 75 wt % based on blend weight, the plastomer is present in the incompatible polymer blend in an amount of from 5 to 30 wt % based on blend weight, and the ethylene/unsaturated ester is present in the incompatible polymer blend in an amount of from 10 to 50 wt % based on blend weight. In a further embodiment of the first aspect in which the incompatible polymer blend comprises blend (c)(i), the ethylene homopolymer and/or ethylene/α-olefin copolymer is present in the incompatible polymer blend in an amount of from 45 to 70 wt % based on blend weight, the plastomer is present in the incompatible polymer blend in an amount of from 8 to 25 wt % based on blend weight, and the ethylene/unsaturated ester is present in the incompatible polymer blend in an amount of from 20 to 40 wt % based on blend weight. In a further embodiment of the first aspect in which the incompatible polymer blend comprises blend (c)(i), the ethylene homopolymer and/or ethylene/α-olefin copolymer is present in the incompatible polymer blend in an amount of from 50 to 60 wt % based on blend weight, the plastomer is present in the incompatible polymer blend in an amount of from 10 to 20 wt % based on blend weight, and the ethylene/unsaturated ester is present in the incompatible polymer blend in an amount of from 25 to 35 wt % based on blend weight.

In an embodiment of the first aspect, the multilayer film contains the incompatible polymer blend in an amount of from 20 to 95 weight percent, based on the weight of the multilayer film.

In an embodiment of the first aspect, the multilayer film contains the incompatible polymer blend in an amount of from 30 to 70 wt %, based on the weight of the multilayer film.

In an embodiment of the first aspect, the oxygen barrier layer comprises polyvinylidene chloride.

In an embodiment of the first aspect, the film has a total thickness, before shrinking, of from 0.7 mil to 3.5 mils. In an embodiment of the first aspect, the film has a total thickness, before shrinking, of from 1 mil to 3 mils. In an embodiment of the first aspect, the film has a total thickness, before shrinking, of from 1.3 mils to 2 mils. In an embodiment of the first aspect, the film has a total thickness, before shrinking, of from 1.5 mil to 1.8 mils.

In an embodiment of the first aspect, the polyester in the second outer layer comprises at least one member selected from the group consisting of polyethylene terephthalate homopolymer, polyethylene terephthalate copolymer, polybutylene terephthalate homopolymer, polybutylene terephthalate copolymer, polynaphthalene terephthalate homopolymer, polynaphthalene terephthalate copolymer, polyethylene furanoate homopolymer, and polyethylene furanoate copolymer, and amorphous polyester.

In an embodiment of the first aspect, the polyester in the second outer layer has a melting point of from 80° C. to 270° C., or from 240° C. to 270° C., or from 240° C. to 275° C.

In an embodiment of the first aspect, the multilayer film further comprises a tie layer between oxygen barrier layer and the outside layer, the tie layer comprising at least one member selected from the group consisting of anhydride-functional polyolefin, anhydride-functional ethylene/unsaturated acid copolymer, anhydride-functional olefin/unsaturated ester copolymer, cyclic olefin copolymer, acrylate-based polymer, polyurethane, and styrene-based polymer. In an embodiment, the tie layer comprises an anhydride-functional ethylene/vinyl acetate copolymer, anhydride-functional ethylene/methyl acrylate copolymer, ethylene/norbornene copolymer, ethylene/tetracyclododecene copolymer, ethylene/methyl acrylate copolymer, ethylene/ethyl acrylate copolymer, ethylene/butyl acrylate copolymer, styrene/maleic anhydride copolymer, anhydride-functional styrene-butadiene block copolymer, anhydride-functional styrene-ethylene-butylene-styrene copolymer, anhydride-functional styrene-butadiene-styrene copolymer, anhydride functional styrene-isoprene-styrene copolymer, anhydride-functional styrene-ethylene-butadiene-styrene copolymer, and anhydride-functional grafted styrene-(ethylene-propylene rubber)-styrene, and polystyrene-poly(ethylene-propylene)-polystyrene copolymer.

In an embodiment, the crosslinked polymer network is formed by irradiating the first film portion at a level of from 30 to 120 kGy.

In an embodiment of the first aspect, the multilayer film exhibits a post-shrink specular gloss at 60 degrees of at least 110 gloss units, measured in accordance with ASTM D2457-13. In an embodiment, the film exhibits a specular gloss at 60 degrees of at least 120 gloss units, or at least 130 gloss units, or from 120 to 160, or from 130 to 155 gloss units, or from 135 to 150 gloss units.

In an embodiment of the first aspect, the multilayer film exhibits a total free shrink at 85° C. of at least 95%, measured in accordance with ASTM D2732.

In an embodiment of the first aspect, the ethylene/alpha-olefin plastomer has a melt index ≤1.1 dg/min.

In an embodiment, the plastomer has a peak melting point ≤88° C., or ≤85° C., or ≤82° C., or ≤80° C. In an embodiment, the plastomer has a peak melting point of from 45° C. to or 90° C., or from 50° C. to 85° C., or from 55° C. to 85° C., or from 45° C. to 80° C.

In an embodiment, the ethylene/alpha-olefin plastomer has a density ≤0.908 g/cm$^3$, or ≤0.905 g/cm$^3$, or ≤0.902 g/cm$^3$, or ≤0.900 g/cm$^3$, or ≤0.895 g/cm$^3$, or ≤0.890 g/cm$^3$, or ≤0.886 g/cm$^3$, or from 0.857 to 0.908 g/cm$^3$, or from 0.86 to 0.905 g/cm$^3$, or from 0.87 to 0.903 g/cm$^3$, or from 0.875 to 0.902 g/cm$^3$, or from 0.88 to 0.900 g/cm$^3$, or from 0.88 to 0.895 g/cm$^3$, or from 0.88 to 0.89 g/cm$^3$.

In an embodiment of the first aspect, the multilayer film an instrumented impact energy-to-break of at least 0.70 J/mil measured in accordance with ASTM D3763, and the plastomer has a melt index ≤1.1 grams/10 min, measured in accordance with ASTM D1238.

In an embodiment of the first aspect, the plastomer is present in the multilayer film in an amount of at least 3 wt %, on a total film weight basis; or at least 4 wt %, or at least 5 wt %, or from 3 to 25 wt %, or from 4 to 12 wt %, or from 5 to 8 wt %, on a total film weight basis.

In an embodiment of the first aspect, the multilayer film exhibits a total free shrink at 85° C. of at least 100%, measured in accordance with ASTM D2732; in another embodiment, the multilayer film exhibits a total free shrink at 85° C. of at least 105%, measured in accordance with ASTM D2732-14.

In an embodiment of the first aspect, the header or skirt further comprises at least one grip assister for assisting grip of the multilayer film during manual tearing.

In an embodiment of the first aspect, the grip assister has a hanging chad therein.

In. an embodiment of the first aspect, the first tear initiator is aligned over the second tear initiator, and the skirt further comprise a first grip assister between the pair of tear initiators and a first end of the skirt, and a second grip assister between the pair of tear initiators and a second end of the skirt. In an embodiment, the first and second grip assisters each have a hanging chad therein.

In an embodiment of the first aspect, a portion of the skirt or header on the first side of the article is heat-set, and a corresponding portion of the skirt or header on the second side of the article is also heat-set. In an embodiment, the heat-set portion of the first and second sides of the article comprises a perimeter seal of the inside layer of the film to itself.

In an embodiment of the first aspect, the packaging article is an end-seal bag and the first and second tear initiators are present in the bag skirt.

In an embodiment of the first aspect, the packaging article is a side-seal bag having a folded bottom, a first side seal, a second side seal, and an open top.

In an embodiment of the first aspect, the packaging article is a pouch having a bottom seal, a first side seal, and a second side seal.

In an embodiment of the first aspect, the packaging article is a form-fill-seal packaging article having a fin seal running the length of the package and first and second end seals, with the form-fill-seal packaging article enclosing a product therein.

In an embodiment of the first aspect, the packaging article has a patch adhered thereto, the patch comprising a patch film.

In an embodiment of the first aspect, the crosslinked polymer network has been strained by solid state orientation.

In an embodiment of the first aspect, the multilayer film comprises polyamide in an amount of from 0.1 to 10 wt %, based on total film weight; or less than 10 wt %, or 1 to 9 wt %, or 2 to 8 wt %, or 3 to 6 wt %, based on total film weight.

In an embodiment of the first aspect, the multilayer film does not comprise polyamide.

A second aspect is directed to a packaging article according to the first aspect, except that in place of the multilayer film having an instrumented impact energy-to-break of at least 0.65 J/mil, the multilayer film has an instrumented impact peak load strength of at least 66 Newtons/mil, measured in accordance with ASTM D3763. The packaging article of the second aspect may be in accordance with any one or more embodiments set forth above for the first aspect, and/or any one or more embodiments set forth below for the third aspect.

In an embodiment of the second aspect, the multilayer film has both an instrumented impact peak load strength of at least 66 Newtons/mil, and an instrumented impact energy-to-break of at least 0.65 J/mil, measured in accordance with ASTM D3763.

In an embodiment of the second aspect, the multilayer film has both an instrumented impact peak load strength of at least 66 Newtons/mil, and the packaging article has a Truburst strength of at least 8 psi/mil, measured in accordance with ASTM D3786.

In an embodiment of the second aspect, the multilayer film has both an instrumented impact peak load strength of at least 66 Newtons/mil, and an instrumented impact energy-to-break of at least 0.65 J/mil, measured in accordance with ASTM D3763, and the packaging article has a Truburst strength of at least 8 psi/mil, measured in accordance with ASTM D3786.

In an embodiment of the second aspect, the instrumented impact peak load strength of the multilayer film is at least 70 Newtons/mil; in another embodiment, the instrumented impact peak load strength of the multilayer film is at least 75 Newtons/mil, or at least 77 Newtons/mil, or at least 80 Newtons/mil.

A third aspect is directed to a packaging article according to the first aspect, except that in place of the multilayer film having an instrumented impact energy-to-break of at least 0.65 J/mil, the packaging article has a Truburst strength of at least 8 psi/mil, measured in accordance with ASTM D3786. The packaging article of the second aspect may be in accordance with any of the embodiments set forth above for the first aspect and/or for the second aspect.

In an embodiment of the third aspect, the packaging article has a Truburst strength of at least 8 psi/mil, measured in accordance with ASTM D3786, and the multilayer film has an instrumented impact energy-to-break of at least 0.65 J/mil, measured in accordance with ASTM D3763.

In an embodiment of the third aspect, the packaging article has a Truburst strength of at least 8 psi/mil, measured in accordance with ASTM D3786, and the multilayer film has an instrumented impact peak load strength of at least 66 Newtons/mil, measured in accordance with ASTM D3763.

In an embodiment of the third aspect, the packaging article has a Truburst strength of at least 8 psi/mil, and the multilayer film has both an instrumented impact peak load strength of at least 66 Newtons/mil, measured in accordance with ASTM D3763, and an instrumented impact energy-to-break of at least 0.65 J/mil, measured in accordance with ASTM D3763.

In an embodiment of the third aspect, the packaging article has a Truburst strength of at least 9 psi/mil, or at least 10 psi/mil.

A fourth aspect is directed to a process for making a multilayer, heat-shrinkable film that can be converted into a heat-shrinkable packaging article exhibiting post-shrink full-length tear in a machine direction. The process comprises: A) extruding a first film portion comprising a first layer which is a first outer layer and which is to serve as an inside layer of the packaging article and which is to serve as a heat-seal layer; B) quenching the first film portion; C) irradiating the first film portion so that a crosslinked polymer network is formed in the first film portion; D) extrusion-coating a second film portion onto the first film portion after the first film portion has been irradiated, the extrusion-coating resulting in a laminate of the first and second film portions, the second film portion comprising: (d)(i) a second layer which is a second outer layer and which comprises polyester, the second outer layer being to serve as an outside layer of the packaging article, and (d)(ii) a third layer which is an oxygen barrier layer comprising at least one member selected from the group consisting of polyvinylidene chloride, saponified ethylene/vinyl acetate copolymer, polyamide, polyester, polypropylene, ethylene homopolymer, polyethylene naphthalate, polytrimethylene terephthalate, liquid crystal polymer, and $O_2$-scavenger, the third layer being between the first layer and the second layer; E) reheating the laminate to a temperature of from 88° C. to 100° C.; F) biaxially orienting the laminate in the solid state, resulting in the multilayer, heat-shrinkable film. The first film portion and/or the second film portion are provided with at least one layer comprising an incompatible polymer blend comprising at least one member selected from the group consisting of: (i) a blend of from 90 to 30 wt % ethylene homopolymer and/or ethylene/alpha-olefin copolymer with from 10 to 70 wt % ethylene/unsaturated ester copolymer having an unsaturated ester content of at least 10 wt %, (ii) a blend of ionomer resin with ethylene/unsaturated ester copolymer, and/or polybutylene, and/or propylene homopolymer and/or propylene copolymer, (iii) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, and anhydride-modified ethylene/alpha-olefin copolymer, (iv) a blend of from 10 to 75 wt % ethylene/unsaturated ester copolymer with from 90 to 15 wt % polypropylene and/or propylene/ethylene copolymer, and/or polybutylene, and/or modified ethylene/alpha-olefin copolymer, and/or styrene homopolymer, and/or styrene/butadiene copolymer, (v) a blend of ethylene/norbornene copolymer with ethylene/unsaturated ester copolymer and/or polypropylene and/or polybutylene, (vi) a blend of from 90 to 15 wt % ethylene/alpha-olefin copolymer with from 10 to 75 wt % polypropylene and/or polybutylene and/or ethylene/norbornene, (vii) a blend of from 90 to 25 wt % homogeneous propylene homopolymer and/or homogeneous propylene copolymer with from 10 to 75 wt % homogeneous ethylene/alpha-olefin copolymer and/or ethylene/unsaturated ester copolymer, (viii) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer, (ix) a blend of polyamide with polystyrene and/or ethylene/alpha-olefin copolymer and/or ethylene/vinyl acetate copolymer and/or styrene/butadiene copolymer, and (x) a blend of polyamide 6 and polyamide 6I6T. The incompatible polymer blend is present in the laminate in an amount of at least 10 wt %, on a total film weight basis. The first film portion and/or the second film portion comprises a plastomer having peak melt point of less than 90° C. The plastomer is present in the multilayer, heat-shrinkable film in an amount of at least 3 wt %, based on total film weight. The multilayer film has a total free shrink at 85° C. of at least 90% measured in accordance with ASTM D2732. In a first embodiment, the film has an instrumented impact energy-to-break of at least 0.65 J/mil, measured in accordance with ASTM D3763. In a second embodiment, the film has an instrumented impact peak load strength of at least 66 Newtons/mil, measured in accordance with ASTM D3763. In a third embodiment, the film is sealed to itself to make a packaging article (end seal bag, side seal bag, L-seal bag, pouch, backseamed bag with fin or lap seal, etc), the packaging article having a Truburst strength of at least 8 psi/mil, measured in accordance with ASTM D3786.

The process of the fourth aspect can be carried out to make any of the films (and packaging articles) described in any of the aspects herein, including any embodiment of any of the first three aspects of the invention. More particularly, the fourth aspect can be carried out to make any of the films and packaging articles in accordance with the first aspect of the invention, any of the films and packaging articles in accordance with the second aspect of the invention, or any of the films and packaging articles in accordance with the third aspect of the invention.

In an embodiment, the film portion is irradiated to a level of from 30 to 120 kGy.

In an embodiment, the oxygen barrier layer comprises polyvinylidene chloride.

In an embodiment, the first film portion is extruded from an annular extrusion die as a tubing and the second film portion is extruded over the tubing from an annular extrusion coating die, and the laminate is a tubular laminate.

In an embodiment, the biaxial orientation in the solid state is carried out by passing the tubular laminate over a trapped bubble while drawing the tubular laminate in the machine direction.

In an embodiment, the first film portion is extruded from a first flat die as a sheet and the second film portion is extruded from a second flat die as a coating over the sheet and the laminate is a flat laminate.

In an embodiment, the biaxial orientation in the solid state is carried out by drawing the flat laminate in a tenter frame.

In an embodiment, the laminate is biaxially oriented to a total orientation of from 10× to 16×.

DETAILED DESCRIPTION

Figure 1A:
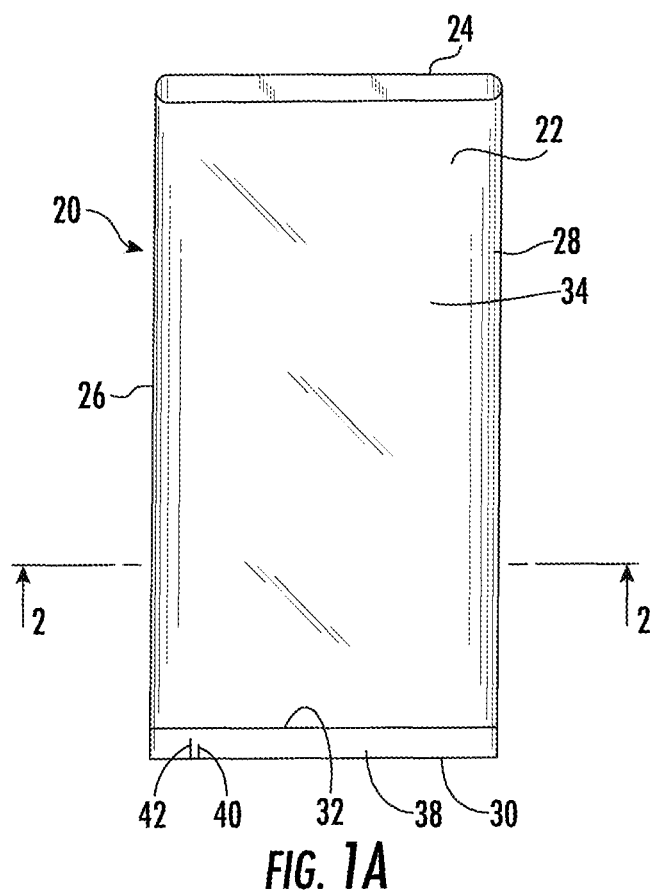
FIG. 1A is a schematic of a heat-shrinkable, end-seal bag in lay-flat configuration.

As used herein, the term "film" is inclusive of plastic web, regardless of whether it is film or sheet. The film can have a total thickness, before shrinking, of 0.25 mm or less, or a thickness of from 0.5 to 10 mils, or from 0.7 to 5 mils, or from 0.8 to 4 mils, or from 1 to 3 mils, or from 1.2 to 2.5 mils, or from 1.4 to 2 mils. Alternatively, the film can have a thickness, before shrinking, of from 0.7 to 2.5 mils, or from 0.7 to 2.2 mils, or from 0.7 to 1.7 mils.

As used herein, the term "laminated" is used with reference to two film portions which are affixed to one another by coextrusion, extrusion coating, heat lamination, adhesive lamination, corona treatment, or any other means for fastening a principal surface of a first film to a principal surface of a second film.

As used herein, the phrase "film portion" is used with reference to one or more layers of a multilayer film, but less than all the layers of the multilayer film. For example, in the extrusion-coated film structure "A/B//C/D/E," wherein each letter represents a film layer and "I" represents a boundary between coextruded layers and "II" represents the boundary between the substrate portion (A/B, in this example) and the coating portion ("C/D/E" in this example), the substrate portion can be designated as a first film portion and the coating portion can be designated as a second film portion. The coextrusion of the various layers, as well as the extrusion coating of the two film portions, results in heat lamination of the layers to one another.

As used herein, the phrase "machine direction" refers to the direction in which the film emerges from the die, i.e., the direction the extrudate is forwarded during the film production process. The phrase "machine direction" corresponds with "longitudinal direction". Machine direction and longitudinal direction are abbreviated as "MD" and "LD", respectfully. However, as used herein, the phrase "machine direction" includes not only the direction along a film that corresponds with the direction the film traveled as it passed over idler rollers in the film production process, it also includes directions that deviate up to 44 degrees from the direction the film traveled as it passed over idler rollers in the production process.

As used herein, the phrase "transverse direction" refers to a direction perpendicular to the machine direction. Transverse direction is abbreviated as "TD". The transverse direction also includes directions that deviate up to 44 degrees from the direction the film traveled as it passed over idler rollers in the production process.

As used herein, the phrases "inner layer" and "internal layer" refer to any layer, of a multilayer film, having both of its principal surfaces directly adhered to another layer of the film.

As used herein, the phrase "outer layer" refers to any film layer having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer," also referred to as the "inside heat seal/product contact layer," refers to the outer layer, of a multilayer film packaging a product, which is closest to the product, relative to the other layers of the multilayer film. The package may be formed by sealing the multilayer film to itself or another component of the package. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the other layers of the multilayer film. The phrase "outside layer" also is used with reference to the outermost layer of a plurality of concentrically arranged layers coextruded through an annular die.

As used herein, the term "adhered" is inclusive of films which are directly adhered to one another using a heat-seal, heat lamination, or other means, as well as film layers adhered to one another using an adhesive between the two films. As used herein, the phrase "directly adhered", as applied to film layers, is defined as adhesion of the subject layer to the object layer, without a tie layer, adhesive, or other layer therebetween. In contrast, as used herein, the word "between", as applied to a film layer being between two other specified film layers, includes both direct adherence of the subject layer to the two other specified layers it is between, as well as including layers "indirectly adhered" to one another, i.e., with one or more additional layers between the subject layer and one or both of the other specified layers.

As used herein, the phrases "seal layer", "sealing layer", "heat seal layer", and "sealant layer", refer to an outer layer, or layers, involved in the sealing of the film to itself, another layer of the same or another film, and/or another article which is not a film.

As used herein, the term "heat-seal," and the phrase "heat-sealing," refer to any seal of a first region of a film surface to a second region of a film surface, wherein the seal is formed by heating the regions to at least their respective seal initiation temperatures. Heat-sealing is the process of joining two or more thermoplastic films or sheets by heating areas in contact with each other to the temperature at which fusion occurs, usually aided by pressure. The heating can be performed by any one or more of a wide variety of manners, such as using a heated bar, hot wire, hot air, infrared radiation, ultraviolet radiation, electron beam, ultrasonic, and melt-bead. A heat seal is usually a relatively narrow seal (e.g., 0.02 inch to 1 inch wide) across a film. One particular heat sealing means is a heat seal made using an impulse sealer, which uses a combination of heat and pressure to form the seal, with the heating means providing a brief pulse of heat while pressure is being applied to the film by a seal bar or seal wire, followed by rapid cooling of the bar or wire.

Sealant layers employed in the packaging arts have included the genus of thermoplastic polymer, which includes thermoplastic polyolefin, polyamide, polyester, polyvinyl chloride, and ionomer resin. Preferred polymers for the sealant layer include homogeneous ethylene/alpha-olefin copolymer, heterogeneous ethylene/alpha-olefin copolymer, ethylene homopolymer, ethylene/vinyl acetate copolymer, and ionomer resin.

In some embodiments, the seal layer can comprise a polyolefin, particularly an ethylene/alpha-olefin copolymer and/or an ionomer resin. For example, the seal layer can contain a polyolefin having a density of from 0.88 g/cc to 0.917 g/cc, or from 0.90 g/cc to 0.917 g/cc. More particularly, the seal layer can comprise at least one member selected from the group consisting of very low density polyethylene and homogeneous ethylene/alpha-olefin copolymer. Very low density polyethylene is a species of heterogeneous ethylene/alpha-olefin copolymer. The heterogeneous ethylene/alpha-olefin (e.g., very low density polyethylene) can have a density of from 0.900 to 0.917 $g/cm^3$. The homogeneous ethylene/alpha-olefin copolymer in the seal layer can have a density of from 0.880 $g/cm^3$ to 0.910 $g/cm^3$, or from 0.880 $g/cm^3$ to 0.917 $g/cm^3$. Homogeneous ethylene/alpha-olefin copolymers useful in the seal layer include metallocene-catalyzed ethylene/alpha-olefin copolymers having a density of from 0.917 $g/cm^3$ or less, as well as a very low density polyethylene having a density of 0.912 $g/cm^3$, these polymers providing excellent optics. Plastomer-type metallocene sealants with densities less than 0.910 $g/cm^3$ also provided excellent optics.

The multilayer heat-shrinkable film may optionally comprise a barrier layer. As used herein, the term "barrier", and the phrase "barrier layer", as applied to films and/or film layers, are used with reference to the ability of a film or film layer to serve as a barrier to one or more gases. The barrier layer may control at least 95% of the oxygen transmission rate, i.e., no other layer of the film affects the oxygen transmission rate more than 5% relative to the layer which serves as the oxygen barrier layer. Oxygen Transmission Rate is evaluated at 23° C. and 0% relative humidity, in accordance with o ASTM D3985, which is hereby incorporated, in its entirety, by reference thereto. The phrase "oxygen transmission rate" ("OTR") is the amount of oxygen in cubic centimeters ($cm^3$) which will pass through a 100 square inches of film in 24 hours at 0% relative humidity and at 23° C. The thickness (gauge) of the film has a direct relationship on the oxygen transmission rate.

When referred to as an "oxygen barrier layer," the film containing such layer may allow gaseous oxygen to transmit therethrough at a rate of less than 500 $cm^3/m^2/day$ (also referred to as 500 $cm^3/m^2$ day atm, or 500 $cm^3/m^2$ day atm 23° C., or 500 $cm^3/m^2$ day atm 23° C. @100% relative humidity), or less than 100 $cm^3/m^2/day$, or less than 50 $cm^3/m^2/day$, or less than 25 $cm^3/m^2/day$, or from 0 to 20 $cm^3/m^2$ day, or from 0 to 15 $cm^3/m^2$ day, or from 0 to 12 $cm^3/m^2$ day, or from 0 to 10 $cm^3/m^2$ day atm.

In the packaging art, oxygen (i.e., gaseous $O_2$) barrier layers can comprise, for example, at least one member selected from the group consisting of hydrolyzed ethylene/vinyl acetate copolymer (designated by the abbreviations "EVOH" and "HEVA", and also referred to as "saponified ethylene/vinyl acetate copolymer" and "ethylene/vinyl alcohol copolymer"), polyvinylidene chloride, amorphous polyamide, polyamide MXD6 (particularly MXD6/MXDI copolymer), polyester, polyacrylonitrile, polyalkylene carbonate, polyethylene naphthalate, etc., as known to those of skill in the art. In an embodiment, the thermoplastic oxygen barrier may be a blend of polyamides, such as a blend of about 85 wt % of a polyamide selected from the group consisting of nylon 4,6 (polytetramethylene adipamide), nylon 6 (polycaprolactam), nylon 6,6 (polyhexamethylene adipamide), nylon 6,9 (polyhexamethylene nonanediamide), nylon 6,10 (polyhexamethylene sebacamide), nylon 6,12 (polyhexamethylene dodecanediamide), nylon 6/12 copolymer (polycaprolactam/dodecanediamide), nylon 6,6/6 copolymer (polyhexamethylene adipamide/caprolactam), nylon 11 (polyundecanolactam), nylon 12 (polyauryllactam) or blends thereof, and about 15 wt % of an amorphous polyamide.

As used herein, the phrase "tie layer" refers to any internal layer having the primary purpose of adhering two layers to one another. Tie layers can comprise any polymer having a polar group grafted thereon. Such polymers adhere to both nonpolar polymers including polyolefin, as well as polar polymers including polyamide and ethylene/vinyl alcohol copolymer.

Tie layers may comprise at least one member selected from the group consisting of polyolefin, anhydride-modified polyolefin, ethylene/unsaturated ester copolymer, anhydride-modified ethylene/unsaturated ester copolymer, ethylene/unsaturated acid copolymer, and polyurethane. More specifically, tie layers may comprise at least one member selected from the group consisting of homogeneous ethylene/alpha-olefin copolymer, ethylene/vinyl acetate copolymer, anhydride-modified ethylene/vinyl acetate copolymer, ethylene/acrylic acid copolymer, and ethylene/methyl acrylate copolymer, anhydride-modified linear low density polyethylene, anhydride-modified low density polyethylene, anhydride-modified polypropylene, anhydride-modified ethylene/methyl acrylate copolymer, and anhydride-modified ethylene/butyl acrylate copolymer As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. As used herein, the term "modified" refers to a chemical derivative, e.g. one having any form of anhydride functionality, such as anhydride of maleic acid, crotonic acid, citraconic acid, itaconic acid, fumaric acid, etc., regardless of whether grafted onto a polymer, copolymerized with a polymer, or blended with one or more polymers, and is also inclusive of derivatives of such functionalities, such as acids, esters, and metal salts derived therefrom. As used herein, the phrase "anhydride-containing polymer" and "anhydride-modified polymer," refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the term "adhesive" refers to a polymeric material serving a primary purpose or function of adhering two surfaces to one another. The adhesive can be used to laminate two films together to make a laminate of the two films, or to laminate a film surface to a surface of a non-film component of a package (e.g., foam tray), or in place of a heat seal to bond a portion of a film surface to (i) itself (e.g., to make an end-seal bag, side-seal bag, etc) or (ii) a portion of a surface of another film (e.g., to make a pouch from two separate pieces of film), or (iii) a portion of a surface of a non-film component of a package (e.g., as a lidstock adhered to the flange portion of a tray, etc). The adhesive may be a polyurethane based adhesive, acrylic-based adhesive, or other known adhesive, including any one or more of the various polymers disclosed herein for use as a tie layer.

As used herein, the term "core", and the phrase "core layer", as applied to multilayer films, refer to any internal layer having a function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability. The film may have one or more core layers containing the incompatible polymer blend providing the film with the post-shrink, full-length, machine-direction tear property allowing the package to be manually torn open and the product readily removed therefrom. The incompatible polymer blend may comprise a plastomer as all or part of one of the incompatible polymer components, or in addition to the polymers which are incompatible with respect to each other. The one or more core layers may be in the first film portion which comprises the crosslinked polymer network, or may be present in the second film portion which does not comprise a crosslinked polymer network, or a first core layer may be present in the first film portion comprising the crosslinked polymer network with the second core layer being in the second film portion which does not comprise crosslinked polymer network.

As used herein, the phrase "packaging article" is inclusive end-seal bags, side-seal bags, L-seal bags, U-seal bags (also referred to as "pouches"), gusseted bags, backseamed tubings, and seamless casings. Packaging articles containing a film have the film sealed to itself or another element of the packaging article. The packaging article can be closed (e.g., by sealing) after the product is inserted therein. With bags, pouches, and casings, upon sealing the article closed the product is surrounded by the film from which the packaging article is made, with the combination of the product surrounded by the closed packaging article being herein referred to as a packaged product.

As used herein, packaging articles have two "sides". Generally, a "side" of a packaging article corresponds with half of the article. For example, an end-seal bag is a lay-flat bag and has two sides (in this case two lay-flat sides), with each side corresponding with a lay-flat side of the seamless tubing from which the end-seal bag is made. Each lay-flat side of a seamless tubing is bounded by the creases formed as the tubing is collapsed into its lay-flat configuration between nip rollers. Each side of an end-seal bag is bounded by the bag top edge, the bag bottom edge, and the two tubing creases running the length of the bag. Likewise, a side-seal bag also has two sides, with each side also being a lay-flat side, with each side of the side-seal bag being bounded by bag side edges, a bag top edge, and a bag bottom corresponding with a tubing crease. A casing, whether seamless or backseamed, also has two sides, with each side being bounded by the ends of the casing and by creases formed as the casing is configured into its lay-flat configuration. While gusseted bags and other packaging articles may not be fully lay-flat in their structure because they have more than two flat sides, they nevertheless have "sides" bounded by creases and edges.

As used herein, the term "package" refers to packaging materials configured around a product being packaged. As such, the term "package" includes all of the packaging around the product, but not the product itself.

As used herein, the phrase "packaged product" refers to the combination of a product and the package that surrounds or substantially surrounds the product. The packaged product can be made by placing the product into a packaging article made from the heat-shrinkable multilayer film, with the article then being sealed closed so that the multilayer film surrounds or substantially surrounds the product. The film can then be shrunk around the product.

As used herein, the term "bag" refers to a packaging article having an open top, side edges, and a bottom edge. The term "bag" encompasses lay-flat bags, pouches, casings (seamless casings and backseamed casings, including lap-sealed casings, fin-sealed casings, and butt-sealed back-seamed casings having backseaming tape thereon). Various casing configurations are disclosed in U.S. Pat. No. 6,764,729 B2, to Ramesh et al, entitled "Backseamed Casing and Packaged Product Incorporating Same, which is hereby incorporated in its entirety, by reference thereto. Various bag configurations, including L-seal bags, backseamed bags, and U-seal bags (also referred to as pouches), are disclosed in U.S. Pat. No. 6,970,468, to Mize et al, entitled "Patch Bag and Process of Making Same", which is hereby incorporated, in its entirety, by reference thereto. While the bag configurations illustrated in the '468 patent have a patch thereon, for purposes of the present invention, the patch is optional.

As used herein, the phrase "lay-flat bag" refers generically to non-gusseted bags used for the packaging of a variety of products, particularly food products. More specifically, the phrase "lay-flat bag" includes side seal bag, end-seal bag, L-seal bag, U-seal bag (also referred to as a pouch), and backseamed bag (also referred to as T-seal bag). The back-seam can be a fin seal, a lap seal, or a butt-seal with a backseaming tape. Before the bag is shrunk, it can have a length-to-width ratio of from 1:1 to 20:1; or from 1.5:1 to 8:1; or from 1.8:1 to 6:1; or from 2:1 to 4:1.

End-seal bags, side-seal bags, L-seal bags, T-seal bags (also referred to as backseamed bags), and U-seal bags all have an open top, closed sides, a closed bottom, and at least one heat seal. Each of these heat seals is referred to as a "factory seal" because these seals are made in a bag-making factory, rather than in a packaging factory where the bag is used to package a product. Each of the heat seals illustrated in FIGS. 1A, 1B, 1C, 3-13, and 15-17 are so-called "factory seals." Each of the factory seals is generally made a short distance inward of the edge of the article, so that a relatively small amount of film remains outward of the heat seal, i.e., on the other side of the seal from the film that envelopes the product. A gusseted bag can also be made with a bottom seal that has a skirt, and a casing (backseamed or seamless) can have a transverse heat seal with a skirt. As used herein, the term "skirt" refers to the film that is outward of any one or more of the factory seals.

The term "polymer" refers to the product of a polymerization reaction, and is inclusive of homopolymer, copolymer, terpolymer, etc. The term "copolymer" includes copolymer, terpolymer, etc.

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "homopolymer" is used with reference to a polymer resulting from the polymerization of a single monomer, i.e., a polymer consisting essentially of a single type of mer, i.e., repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene. The term copolymer is also inclusive of polymers produced by reaction, such as graft copolymer, block copolymer, and random copolymer.

As used herein, the term "polymerization" is inclusive of homopolymerizations, copolymerizations, terpolymerizations, etc., and includes all types of copolymerizations such as random, graft, block, etc. Polymers in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers to result in a copolymer. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

Copolymers can be identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "mer" units derived from the monomers from which the copolymer is produced, e.g., a propylene/ethylene copolymer comprises propylene mer units and ethylene mer units.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, terms such as "polyamide", "polyolefin", "polyester", etc are inclusive of homopolymers of the genus, copolymers of the genus, terpolymers of the genus, etc, as well as graft polymers of the genus and substituted polymers of the genus, e.g., polymers of the genus having substituent groups thereon.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, modified polymers thereof, and the like. Specific examples include ethylene homopolymer, propylene homopolymer, polybutene (also referred to as polybutylene), ethylene/α-olefin copolymer, ethylene/propylene copolymer, propylene/ethylene copolymer, propylene/α-olefin copolymer, butene/α-olefin copolymer, low density polyethylene, linear low density polyethylene, very low density polyethylene, ultra low density polyethylene, medium density polyethylene, high density polyethylene, ethylene/butene copolymer, ethylene/hexene copolymer, ethylene/octene copolymer, polyisoprene, polymethyl butene (including poly-3-methylbutene-1), polymethylpentene (including poly-4-methylpentene-1), ethylene/unsaturated ester copolymer, ethylene/unsaturated acid copolymer (including ethylene/acrylate copolymer, such as ethylene/butyl acrylate copolymer, ethylene/methyl acrylate copolymer, ethylene/acrylic acid copolymer, and ethylene/methacrylic acid copolymer), and ionomer resin, "Modified polyolefin" is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. Modified polyolefin could also be obtained by incorporating an unsaturated carboxylic acid, e.g., maleic acid, fumaric acid or the like, or a derivative thereof such as the anhydride, ester or metal salt or the like, into the olefin homopolymer or copolymer.

As used herein, the phrase "propylene/ethylene copolymer" refers to a copolymer of propylene and ethylene wherein the propylene mer content is greater than the ethylene mer content. Propylene/ethylene copolymer is not a species of "ethylene/alpha-olefin copolymer."

As used herein, the phrase "ethylene-based polymer" refers to ethylene homopolymer, modified ethylene homopolymer, ethylene/alpha-olefin copolymer, modified ethylene/alpha-olefin copolymer, propylene/ethylene copolymer, modified propylene/ethylene copolymer, ionomer resin, and blends thereof. The ethylene/alpha-olefin copolymer may be homogeneous or heterogeneous. "Ethylene-based polymer" does not include polyvinylidene chloride or other oxygen barrier polymer, does not include polyamide, does not include polyester, does not include ethylene/unsaturated ester copolymer, and does not include ethylene/unsaturated acid copolymer.

The phrase "ethylene/alpha-olefin copolymer" refers to heterogeneous copolymers such as linear low density polyethylene (LLDPE), very low and ultra low density polyethylene (VLDPE and ULDPE), as well as homogeneous polymers such as metallocene catalyzed polymers such as EXACT® resins obtainable from the Exxon Chemical Company, AFFINITY® and ENGAGE® resins available from The Dow Chemical Company, and TAFMER® resins obtainable from the Mitsui Petrochemical Corporation. These copolymers include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. Ethylene/α-olefin copolymer may result from the copolymerization of 80 to 99 wt % ethylene with 1 to 20 wt % α-olefin, or the copolymerization of 85 to 95 wt % ethylene with 5 to 15 wt % α-olefin.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous copolymers typically contain a relatively wide variety of chain lengths and comonomer percentages. Heterogeneous copolymers have a molecular weight distribution (Mw/Mn) of greater than 3.0.

As used herein, the phrase "homogeneous polymer" refers to polymerization reaction products of relatively narrow molecular weight distribution and relatively narrow composition distribution. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts. Homogeneous ethylene/alpha-olefin copolymer has a Mw/Mn of ≤3.0.

Homogeneous ethylene/α-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers may have an $M_w/M_n$ ≤3, or ≤2.7, or from 1.9 to 2.5, or from 1.9 to 2.3. The Composition Distribution Breadth Index (CDBI) of such homogeneous ethylene/alpha-olefin copolymers will generally be greater than about 70 percent. CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. CDBI is determined via the technique of Temperature Rising Elution Fractionation (TREF). CDBI determination distinguishes the homogeneous copolymers used in the present invention (narrow composition distribution as assessed by CDBI values generally above 70%) from VLDPE available commercially which generally have a broad composition distribution as assessed by CDBI values generally less than 55%. The CDBI can be calculated from data obtained from TREF, for example as disclosed by Wild et. al., *J. Poly. Sci. Poly. Phys. Ed.*, Vol. 20, p. 441 (1982). Preferably, the homogeneous ethylene/alpha-olefin copolymer has a CDBI of from about 70% to about 99%. Homogeneous ethylene/alpha-olefin copolymers exhibit a relatively narrow melting point range, in comparison with heterogeneous copolymers, e.g., homogeneous ethylene/alpha-olefin copolymers may exhibit an essentially singular melting point of from about 60° C. to about 105° C., or from 80° C. to about 100° C. As used herein, the phrase "essentially single melting point" means that at least about 80 wt % of the material corresponds to a single Tm peak at a temperature within the range of from about 60° C. to about 105° C., and essentially no substantial fraction of the material has a peak melting point in excess of about 115° C.

Homogeneous ethylene/alpha-olefin copolymer can be prepared by the copolymerization of ethylene and any one or more alpha-olefin. Preferably, the alpha-olefin is a $C_{3-20}$ α-monoolefin, more preferably, a $C_{4-12}$ α-monoolefin, still more preferably, a $C_{4-8}$ α-monoolefin. The alpha-olefin may comprise at least one member selected from the group consisting of butene-1, hexene-1, and octene-1, i.e., 1-butene, 1-hexene, and 1-octene; or just octene-1; or a blend of hexene-1 and butene-1.

Processes for preparing and using homogeneous polymers are disclosed in U.S. Pat. Nos. 5,206,075, 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the phrase "plastomer" refers to a polymer which combines the qualities of elastomers and plastics, such as rubber-like properties with the processing ability of plastics. Suitable plastomers for use in the multilayer film include homogeneous ethylene/alpha-olefin copolymers.

Plastomers for use in the multilayer film may have a peak melting point ≤90° C., or ≤88° C., or ≤85° C., or ≤82° C., or ≤80° C.; or a peak melting point of from 45° C. to 90° C., or from 50° C. to 85° C., or from 55° C. to 85° C., or from 55° C. to 80° C. The plastomer may be an ethylene/alpha-olefin copolymer, particularly a homogeneous ethylene/alpha-olefin copolymer.

The plastomer may have a melt index ≤1.1 gram/10 min, or ≤1.0 gram/10 min, or ≤0.95 gram/10 min, or ≤0.90 gram/10 min, or from 0.7 to 1.1 gram/10 min, or from 0.75 to 1.0 gram/10 min, or from 0.8 to 0.95 gram/10 min, or from 0.85 to 0.90 gram/10 min, or from 0.86 to 0.89 gram/10 min.

In an embodiment the outside film layer, and/or in the barrier layer, and/or one or more tie layers, may comprise polyester. As used herein, the term "polyester" refers to a homopolymer and/or copolymer having an ester linkage between monomer units. The ester linkage may be formed, for example, by a condensation polymerization reaction between a dicarboxylic acid and a glycol. The dicarboxylic acid may be aliphatic, i.e., oxalic acid, malonic acid, succinic acid, glutaric acid, adipic acid, pimelic acid, suberic acid, azelaic acid, sebacic acid, and the like; or may be substituted or unsubstituted aromatic, e.g., various isomers of phthalic acid (i.e., ortho-phthalic acid), such as isophthalic acid (i.e., meta-phthalic acid), and terephthalic acid (i.e., para-phthalic acid), as well as naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The dicarboxylic acid can alternatively be 2,5-furandicarboxylic acid (FDCA). The glycols may be straight-chained or branched. Specific examples include ethylene glycol, propylene glycol, trimethylene glycol, 1,4-butane diol, neopentyl glycol and the like. The glycols include modified glycols such as cyclohexane dimethanol. The polyester in the outer layer of the film can comprise any of the above polyesters.

Polyester also refers to polyethylene furanoate. AVANTIUM® bio-based polyester is a polyethylene furanoate which per unit thickness exhibits only one tenth the oxygen transmission rate of polyethylene terephthalate (PET), one fourth the carbon dioxide transmission rate of PET, and one half the water vapor transmission rate of PET. Polyethylene furanoate is more heat-resistant than PET, with a glass transition temperature ($T_g$) 12° C. higher than PET, with a melt point of 165° C., which is higher than PET. Furthermore, polyethylene furanoate is recyclable alone or in a blend with PET. Polyethylene furanoate can be extruded to form films. Polyethylene furanoate is made by polymerizing ethylene glycol and 2,5-furandicarboxylic acid (FDCA). Polyethylene furanoate is renewable, as it is bio-based.

As used herein, the term "polyamide" refers to homopolymers, copolymers, or terpolymers having an amide linkage between monomer units which may be formed by any method known to those of skill in the art. The polyamides approved for use in producing articles intended for use in processing, handling, and packaging food, including homopolymers, copolymers and mixtures of polyamides, are described in 21 C.F.R. 177.1500 et seq., which is hereby incorporated in its entirety, by reference thereto. Useful polyamide homopolymers include nylon 6 (polycaprolactam), nylon 11 (polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 6/12 (poly(caprolactam-co-laurallactam)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like. Polyamide copolymers include nylon 6,6/6 copolymer (polyhexamethylene adipamide/caprolactam copolymer), polyamide 6/6,6 copolymer (polycaprolactam/hexamethylene adipamide copolymer), polyamide 6,2/6,2 copolymer (polyhexamethylene ethylenediamide/hexamethylene ethylenediamide copolymer), nylon 6,6/6, 9/6 copolymer (polyhexamethylene adipamide/hexamethylene azelaiamide/caprolactam copolymer), as well as other polyamides. Additional polyamides include polyamide 4,I, polyamide 6,I, polyamide 6,6/6I copolymer, polyamide 6,6/6T copolymer, polyamide MXD6 (poly-m-xylylene adipamide), polyamide 6I/6T copolymer, polyamide 6/MXDT/I copolymer, polyamide MXDI, poly-p-xylylene adipamide, polyhexamethylene terephthalamide, polydodecamethylene terephthalamide, and the like.

As used herein, the phrase "amorphous polyamide" refers to a polyamide with an absence of a regular three-dimensional arrangement of molecules or subunits of molecules extending over distances which are large relative to atomic dimensions. However, regularity of structure exists on a local scale. See "Amorphous Polymers," in *Encyclopedia of Polymer Science and Engineering*, 2nd Ed., pp. 789-842 (J. Wiley & Sons, Inc. 1985), having Library of Congress Catalogue Card Number 84-19713. Amorphous polyamide is recognized by one skilled in the art of DSC (using ASTM 3417-83) as having no measurable melting point (i.e., less than 0.5 cal/g) or no heat of fusion. Amorphous polyamide is prepared from a condensation polymerization reaction of a diamine with a dicarboxylic acid. For example, an aliphatic diamine is combined with an aromatic dicarboxylic acid, or an aromatic diamine is combined with an aliphatic dicarboxylic acid, to result in amorphous polyamide.

Unless otherwise indicated, the phrase "semi-crystalline polyamide" includes all polyamides that are not considered to be amorphous polyamides. All semi-crystalline polyamides have a determinable melting point. The semi-crystalline polyamide may have a melting point of from 125° C. to 270° C., or from 250° C. to 270° C.

As used herein, the phrase "cyclic polymer" includes cyclic olefin copolymer, whether aliphatic or phenolic, i.e., including ethylene/norbornene copolymer, polycyclododecene, polyester, and cyclic olefin polymer.

Each polymer melt index value disclosed herein was determined in accordance with ASTM D1238, with the test being carried out (unless specified otherwise) at 190° C. and 2.16 kg. ASTM D1238 is hereby incorporated, in its entirety, by reference thereto.

Each polymer melt index value disclosed herein was determined in accordance with ASTM D1238, with the test being carried out (unless specified otherwise) at 190° C. and 2.16 kg. ASTM D1238 is hereby incorporated, in its entirety, by reference thereto.

As used herein, the phrase "peak melting point" refers to the peak at the highest temperature in a Differential Scanning calorimeter curve (DSC curve) plotting Energy Input on the Y axis and Temperature on the X axis. Peak melt point corresponds with the highest temperature at which energy input is needed to phase change the highest melting portion of the polymer from solid to liquid.

In an embodiment, the plastomer may have a density of less than 0.905 g/cm$^3$, or less than 0.902 g/cm$^3$, or less than 0.900, or less than 0.895 g/cm$^3$, or less than 0.890 g/cm$^3$, or less than 0.886 g/cm$^3$; or have a density of from 0.857 g/cm$^3$ to 0.908 g/cm$^3$, or from 0.86 g/cm$^3$ to 0.905 g/cm$^3$, or from 0.87 g/cm$^3$ to 0.903 g/cm$^3$, or from 0.875 g/cm$^3$ to 0.902 g/cm$^3$, or from 0.88 g/cm$^3$ to 0.900 g/cm$^3$, or from 0.88 g/cm$^3$ to 0.895 g/cm$^3$, or from 0.88 g/cm$^3$ to 0.89 g/cm.

In an embodiment, the plastomer is present in the film in an amount of at least 3.5 wt %, or at least 4 wt %, or at least 4.5 wt %, or at least 5 wt %, or at least 5.5 wt %, or at least 6 wt %, based on total film weight. In an embodiment, the plastomer is present in the film in an amount of from 3 to 20 wt %, or from 3.5 to 15 wt %, or from 4 to 12 wt %, or from 4.5 to 10 wt %, or from 5 to 8 wt %, or from 5.5 to 7 wt &, or from 5.5 to 6.5 wt %, based on total film weight.

As used herein, the phrase "acrylate-based polymer" refers to homopolymer, copolymer, including e.g. bipolymer, terpolymer, etc., having an acrylate moiety in at least one of the repeating units forming the backbone of the polymer. In general, acrylate-based polymers are also known as polyalkyl acrylates. Acrylate-based polymers may be prepared by any method known to those of skill in the art. Acrylate-based polymers include ethylene/vinyl acrylate copolymer, ethylene/methacrylate copolymer, ethylene/butyl acrylate copolymer, and the like.

As used herein, the phrase "styrene-based polymer" refers to at least one polymer selected from the group consisting of styrene-ethylene-butylene-styrene copolymer, styrene-butadiene-styrene copolymer, styrene-isoprene-styrene copolymer, styrene-ethylene-butadiene-styrene copolymer, and styrene-(ethylene-propylene rubber)-styrene copolymer. As used herein the use of a "dash" (i.e., the "-") in a styrene-based polymer formula, is inclusive of both block copolymers and random copolymers. More particularly, the phrase "styrene-based polymer" includes both copolymers in which (i) all named monomers are present as a block, or (ii) any subset of the named monomers are present as a block with the remaining monomers being randomly arranged, or (iii) all named monomers are randomly arranged.

As used herein, the term "oriented" refers to a polymer-containing material which has been drawn and/or stretched at an elevated temperature (elevated to its softening point, but not to its melt point, so that the material remains in the solid state during orientation), followed by being "set" in the stretched configuration by cooling the material while substantially retaining the stretched dimensions. Upon subsequently heating the unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is usually obtained by "blowing" the film to produce a bubble. For such films, drawing is usually obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

The film is a heat-shrinkable film. The film can be produced by carrying out only monoaxial orientation or biaxial orientation. As used herein, the phrases "heat-shrinkable," "heat-shrink," and the like, refer to the tendency of a film, generally an oriented film, to undergo free shrink upon the application of heat, i.e., to contract upon being heated, such that the size (i.e., surface area) of the film decreases while the film is in an unrestrained state. Likewise, the tension of a heat-shrinkable film increases upon the application of heat if the film is restrained from shrinking.

Heat shrinkability can be achieved by carrying out orientation in the solid state (i.e., at a temperature below the glass transition temperature of the polymer). In biaxial orientation, the total orientation factor employed (i.e., stretching in the transverse direction multiplied by drawing in the machine direction) can be any desired factor, such as 2× in the machine direction and 2× in the transverse direction (i.e., a "2×2 orientation," producing a total orientation factor 4×), or a 3×3 orientation (9× total orientation), or a 3.2×3.5 orientation (11.2× total orientation), etc. The total orientation can be at least 3×, at least 4×, at least 5×, at least 6×, at least 7×, at least 8×, at least 9×, at least 10×, at least 16×, or from 8× to 18×, from 10× to 16×, from 11× to 15×, or from 12× to 14×.

As used herein, the phrase "free shrink" refers to the percent dimensional change in a 10 cm. by 10 cm. specimen of film, when subjected to selected heat (i.e., at a certain temperature), with the quantitative determination being carried out according to ASTM D 2732, as set forth in the 1990 Annual Book of ASTM Standards, Vol. 08.02, pages 368-371, which is hereby incorporated, in its entirety, by reference thereto. The free shrink test is carried out by immersing the film specimen for 5 seconds in a water bath heated to 85° C. As used herein, the phrase "@STP" refers to the test being carried out under standardized test conditions, i.e., one atmosphere of pressure, 23° C., and 0% relative humidity. "Total free shrink" is determined by summing the percent free shrink in the machine direction with the percentage of free shrink in the transverse direction. For example, a film which exhibits 55% free shrink in the transverse direction at 85° C., and 45% free shrink in the machine direction at 85° C., has a "total free shrink" at 85° C. of 100%.

As used herein, the phrase "heat-shrinkable" is used with reference to all films which exhibit a total free shrink (i.e., L+T) of at least 10% at 85° C., according to ASTM D2732 by immersion of the film specimen for 5 seconds in a water bath heated to 85° C. All films exhibiting a total free shrink of less than 10% at 85° C. are herein designated as non-heat-shrinkable. The heat-shrinkable film multilayer film can have a total free shrink at 85° C. of at least 90%, or at least 95%, or at least 100%, or at least 105%, or at least 110%; or from 90% to 150%, or from 95% to 130%, or from 95% to 120%, as measured by ASTM D 2732.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion-coating processes.

The film comprises a crosslinked polymer network. In an embodiment, the film is irradiated to induce crosslinking, i.e., to form the crosslinked polymer network. The film can also be subjected to corona treatment to roughen any surfaces of the film which are to be adhered to one another. Irradiation induces polymer crosslinking, particularly of polyolefin in the film. The film can be subjected to irradiation using an energetic radiation treatment, such as corona discharge, plasma, flame, ultraviolet, X-ray, gamma ray, beta ray, and high energy electron treatment, which induce crosslinking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking polymer present in the film.

To produce crosslinking, a suitable radiation dosage of high energy electrons is employed, preferably using an electron accelerator, with a dosage level being determined by standard dosimetry methods. Other accelerators such as a Van de Graaf or resonating transformer may be used. The radiation is not limited to electrons from an accelerator since any ionizing radiation may be used. The ionizing radiation can be used to crosslink the polymers in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR. The crosslinked polymer network may be formed by irradiating the first film portion at a level of from 16 to 166 kGy, or from 30 to 120 kGy, or from 30 to 90 kGy, or from 50 to 80 kGy, or from 55 to 75 kGy. Irradiation can be carried out by an electron accelerator with the dosage level determined by standard dosimetry processes. Other accelerators such as a van der Graaf or resonating transformer may be used. The radiation is not limited to electrons from an accelerator since any ionizing radiation may be used.

The heat-shrinkable, multilayer film can be prepared using an extrusion-coating process. This allows annular extrudate 214 (see FIG. 18), herein referred to as a first film portion and as the "substrate," to be crosslinked by irradiation before one or more additional layers (i.e., the "coating") are extrusion-coated over the substrate. Irradiation produces a stronger polymer network by crosslinking the polymer chains. Extrusion-coating allows the substrate portion of the resulting multilayer laminate to possess a crosslinked polymer network, while at the same time avoiding irradiation of, for example, a layer of polyvinylidene chloride applied to the substrate during the extrusion-coating. Irradiation of PVDC can result in the degradation of the PVDC. Extrusion-coating and irradiation are disclosed in U.S. Pat. No. 4,278,738, to Brax et al, which is hereby incorporated, in its entirety, by reference thereto.

In one embodiment, the packaging article is a lay-flat, end-seal bag made from a seamless tubing, the end-seal bag having an open top, first and second folded side edges, and an end seal across a bottom of the bag, with the first and second tear initiators being in the bag skirt that is outward of the end seal, with the first tear being a machine-direction tear of the film, and the second tear being a machine-direction tear of the film, with each tear being capable of being manually propagated down the length of the end-seal bag to the opposite edge of the end-seal bag.

In one embodiment, the packaging article is a lay-flat, side-seal bag made from a seamless tubing, the side-seal bag having an open top, a folded bottom edge, and first and second side seals with respective first and second bag skirts outward of respective first and second side seals, with the first and second tear initiators being in the first bag skirt and outward of the first side seal, with the first tear being a machine-direction tear and the second tear being a machine-direction tear, with each tear being capable of being manually propagated across the full width of the side-seal bag to the opposite edge of the side-seal bag.

In one embodiment, the packaging article is a lay-flat, side-seal bag made from a seamless tubing, the side-seal bag having an open top, a folded bottom edge, a first side seal with a first bag skirt outward thereof, a second side seal with a second bag skirt outward thereof, and a third seal that extends from the first side seal to the second side seal, the third seal being at an opposite end of the bag from the open top, the third seal having a third bag skirt outward thereof, the folded bottom edge being in the third bag skirt, the third bag skirt comprising the first and second tear initiators, with the first tear being a transverse-direction tear and the second tear being a transverse-direction tear, with the first and second tears each being capable of being manually propagated down the length of the side-seal bag and to the opposite edge of the side-seal bag.

In one embodiment, the packaging article is a lay-flat pouch made by heat sealing two flat films to one another, the pouch having an open top, a first side seal with a first bag skirt outward thereof, a second side seal with a second bag skirt outward thereof, a bottom seal with a third bag skirt outward thereof, the bottom seal extending from the first side seal to the second side seal, the bottom seal being at an opposite end of the bag from the open top, with at least one of the bag skirts having first and second tear initiators for tearing each of the two flat films in the machine direction.

Figure 9:
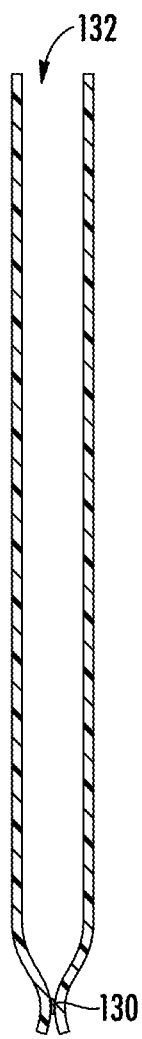
FIG. 9 is a longitudinal cross-sectional view of the L-seal bag of FIG. 7, taken through section 9-9 of FIG. 7.
Figure 19:
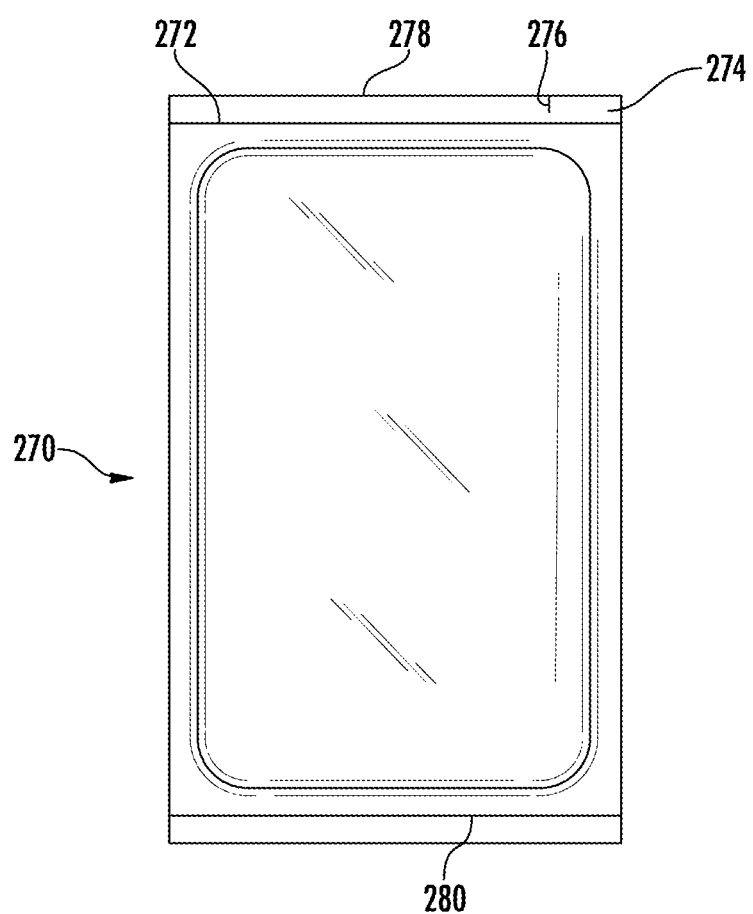
FIG. 19 is a schematic of a packaged product made up of a meat product vacuum packaged in a shrunken end-seal bag having the tear initiation feature in the bag skirt.

In contrast, heat seal 280 on the packaged product of FIG. 19 is herein referred to as a "packers seal" or as an "applied seal" or as a "customer seal". While the film outward of a factory heat seal is referred to as a "skirt", the film outward of a customer seal is referred to as a "tail" or "header" of the packaging article. In the packaged product illustrated in FIGS. 19-22 seal 272 is the factory seal and seal 280 is the applied seal, the latter being used to close the packaging article after the product has been placed inside the packaging article. If tear initiator 53 in FIG. 9 is in the skirt, then heat seal 51 is the factory seal and heat seal 55 is the customer seal. While a tear initiator may be in a skirt, it may also be in a header region of the bag. If tear initiator 53 is in the header, then heat seal 51 is the customer seal and heat seal 55 is the factory seal. Usually, the header is larger (i.e., longer) than the skirt.

The term "bag" also includes that portion of a package that is derived from a bag. That is, once a product is placed inside a bag, the bag is sealed closed so that it surrounds the product. Excess bag length (i.e., the bag tail or bag header) can optionally be cut off along a line close to the seal made across the bag to enclose the product within the bag, and thereafter optionally the film can be shrunk around the product. The portion of the bag that remains and is configured around the product is herein also within the term "bag". The phrase "an opposite edge of the packaging article" refers to the edge of the bag that is directly across from the edge of the packaging article having the tear initiator. For example, a bag top edge is opposite the bag bottom edge; a first bag side edge is opposite the second bag side edge. As used herein, the phrase "a side of the bag" is used with reference to each of the first and second sides of a lay-flat bag, as well as each of the two principal, flat sides of a gusseted bag.

As used herein, the phrase "skirt" refers to that portion of the packaging article that is outward of a heat seal, e.g., the excess length or width on the non-product side of any factory heat seal on the packaging article. In an end-seal bag, the bag skirt is short in the machine direction and long in the transverse direction. In a side-seal bag, the bag skirt is long in the machine direction and short in the transverse direction. In either case, the "width" of the bag skirt is the shorter dimension of the skirt, and the "length" of the bag skirt is the longer dimension of the skirt. A bag skirt (or any skirt of any packaging article) can have a width, before the film is shrunk, of at least 5 millimeters, or at least 10 millimeters, or at least 15 millimeters, or at least 20 millimeters, or at least 25 millimeters, or at least 30 millimeters. Alternatively, the skirt can have a width of from 5 to 100 millimeters, or from 10 to 50 millimeters, or from 15 to 40 millimeters, or from 20 to 35 millimeters.

The tear initiator can be a cut in the skirt or header of the packaging article. As used herein, the term "cut" refers to the penetration through the film, or shearing through the film, with a shearing means or edged instrument. Preferably the cut is made through both sides of the packaging article. The term "cut" is inclusive of both slits and notches. As used herein, the term "slit" refers to a cut through the film without the separation and removal of a piece of film from the packaging article. A slit can be from the edge of the packaging article (i.e., an "edge slit") or internal, i.e., not extending to an edge (i.e., "internal slit" also referred to as a "slit hole"). The slit can be straight or curved or wavy.

The term "hole", as used herein, includes both an internal puncture (i.e., internal hole) or internal cut (i.e., an internal slit) through the packaging article, as well as an internal cut that removes a piece of film from the article. The hole can utilize a straight cut or a curved cut. The hole can be round or square or rectangular or irregular in shape.

A "notch" is formed by a cut that removes a piece of film along an otherwise straight or smooth curved edge of an article skirt or tail, producing a point for stress concentration during the subsequent manual application of tearing force. A notch can be V-shaped or round or square or rectangular or oval or of any regular or irregular profile.

The slit or notch or hole in the skirt or tail can extend across at least 10 percent of the width of the skirt before the bag is shrunk; or at least 20 percent, or at least 30 percent or at least 40 percent, or at least 50 percent, or at least 60 percent, or at least 70 percent, or at least 80 percent, or at least 90 percent, of the width of the skirt or tail. The slit or notch or hole can angle inward, toward the center of the packaging article.

In end-seal and side-seal bags, as well as other packaging articles, a portion of the skirt is in a first lay-flat side of the article (e.g., bag), and a portion of the same skirt is in a second lay-flat side of the article (e.g., bag). The first lay-flat side of the skirt can have a first tear initiator, and the second lay-flat side of the skirt can have a second tear initiator.

The first tear initiator can overlap the second tear initiator when the end-seal or side-seal bag (or any other packaging article) is in its lay-flat configuration, as well as in the shrunken package. Overlapping enhances the ease of simultaneously initiating and propagating the tears in the first and second sides of the packaging article. Moreover, the first tear initiator can coincide (i.e., be positioned directly over and correspond with in length and shape) with the second tear initiator when the packaging article is in its lay-flat configuration.

The packaging article can be provided with both a first tear initiator that is overlapping or coincident with the second tear initiator, and a third tear that is overlapping or coincident with a fourth tear initiator. The first and second tear initiators can be positioned in a skirt or header portion of the article for making a manual tear in a machine direction, with the third and fourth tear initiators being positioned for making a manual tear in a transverse direction. The third and fourth tear initiators can be positioned in a skirt or a header.

As used herein, the verb "to tear" refers to pulling an object apart by force. The noun "tear" refers to the resulting break in the object being torn. The tearing of the film results from placing the film under enough tension that it is pulled apart by the force. The pulling force is concentrated by the tear initiator, which allows a smaller pulling force to pull the film apart, i.e., tear the film. High impact strength heat-shrinkable films are not susceptible to being manually torn without the presence of the tear initiator. In the heat-shrinkable packaging article, the high impact strength multilayer film undergoes tearing from the tear initiator toward the opposite edge of the packaging article.

The phrase "tear initiator", as used herein, refers to any one or more of a variety of means that can be located in the skirt or header of a packaging article. The tear initiator allows manual tearing force to be concentrated on a point or small region of the film(s), so that tear initiation and tear propagation can be produced manually. A slit in the bag skirt, as illustrated in FIG. 6A, can serve as the tear initiator. Alternatively, the tear initiator can be a V-shaped notch in a bag skirt or a rounded notch in the bag skirt, or a rectangular notch in the bag skirt, or a slit hole in the bag skirt, or a round hole in the bag skirt, or a pointed oval hole in the bag skirt, or a rectangular hole in the bag skirt.

As used herein, the terms "overlapping" and "coincident" are used with respect to the relative positioning of paired tear initiators both when the article is in its lay-flat configuration and/or after a product is placed in the article and the article sealed closed around the product. The term "coincident" refers to two paired tear initiators that are directly on top of one another. The term "overlapping" refers to two paired tear initiators that are close enough to one another than an effort to manually tear one side of the packaging article at one of the tear notches results in tearing both sides of the article, i.e., from each of the paired tear initiators. The phrase "substantially coincident" is used interchangeably with the term "overlapping". Typically, tear initiators within one half inch of being coincident with one another are deemed to be "overlapping".

As used herein, the phrase "manual" and the term "manually" are both used with reference to tearing with the hands alone i.e., without the need for a knife, scissors, or any other implement to assist with initiating or propagating tearing of the film. The term "manual" is used with respect to tear initiation, i.e., the manual starting of the tearing action, as well as with respect to tear propagation, i.e., the manual continuation (i.e., extension) of a tear that has been manually initiated.

In addition to the tear initiator, the packaging article can be provided with "grip assister", also referred to herein as a "grip enhancer". The grip assister can enhance the ease with which the film can be torn. The grip assister can be in one lay-flat side of the packaging article or in both lay-flat sides of the packaging article. The grip assister can be a hole in the skirt (and/or in the header), an integral extension of the skirt or header, or a separate film tab fastened to the skirt or header. The separate film tab can be made from a thermoplastic polymer, paper, or other material, and can be heat-shrinkable or non-heat-shrinkable. The packaging article can be provided with the combination of a tear-initiator and a grip-assister. For example, the skirt can have a slit as the tear-initiator and a hole as the grip-assister. See FIG. 6I. The skirt can have a slit as the tear initiator and two holes providing serving as the grip assister. See FIG. 6J. Alternatively, the grip assister can be a tab, as illustrated in FIG. 6K, this figure further illustrating the tab being used in combination with a slit.

With respect to the tearing of the film from which the packaging article is made, as used herein the phrase "the tear is capable of being propagated . . . " refers to the manner in which the film tends to propagate the tear when the bag is subjected to an ordinary manual opening thereof, i.e., the packaging article can be "gripped and ripped" or "gripped and torn" in the ordinary course of opening. The packaging article exhibits substantially linear tear. Usually, the linear tear is substantially in line with the machine direction, or substantially in line with the transverse direction. The tearing is carried out after shrinking the heat-shrinkable film.

If the tear is being made in the machine direction of the film, the tear may be within from 0 to 44 degrees of the actual machine direction of the film, i.e., so long as the tear can be propagated toward and to the opposite side edge of the bag; or the tear may be within from 0 to 20 degrees, or within from 0 to 15 degrees, or within from 1 to 20 degrees, or within from 0 to 10 degrees; or within from 0 to 5 degrees, or within from 0 to 2 degrees of the machine direction of the film. The same holds true of transverse direction tearing, i.e., the tear may be within from 0 to 44 degrees of the actual transverse direction of the film; or the tear may be within 0 to 20 degrees, or within 1 to 20 degrees, or within from 0 to 10 degrees; or within from 0 to 5 degrees, or within from 0 to 2 degrees of the transverse direction of the film.

As used herein, the phrase "post-shrink, full-length manual tear in the machine direction" refers to manual tear from tear initiators, either with or without the presence of grip assisters.

As used herein, the phrase "readily removed" is applied to the removal of a product from a packaging article surrounding or substantially surrounding the product. As used herein, the phrase "readily removed" refers to the manual removal of the product from within the confines of the packaging article without any further substantial amount of tearing, and without any substantial further permanent deformation of the film. As used herein, the phrase "substantial tearing of the film" refers to tearing greater than or equal to 2 millimeters in length. As used herein, the phrase "substantial permanent deformation of the film" refers to a permanent stretching of the film greater than or equal to 2 millimeters at any location on the film.

Once a multilayer film is heat sealed to itself or another member of the package being produced (i.e., is converted into a packaging article, e.g., a bag, pouch, or casing), one outer layer of the film is an inside layer of the packaging article and the other outer layer becomes the outside layer of the packaging article. The inside layer can be referred to as an "inside heat seal/product contact layer", because this is the film layer that is sealed to itself or another article, and it is the film layer closest to the product, relative to the other layers of the film. The other outer layer can be referred to as the "outside layer" and/or as the "outer abuse layer" or "outer skin layer", as it is the film layer furthest from the product, relative to the other layers of the multilayer film. Likewise, the "outside surface" of a packaging article (i.e., bag) is the surface away from the product being packaged within the article.

While the multilayer heat-shrinkable film can be sealed to itself to form a packaging article, optionally a heat-shrinkable patch film can be adhered to article (particularly to a bag). The patch film can be heat-shrinkable, and can have a total free shrink at 85° C. of at least 35 percent, measured in accordance with ASTM D-2732. The bag film and the patch film can have a total free shrink at 85° C. that are within 50 percent of one another, or within 20 percent of one another, or with 10 percent of one another, or within 5 percent of one another, or within 2 percent of one another. The patch may or may not cover the heat seal. If the patch covers a heat seal, optionally the heat seal may be made through the patch. If the tear is to be made through the bag and through the patch, the patch should cover a heat seal, and the tear initiator should be through both the bag film and the patch film. The bag can have a curved seal and the patch can extend into and through the region of the curved seal and over and past the curved seal. If the bottom edge of the bag is curved, a bottom edge of the patch can also be curved. The patch bag can have any desired configuration of patch on bag as disclosed in any one or more of U.S. Pat. Nos. 4,755,403, 5,540,646, 5,545, 419, 6,296,886, 6,383,537, 6,663,905, and 6,790,468, each of which is hereby incorporated, in its entirety, by reference thereto.

End-seal bags with curved heat seals, and end-seal patch bags with curved heat seals, can be designed for have manual tear initiation and manual directional tear propagation. While the end-seal may be curved, the bottom edge of the bag may be straight across the tubing, or may also be curved. A curved bottom heat seal and a straight across bag bottom edge leaves more space in the bottom corners of the bag skirt for providing tear initiators, as well as for grip assisters. Patch bags with curved end seals are disclosed in U.S. Pat. No. 6,270,819, to Wiese, which is hereby incorporated, in its entirety, by reference thereto.

In an embodiment, the heat-shrinkable film has an instrumented impact energy-to-break of at least 0.70 Joules/mil using ASTM D3763, or at least 0.70 J/mil, or at least 0.75 J/mil, or at least 0.80 J/mil, or at least 0.85 J/mil; or from 0.70 to 1.5 J/mil, or from 0.72 to 1.0 J/mil, or from 0.75 to 0.90 J/mil, or from 77 to 88 J/mil, or from 80 to 85 J/mil. Instrumented Impact was carried out using ASTM D3763

(more particularly, ASTM D3763-15), which is hereby incorporated, in its entirety, by reference thereto. Instrumented Impact analysis was carried out with 3.66 m/sec velocity and with a 12.7 mm diameter spherical probe.

In an embodiment, the heat-shrinkable film has an Instrumented Impact Peak Load strength, determined also using ASTM D3763 as described above, of at least 66 Newtons per mil (N/mil), or at least 70 N/mil, or at least 75 N/mil, or at least 80 N/mil, or at least 85 N/mil; or from 65 to 150 N/mil, or from 65 to 130 N/mil, or from 65 to 115 N/mil, or from 70 to 105 N/mil, or from 75 to 95 N/mil, or from 77 to 90 N/mil, or from 80-85 N/mil.

In an embodiment, the heat-shrinkable film from which the packaging article is made exhibits an instrumented impact energy-to-break of from 0.70 to 1.5 J/mil using ASTM D 1822, or from 0.72 to 1.0 J/mil, or from 0.75 to 0.90 J/mil, or from 77 to 88 J/mil, or from 80 to 85 J/mil.

In an embodiment, the packaging article exhibits a Truburst strength of at least 8 psi/mil, measured in accordance with ASTM D3786; or at least 9 psi/mil, or at least 10 psi/mil. ASTM D3763 (more particularly, ASTMD3786-13) is hereby incorporated, in its entirety, by reference thereto. Truburst was carried out at an Inflation Rate of 5.08 psi per second with a Correction Rate of 0.58 psi.

Blends of incompatible polymers in one or more film layers can enhance the tear initiation, tear propagation, and linear tear properties of the film, including the ability to manually tear down the full length or across the full width of a package made from a packaging article comprising a multilayer packaging film which has been shrunk down around a product therein, i.e., post-shrink tearing through a seal and through and to an opposite edge of the package. For a package made from an end-seal bag, after sealing a product within the packaging article and shrinking the packaging article down around the product, a machine-direction tear can be manually initiated in the bag skirt, and the machine-direction tear can be manually propagated through the seal and down the length of the bag, for a distance up to the full length of the package, i.e., to that portion of the package that corresponds with the opposite edge of the package after the packaging article is used to make the package. For a package made from a side-seal bag, the machine direction tear can be manually initiated in a bag skirt, and the machine direction tear can be manually propagated through the skirt and through the associated heat seal, with the tear thereafter being propagated in the machine direction, across the full width of the package, i.e., to that portion of the package that corresponds with the opposite edge of the side-seal bag after the bag is used to make the package.

As used herein, the phrase "incompatible polymers" refers to two polymers (i.e., a blend of at least two polymers) that are incapable of forming a solution or even a stable two-phase blend, and that tend to separate after being mixed. When blended, incompatible polymers are not miscible with one another, and phase separate into a continuous domain and a discontinuous domain that may be finely dispersed. The presence of one or more film layers comprising a blend of incompatible polymers may assist, enhance, or even cause the linear tear property of the multilayer heat-shrinkable film used to make the heat-shrinkable bag.

In an embodiment, the incompatible polymer blend makes up at least 5 wt %, on a total film weight basis, or at least 10 wt %, or at least 15 wt %, or at least 20 wt %, or at least 20 wt %, or at least 25 wt %, or at least 30 wt %, or at least 35 wt %, or at least 40 wt %, or at least 45 wt %, or at least 50 wt %, or at least 55 wt % or at least 60 wt %, or at least 65 wt %, or at least 70 wt %, or at least 75 wt %, on a total film weight basis.

In an embodiment, the incompatible polymer blend makes up from 5 to 80 wt %, on a total film weight basis, or from 10 to 75 wt %, or from 15 to 70 wt %, or from 20 to 65 wt %, or from 25 to 60 wt %, or from 30 to 60 wt %, or from 35 to 55 wt %, or from 40 to 50 wt %, based on total film weight.

The blend of incompatible polymers comprises at least one blend selected from the group of (c)(i) through (c)(x) set forth above under the first aspect of the invention. In the (c)(i) blend above, the ethylene homopolymer and/or ethylene/alpha-olefin copolymer can be present in an amount of from 90-30, or 80-40, or 70-50 weight percent, based on total blend weight. The ethylene/unsaturated ester can be present in an amount of from 10-70, or 15-60, or 20-40 wt %, based on total blend weight. The ethylene/unsaturated ester copolymer can have an unsaturated ester content of at least 10 wt %, or at least 12 wt %, or at least 14 wt %, or at least 16 wt %, or at least 18 wt %, or at least 20 wt %, or at least 24 wt %, or at least 28 wt %, based on weight of ethylene/unsaturated ester copolymer; or from 12 to 35 wt %, or 14 to 30 wt %, or 15 to 30 wt %, or 15 to 25 wt %, based on weight of ethylene/unsaturated ester copolymer. If the incompatible polymer blend further comprises plastomer (which is an ethylene/alpha-olefin copolymer), the plastomer may be present in the blend in an amount of at least 2 wt % based on total blend weight, or at least 10 wt %, or at least 15 wt %, or from 2 to 40 wt %, based on total blend weight, or from 5 to 30 wt %, or from 10 to 20 wt %, based on total blend weight.

In the (c)(iv) blend above, the ethylene/unsaturated ester copolymer can be present in an amount of from 10 to 75 weight percent, 20 to 50 weight percent, or 25 to 40 weight percent, or 25 to 35 weight percent, based on combined weight of ethylene/unsaturated ester copolymer plus polypropylene and/or propylene/ethylene copolymer and/or polybutylene and/or modified ethylene/alpha-olefin copolymer, and/or styrene homopolymer, and/or styrene/butadiene copolymer. The polypropylene and/or propylene/ethylene copolymer and/or polybutylene and/or modified ethylene/alpha-olefin copolymer, and/or styrene homopolymer, and/or styrene/butadiene copolymer can be present in the blend in an amount of from 90 to 15 weight percent, or from 80 to 50 weight percent, or from 75 to 60 weight percent, or from 75 to 65 weight percent, based on total combined weight of ethylene/unsaturated ester copolymer plus polypropylene and/or propylene/ethylene copolymer and/or polybutylene and/or modified ethylene/alpha-olefin copolymer, and/or styrene homopolymer, and/or styrene/butadiene copolymer. If incompatible polymer blend (c)(iv) further comprises plastomer, the plastomer may be present in the blend in an amount of at least 2 wt % based on total blend weight, or at least 10 wt %, or at least 15 wt %, or from 2 to 40 wt %, based on total blend weight, or from 5 to 30 wt %, or from 10 to 20 wt %, based on total blend weight.

In the (c)(vi) blend above, the ethylene/alpha-olefin copolymer can be present in the blend in an amount of from 90 to 15 weight percent, based on combined weight of ethylene/alpha-olefin copolymer, polypropylene and/or polybutylene and/or ethylene/norbornene, or from 80 to 50 weight percent, or from 75 to 60 weight percent, or from 25 to 65 weight percent. The polypropylene and/or polybutylene and/or ethylene/norbornene may be present in the blend in an amount of from 10 to 85 weight percent, or from 20 to 50 weight percent, or from 25 to 40 weight percent, or from 25 to 35 weight percent, based on combined weight of ethylene/alpha-olefin copolymer, polypropylene and/or polybutylene and/or ethylene/norbornene. If incompatible polymer blend (c)(vi) further comprises plastomer (which is an ethylene/alpha-olefin copolymer), the plastomer may be present in the blend in an amount of at least 2 wt % based on total blend weight, or at least 10 wt %, or at least 15 wt %, or from 2 to 40 wt %, based on total blend weight, or from 5 to 30 wt %, or from 10 to 20 wt %, based on total blend weight.

In the (c)(vii) blend above, the homogeneous propylene homopolymer and/or homogeneous propylene copolymer can be present in the blend in an amount of from 90 to 25 weight percent, or 85 to 50 weight percent, or 80 to 60 weight percent, or 75 to 65 weight percent, based on combined weight of homogeneous propylene homopolymer and/or homogeneous propylene copolymer, homogeneous ethylene/alpha-olefin copolymer and/or ethylene/unsaturated ester copolymer. The homogeneous ethylene/alpha-olefin copolymer and/or ethylene/unsaturated ester copolymer can be preset in the blend in an amount of from 10 to 75 weight percent, or 15 to 50 weight percent, or 20 to 40 weight percent, or 25 to 35 weight percent, based on combined weight of homogeneous propylene homopolymer and/or homogeneous propylene copolymer, homogeneous ethylene/alpha-olefin copolymer and/or ethylene/unsaturated ester copolymer. If incompatible polymer blend (c)(vii) further comprises plastomer (which is an ethylene/alpha-olefin copolymer), the plastomer may be present in the blend in an amount of at least 2 wt % based on total blend weight, or at least 10 wt %, or at least 15 wt %, or from 2 to 40 wt %, based on total blend weight, or from 5 to 30 wt %, or from 10 to 20 wt %, based on total blend weight.

In one embodiment, the film comprises an incompatible blend of ethylene/alpha-olefin copolymer and ethylene/vinyl acetate copolymer having a vinyl acetate content of from 10 to 50 weight percent based on copolymer weight, the blend containing the ethylene/alpha-olefin copolymer in an amount of from 80 to 35 weight percent based on blend weight and ethylene/vinyl acetate copolymer in an amount of from 20 to 65 weight percent based on blend weight, with the multilayer film containing the blend in an amount of from 20 to 95 weight percent, based on the weight of the multilayer film, wherein the multilayer film has been biaxially oriented in the solid state and has a total free shrink, as measured by ASTM D 2732, of from 15 percent to 120 percent at 85° C.

In another embodiment the film can comprises an incompatible blend of ethylene/alpha-olefin copolymer and ethylene/vinyl acetate copolymer having a vinyl acetate content of from 10 to 30 weight percent based on copolymer weight, the blend containing the ethylene/alpha-olefin copolymer in an amount of from 75 to 45 weight percent based on blend weight and ethylene/vinyl acetate copolymer in an amount of from 25 to 55 weight percent based on blend weight, with the multilayer film containing the blend in an amount of from 30 to 70 weight percent, based on the weight of the multilayer film, wherein the multilayer film has been biaxially oriented in the solid state and has a total free shrink, as measured by ASTM D 2732, of from 20 percent to 105 percent at 85° C.

In another embodiment, the film can comprise an incompatible blend of ethylene/alpha-olefin copolymer and ethylene/vinyl acetate copolymer having a vinyl acetate content of from 12 to 30 weight percent, the blend containing the ethylene/alpha-olefin copolymer in an amount of from 70 to 50 percent based on blend weight and ethylene/vinyl acetate copolymer in an amount of from 30 to 50 weight percent based on blend weight, the multilayer film containing the blend in an amount of from 30 to 70 weight percent, based on the weight of the multilayer film, and wherein the multilayer film has been biaxially oriented in the solid state and has a total free shrink, as measured by ASTM D 2732, of from 40 percent to 100 percent at 85° C. The shrinking is carried out by immersion in hot water, such as water at 85° C., for a period of 5 seconds.

If any one or more of the incompatible blends comprises an ethylene/alpha-olefin copolymer, the ethylene/alpha-olefin copolymer can comprise at least one member selected from the group consisting of: (i) ethylene/hexene copolymer having a density of from about 0.90 g/cc to about 0.925 g/cc, and (ii) ethylene/octene copolymer having a density of from about 0.90 g/cc to about 0.925 g/cc.

Other blends of incompatible polymers that may be used include the following: (i) a blend of 50 weight percent cyclic olefin copolymer with 50 weight percent propylene homopolymer; (ii) a blend of 70 wt % polystyrene with 30 wt % ethylene/vinyl acetate copolymer having a vinyl acetate content of 9 to 15 wt %; (iii) a blend of 70 wt % very low density polyethylene and 30 wt % cyclic olefin copolymer; (iv) a blend of 70 weight percent ethylene/propylene copolymer and 30 weight percent homogeneous ethylene/alpha-olefin copolymer; (v) a blend of 70 weight percent ethylene/propylene copolymer and 30 wt. percent ethylene/vinyl acetate copolymer having a vinyl acetate content of 9 percent or 15 percent; (vi) a blend of 70 weight percent ethylene/propylene copolymer and 30 weight percent ethylene/methyl acrylate copolymer; (vii) a blend of 70 weight percent polystyrene with 30 weight percent amorphous nylon; (viii) a blend of 70 weight percent ionomer resin with 30 weight percent ethylene/vinyl acetate copolymer having a vinyl acetate content of 4 percent; (ix) a blend of 70 weight percent polyamide with 30 weight percent low density polyethylene; (x) a blend of 65 weight percent amorphous polyamide with 35% styrene/butadiene/styrene block copolymer.

The tear initiation, tear propagation, and linear tear property of a multilayer heat-shrinkable film may also be enhanced by providing one or more layers of the film with a filler material, such as an inorganic filler. Polymeric systems that incorporate high filler concentrations may also enhance linear tear behavior. Depending on the particle size and dispersion, a filler concentration as low as 5 weight percent filler (i.e., based on total layer weight) in ethylene/alpha-olefin copolymer, polypropylene, propylene/ethylene copolymer, polybutylene, polystyrene/butadiene copolymer, ionomer resin, ethylene/vinyl acetate copolymer, ethylene/butyl acrylate copolymer, ethylene/methyl acrylate copolymer, ethylene/acrylic acid copolymer, polyester, polyamide, etc., may contribute to the linear tear behavior. More particularly, the presence of filler in an amount of from 5 to 95 weight percent, or in an amount of from 5 to 50 weight percent, or in an amount of from 10 to 40 weight percent, or from 20 to 35 weight percent, may be used.

Suitable fillers include silicates (particularly sodium silicate, potassium silicate, and aluminum silicate, alkali alumino silicate), silica (particularly amorphous silica), siloxane, silicone resin, zinc sulfide, wollastonite, microspheres, glass fiber, metal oxide (particularly oxides of titanium, zinc, antimony, magnesium, iron, and aluminum), calcium carbonate, sulfate (particularly barium sulfate and calcium sulfate), aluminum trihydrate, feldspar, perlite, gypsum, iron, fluoropolymer, crosslinked polymethylmethacrylate, talc, diatomaceous earth, zeolites, mica, kaolin, carbon black, and graphite.

The filler concentration required to achieve low tear initiation force is dependent on particle geometry, particle size, particle aspect ratio, and compatibility of the filler and the polymer matrix. Some fillers are chemically treated to improve the compatibility of the particle and the polymer into which it is dispersed.

The tear initiation, tear propagation, and linear tear property of a multilayer heat-shrinkable film may also be enhanced by providing one or more layers of the film with a polymer that provides the film with a relatively high Young's modulus, e.g., a polymer having a Young's modulus of at least 80,000 psi. Such polymers can comprise at least one member selected from the group consisting of high density polyethylene, ultra high molecular weight polyethylene, polypropylene (particularly propylene homopolymer), styrene copolymer (particularly styrene/butadiene block copolymer), ethylene/norbornene copolymer, polycarbonate, and polyester. The multilayer heat-shrinkable film may have a Young's Modulus of at least 80,000 psi. Young's modulus may be measured in accordance with one or more of the following ASTM procedures: D638, D882; D5026-95a; D4065-89, each of which is incorporated herein in its entirety by reference. The film may have a Young's modulus of at least about, and/or at most about, any of the following: 100,000; 130,000; 150,000; 200,000; 250,000; 300,000; 350,000; and 400,000 pounds/square inch, measured at a temperature of 73° F. The film may have any of the forgoing ranges of Young's modulus in at least one direction (e.g., in the machine direction or in the transverse direction) or in both directions (i.e., the machine (i.e., longitudinal) and the transverse directions).

Figure 2:
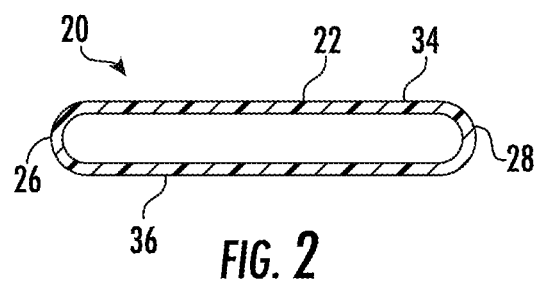
FIG. 2 is a transverse cross-sectional view of the heat-shrinkable, end-seal bag of FIG. 1, taken through section 2-2 in FIG. 1A.

FIGS. 1A and 2 together illustrate a schematic of end-seal bag 20, in a lay-flat position. End-seal bag 20 can be made from a seamless film tubing. FIG. 2 is a transverse cross-sectional view of end-seal bag 20 of FIG. 1A, taken through section 2-2 of FIG. 1A. Viewing FIGS. 1A and 2 together, end-seal bag 12 comprises heat-shrinkable bag film 22, bag top edge 24 defining an open top, folded first side edge 26, folded second side edge 28, bottom edge 30, and end seal 32. End seal 32 is commonly referred to as a "factory seal" because it is a seal made at the bagmaking factory, rather than at the site where the bag is used to package a product. End-seal bag 32 further has first lay-flat side 34, second lay-flat side 36, and bag skirt 38. Bag skirt 38 is outward of end seal 32 (i.e., "outward" in that bag skirt 38 is further from the center of end-seal bag 20, and exterior of the product-containing cavity within end-seal bag 20). Bag skirt 38 includes a portion of first lay-flat side 34 and a portion of second lay-flat side 36. Bag skirt 38 further comprises first tear initiator 40 in first lay-flat side 34, and second tear initiator 42 (illustrated by a dashed line because it is underneath first lay-flat side 34) in second lay-flat side 36.

Figure 1B:
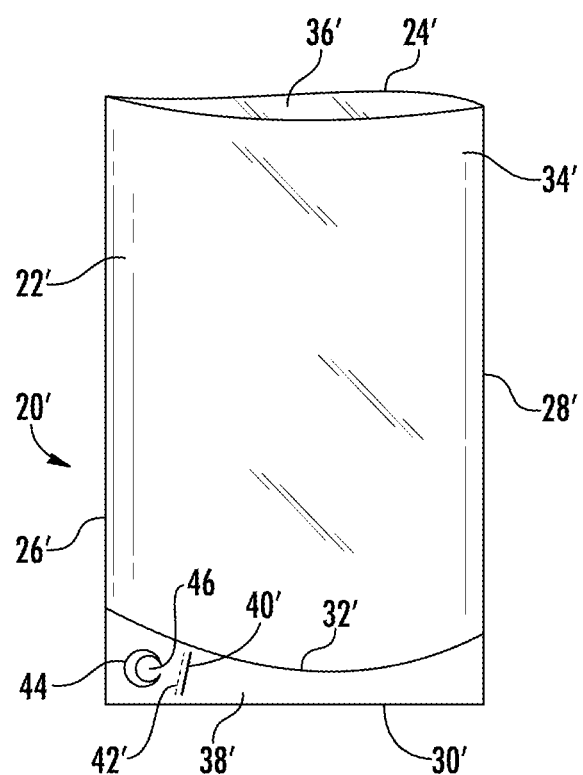
FIG. 1B is a schematic of an alternative heat-shrinkable, end-seal bag in lay-flat configuration.

FIG. 1B illustrates a schematic of an alternative end-seal bag 20', in a lay-flat position. End-seal bag 20' can be made from a seamless film tubing. End-seal bag 20' comprises heat-shrinkable bag film 22', bag top edge 24' defining an open top, folded first side edge 26', folded second side edge 28', bottom edge 30', and curved end seal 32'. End-seal bag 20' further has first lay-flat side 34', second lay-flat side 36', and bag skirt 38'. Bag skirt 38' is outward of curved end seal 32'. Bag skirt 38' comprises first tear initiator 40' in first lay-flat side 34', and second tear initiator 42' (illustrated by a dashed line because it is underneath first lay-flat side 34') in second lay-flat side 36'. Both first tear-initiator 40' and second tear initiator 42' are slits through the bag that do not extend to either curved end seal 32' or bag bottom edge 30'. End seal bag 20' also has grip assist hole 44 in first lay-flat side 34' and second grip assist hole (not illustrated) in second lay-flat side 36'. These grip-assist holes facilitate gripping the bag for the manual tear initiation and manual tear propagation.

Grip assist holes can be sized to allow a user's finger(s) to be inserted therethrough to assist in gripping the film. Grip assist holes work in conjunction with the tear initiators, by providing a secure manual grip of the bag in a location designed to assist in generating tear initiation force along a tear line emanating from the tear initiators.

The grip assist hole in a first lay-flat side of the packaging article can overlap or coincide with the grip assist hole in a second lay-flat side of the packaging article. While grip assist holes can have any desired shape (e.g., round, rectangular, square, triangular, pentagonal, hexagonal, etc.), preferably the holes are round, or any "corners" on the holes are rounded, to reduce the presence of stress concentration points that could cause a tear to initiate from the grip assist hole, as an objective is to have the tear initiated from the tear initiator, with the tear running to an opposite side edge of the bag.

In one embodiment, the grip-assist holes can be made by cutting through both lay-flat sides of the packaging article to remove a piece of film to form the holes. However, this process is more difficult to carry out, and it produces small, loose pieces of film corresponding with the size of the cut hole. These pieces of film may lodge inside the packaging article and thereafter adhere to a food product placed in the packaging article. In order to prevent the production of small, loose pieces of film, a cut can be made in the film in a shape that corresponds with a "partial hole cut", i.e., a cut through the film to make a portion of the hole, the cut not being complete so that a hole is formed. Such a cut leaves a "hanging chad" so that no separated small pieces of film are produced by the cut.

Figure 1C:
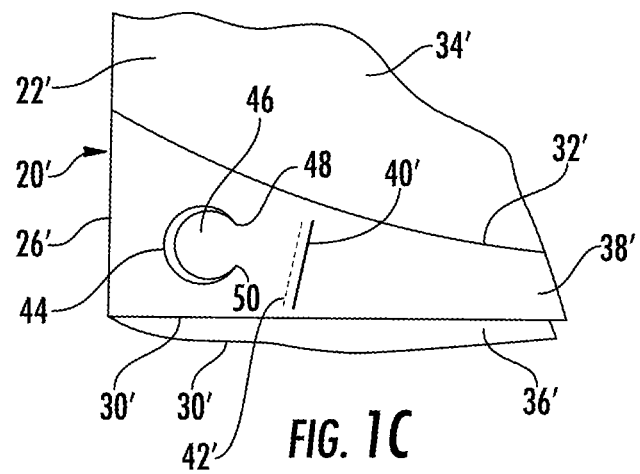
FIG. 1C is an enlarged, detailed view of a portion of the bag of FIG. 1B.

FIG. 1B and FIG. 1C each illustrate hanging chad 46 formed by the partial hole cut made in bag 20'. As illustrated in FIG. 1C, hanging chad 36 is formed by a cut having endpoints 48 and 50. It has been found that leaving hanging chad 46 connected to film 22' by a film portion which is between connecting cut endpoints 48 and 50 results in a tear emanating from tear initiation cuts 40' and 42', with the tear running through seal 32' and through the length of bag 22'.

Hanging chad 46 can be made so that it is connected to film 22' at a region oriented towards tear initiation cuts 40' and 42', as illustrated in FIG. 1B and FIG. 1C. The cut that forms hanging chad 46 can have endpoints that, if connected by a line, provide a line that is parallel to side edge 26' and/or parallel to tear initiation cuts 40' and 42', or by a line within plus or minus 30 degrees of being parallel to side edge 26' and/or tear initiation cuts 40' and 42', or by a line within plus or minus 25 degrees of being parallel to side edge 26' and/or tear initiation cuts 40' and 42', or by a line within plus or minus 20 degrees of being parallel to side edge 26' and/or tear initiation cuts 40' and 42', or by a line within plus or minus 15 degrees of being parallel to side edge 26' and/or tear initiation cuts 40' and 42', or by a line within plus or minus 10 degrees of being parallel to side edge 26' and/or tear initiation cuts 40' and 42', or by a line within plus or minus 5 degrees of being parallel to side edge 26' and/or tear initiation cuts 40' and 42', or by a line within plus or minus 3 degrees of being parallel to side edge 26' and/or tear initiation cuts 40' and 42', or by a line within plus or minus 2 degrees of side edge 26' and/or tear initiation cuts 40' and 42'.

Figure 3:
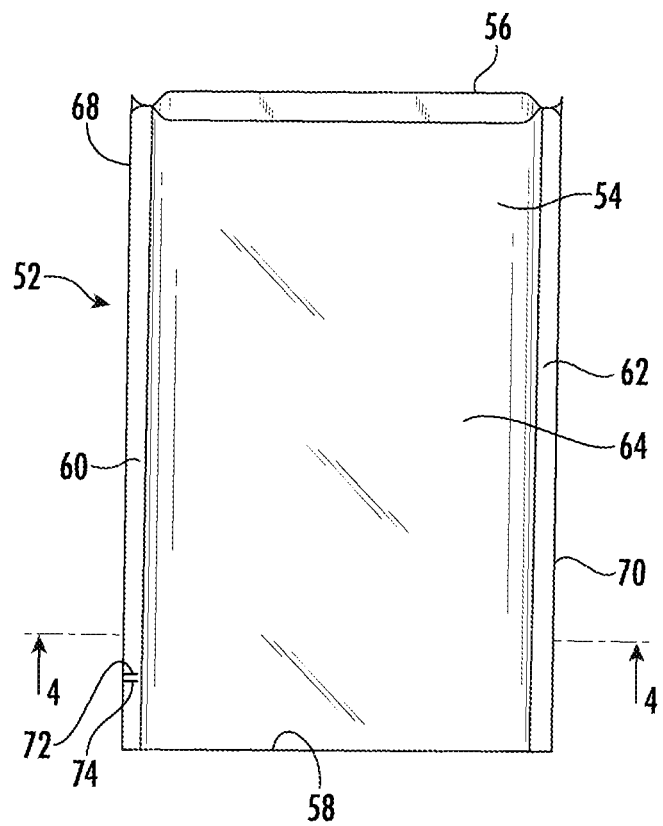
FIG. 3 is a schematic of a heat-shrinkable, side-seal bag in lay-flat configuration.
Figure 4:
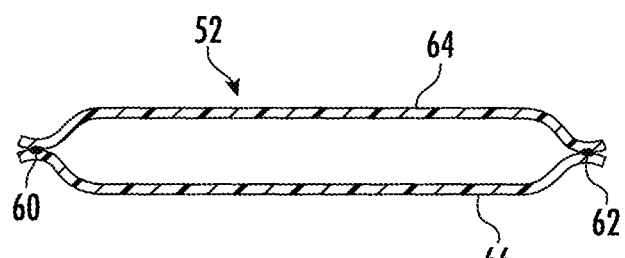
FIG. 4 is a transverse cross-sectional view of the heat-shrinkable, side-seal bag of FIG. 3, taken through section 4-4 in FIG. 3.

FIGS. 3 and 4 together illustrate a schematic of side-seal bag 52, in a lay-flat position. Side-seal bag 52 can be made from a seamless film tubing. FIG. 4 is a transverse cross-sectional view of side-seal bag 52 of FIG. 3, taken through section 4-4 of FIG. 3. Side-seal bag 52 comprises heat-shrinkable bag film 54, top edge 56 defining an open top, folded bottom edge 58, first side seal 60, and second side seal 62. Side-seal bag 52 has first lay-flat side 64, second lay-flat side 66, first bag skirt 68, and second bag skirt 70. First bag skirt 68 is outward of first side seal 60 and second bag skirt 70 is outward of second side seal 62. First bag skirt 68 includes a portion of first lay-flat side 64 and a portion of second lay-flat side 66. First bag skirt 68 further comprises first tear initiator 72 in first lay-flat side 64, and second tear-initiator 74 in second lay-flat side 66.

Figure 5:
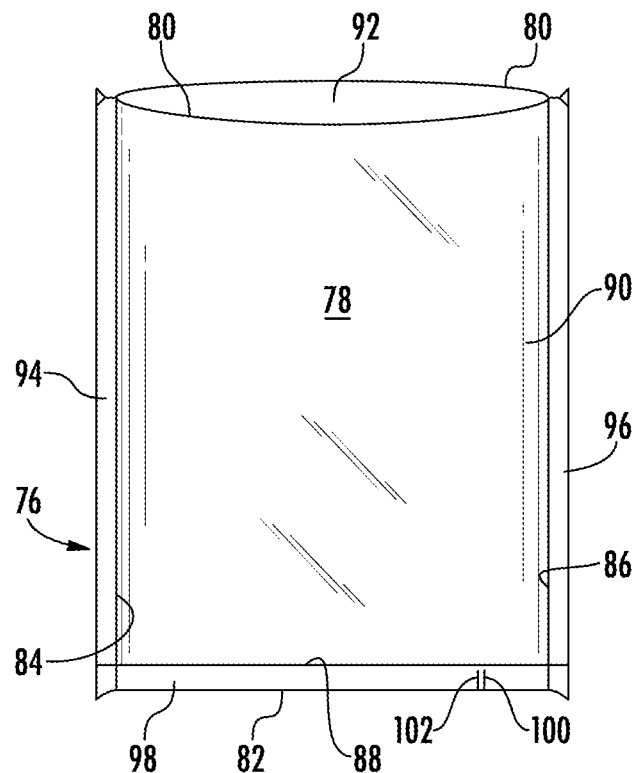
FIG. 5 is a schematic of a second heat-shrinkable, side-seal bag in lay-flat configuration.
Figure 6:
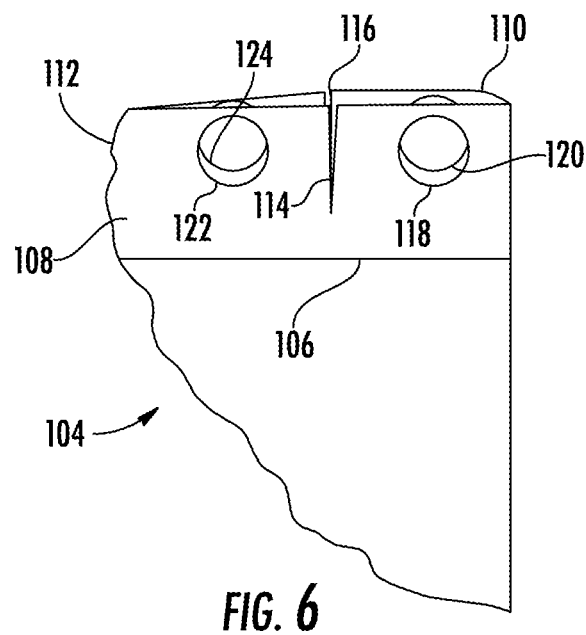
FIG. 6 is an enlarged detailed view of the tear initiation feature of the bag of FIG. 1A, with the addition of a pair of grip assisters.

FIG. 5 illustrates a schematic of alternate side-seal bag 76, also in lay-flat position. Alternate side-seal bag 76 can be made from a seamless film tubing. Alternate side-seal bag 76 comprises heat-shrinkable bag film 78, top edge 80 defining an open top, folded bottom edge 82, first side seal 84, second side seal 86, and bottom seal 88. Alternate side-seal bag 76 has first lay-flat side 90, second lay-flat side 92, first bag skirt 94, second bag skirt 96, and third bag skirt 98. First bag skirt 94 is outward of first side seal 84. Second bag skirt 96 is outward of second side seal 86. Third bag skirt 98 is outward of bottom seal 88. First bag skirt 94 includes a portion of first lay-flat side 90 and a portion of second lay-flat side 92. First bag skirt 94 further comprises first tear initiator 100 in first lay-flat side 90, and second tear initiator 102 (illustrated by a dashed line because it is underneath first lay-flat side 90) in second lay-flat side 92.

It has been found that tear initiation can be generated with less force if the tear initiator is a slit angled relative to the side edge of the packaging article, i.e., into the packaging article, as illustrated in, for example, FIG. 1B. The slit can be angled from 1 to 45 degrees off of the machine direction, or angled from 3 to 30 degrees, or angled from 5 to 25 degrees, or angled from 10 to 20 degrees, or angled about 15 degrees.

A plurality of the heat-shrinkable end-seal bags of can be supplied individually in a container, or as a set of individual bags in shingled relationship on one or more tapes in accordance with U.S. Pat. No. 4,113,139, hereby incorporated, in its entirety, by reference thereto.

Figure 7:
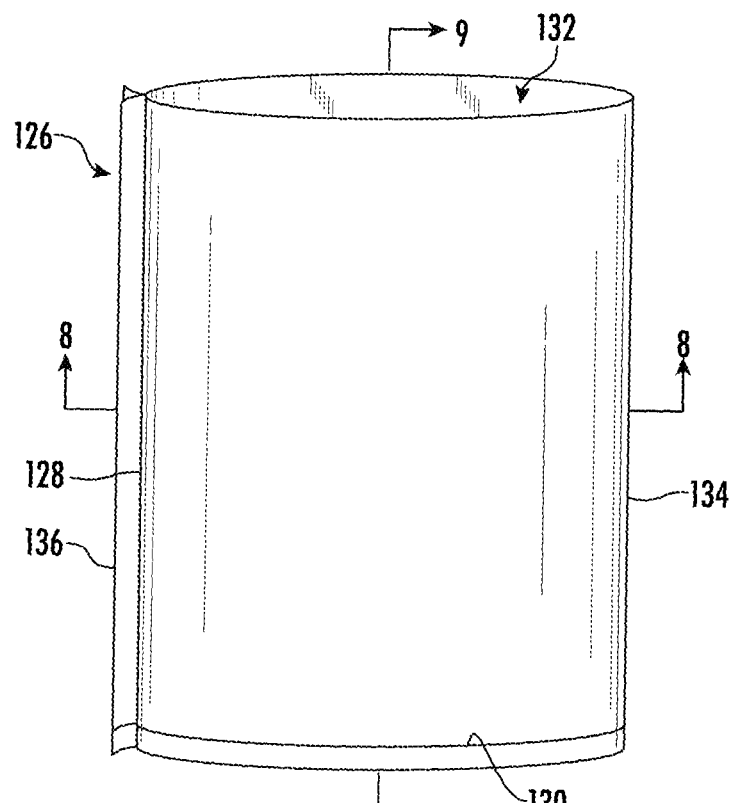
FIG. 7 is a schematic plan view of an L-seal bag.
Figure 8:
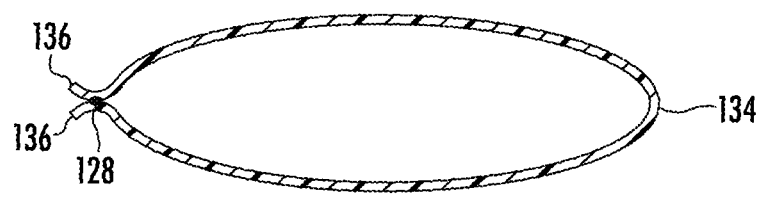
FIG. 8 is a transverse cross-sectional view of the L-seal bag of FIG. 7, taken through section 8-8 of FIG. 7.

FIG. 7 is a lay-flat view of L-seal bag 126, in a lay-flat position. FIG. 8 is a transverse cross-sectional view of L-seal bag 126, taken through section 8-8 of FIG. 7. FIG. 9 is a longitudinal cross-sectional view of L-seal bag 126 taken through section 9-9 of FIG. 7. Viewing FIGS. 7, 8, and 9 together, L-seal bag 126 has side-seal 128, bottom seal 130, open top 132, seamless folded bag side edge 134, and side edge 136 in a skirt outward of side seal 128.

Figure 10:
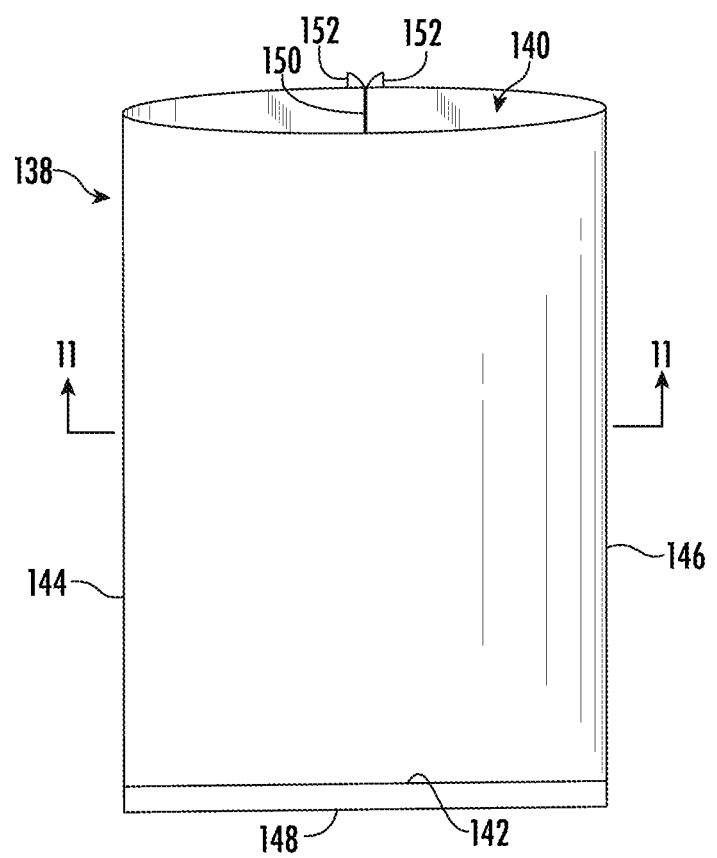
FIG. 10 is a schematic plan view of a backseamed bag having a fin-type backseam.
Figure 11:
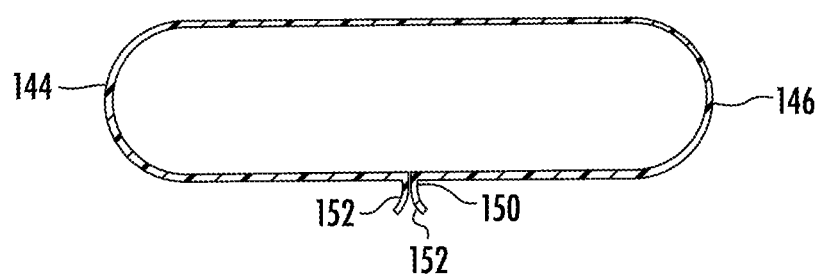
FIG. 11 is a transverse cross-sectional view of the backseamed bag of FIG. 10.

The fin-seal backseamed bag 138 of FIGS. 10 and 11 has open top 140, bottom seal 142, first folded side edge 144, second folded side edge 146, bottom edge 148, backseam seal 150 (inside film layer heat sealed to itself), and backseam fins 152.

Figure 12:
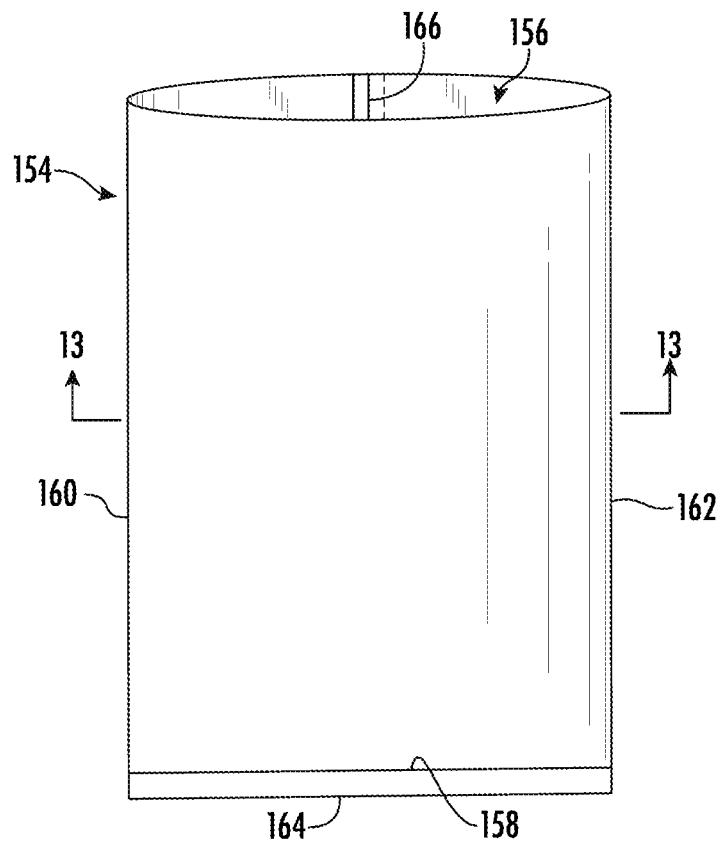
FIG. 12 is a schematic plan view of a backseamed bag having a lap-type backseam.
Figure 13:
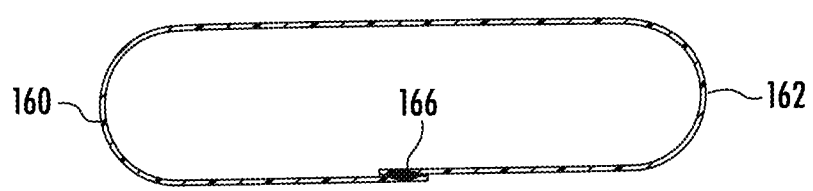
FIG. 13 is a transverse cross-sectional view of the backseamed bag of FIG. 12, taken through section 13-13 of FIG. 12.

The lap-seal backseamed bag 154 of FIGS. 12 and 13 has open top 156, bottom seal 158, first folded side edge 160, second folded side edge 162, bottom edge 164, and backseam seal 166 (inside film layer heat sealed to outside film layer).

Figure 14:
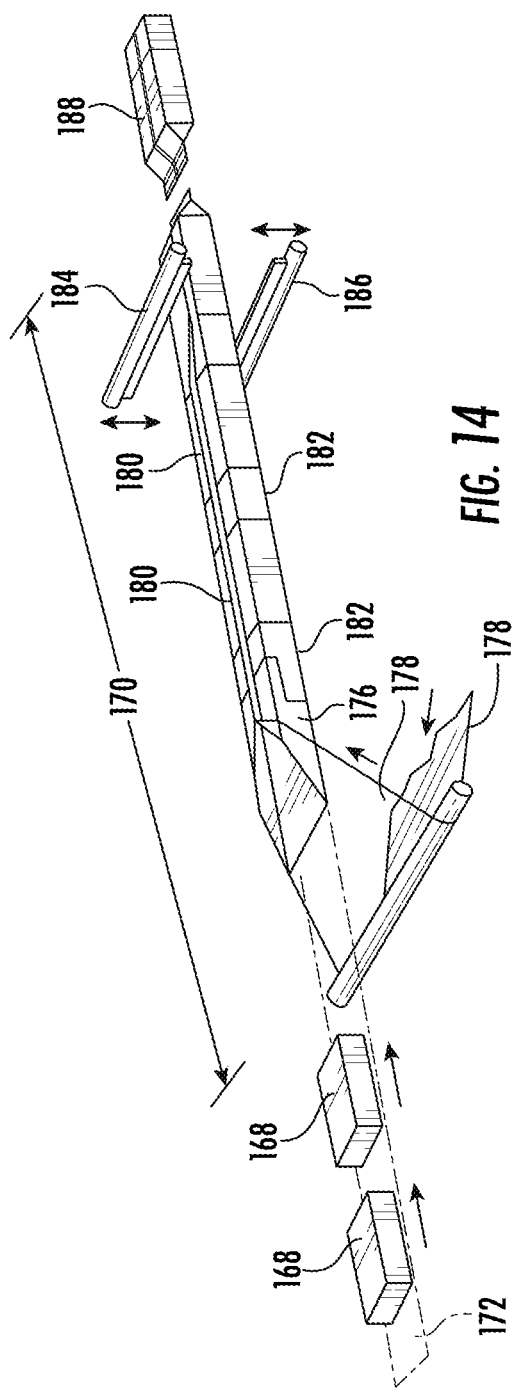
FIG. 14 is a schematic of a horizontal flow wrap process for packaging products using a packaging article in accordance with, for example, any of the embodiments illustrated in FIGS. 10-13.

FIG. 14 illustrates the use of a strand 178 of heat-shrinkable film to package products 168 in packaging articles such as are illustrated in FIGS. 10-13, described above. The process illustrated in FIG. 14 is a type of horizontal form fill and seal process known in the packaging art as a "flow wrap" process. The process of FIG. 14 utilizes a continuous roll (not illustrated) of flat film to package a product in a packaging article as illustrated in FIGS. 10-13, rather than the bags or pouches as illustrated in FIGS. 1-9.

Although the process of FIG. 14 is at least theoretically capable of being run continuously, in actual use the process is intermittent, with different packagers having different frequency and duration of process interruption. The process of FIG. 14 does not produce a fully closed package. Rather, the product of the packaging operation illustrated in FIG. 14 results in a product inside the open packaging article illustrated in FIGS. 10-13 (described above), with the product inside the open packaging article being forwarded downstream to further machinery (described below) for completion of the packaging process.

In FIG. 14, products 168 are fed to packaging machine 170 via conveyor 172. Although product 168 can be any product to be packaged, a preferred product is a meat product, such as a roast, steak, chops, ribs, etc. Each product 168 can be an individual piece of meat or a set comprising a plurality of pieces of meat.

Conveyor 172 terminates as the input end of forming horn 176. Product 168 is pushed into forming horn 176 by a pusher (not illustrated). Product 168 is pushed onto the upper surface of continuous strand of film 178 as product 172 is pushed into and through forming horn 176. Continuous strand of film 178 (supplied from a roll of film, not illustrated) is forwarded into, through, and past forming horn 176 as a continuous stream of products 168 are individually pushed into forming horn 176. Once on film 178, products 168 are forwarded through forming horn 176 by the forwarding of strand of film 178, i.e., at the same speed that film 178 passes into, through, and beyond forming horn 176. Once on film 178, the forwarding of film 178 forwards products 68 therewith.

Film 178 is folded as it passes through forming horn 176, so that as product 168 emerges from forming horn 176, film 178 is folded around product 168, with product 168 now being inside a tube 182 of film 178. Above forming shoe 176, the edges of film 178 are folded upward and a sealing apparatus (not illustrated) forms a continuous fin-type heat seal 180 along the upwardly folded longitudinal edges of film 178. The heat seal can be formed using, for example, three sets of seal heads, i.e., three sets of heat sealing nip rollers. The first set (upstream) of heat sealing nip rollers can have a temperature of 65° C. The second set (middle) of heat sealing nip rollers can have a temperature of 90° C. The third set (downstream) of heat sealing nip rollers can have a temperature of 150° C. The head pressure of the seal heads was 2 bar. The web speed was 17.2 meters per minute. During the formation of backseam heat seal 180, film 178 surrounding products 168 is forwarded by a second conveyor (not illustrated) on which film 178 and products 168 rest.

During process interruption in which the flow of products is temporarily halted, the seal heads are pulled away from the film so that the film is not burned by a long period of contact with the hot seal heads. Upon resumption of the process, seal heads are reapplied to the film and the backseaming is continued. Of course, it is desirable that the package be provided with a strong backseam seal even if a portion of the backseam seal was made before process interruption and a portion of the backseam seal was made after process resumption. It is desirable that such a package exhibit a burst strength at least 95 percent as high as the burst strength of a package made from the same film but in which the backseam seal was continuously produced, i.e., without interruption. Alternatively, the package having a backseam with portions made before and after process interruption can have a burst strength of at least 90 percent, or at least 85 percent, or at least 80 percent, or at least 75 percent as high as the burst strength of a corresponding package in which the backseam was continuously produced, i.e., without interruption.

The stream of products 168 inside now sealed film tubing 182 is forwarded to a transverse sealer and cutter including upper sealer/cutter member 184 and lower sealer/cutter member 186, which work together to make transverse seals between products 168, and to cut film tubing 182 apart to produce individual packaged products 188. The temperatures for each of the two transverse seal bars in members 184 and 186 may be, for example, 105° C. and 105° C., with the seal bar dwell time being, for example, 350 milliseconds. Upper and lower sealer/cutter bars 184, 186 oscillate upward and downward as film tubing 182 is forwarded. Upon being sealed on the downstream end and cut free of the backseamed film tubing, the result is partially packaged product 188 having a backseam down its length, a closed bottom seal, and an open top end, as illustrated in FIGS. 10-13, described above.

Upon exiting packaging machine 170, partially packaged products 188 are forwarded to a vacuum chamber machine in which atmosphere is evacuated from inside the package and the open end of the package is heat sealed closed, so that the product is completely surrounded by the heat shrinkable packaging article. The resulting evacuated, closed packaged product is thereafter forwarded to a shrink machine in which the film is shrunk against the product by passing the evacuated, closed packaged product through a hot air tunnel or by immersing the evacuated, closed packaged product in a bath of hot water.

The process of FIG. 14 is but one embodiment of the manner in which the film can be used. The process of FIG. 14 is called "flow wrap" and is a type of process known in the art as "horizontal form fill and seal." When used in conjunction with downstream vacuum packaging, it is referred to as a "flow vac process." The film can also be used in vertical form fill and seal packaging, as described in U.S. Pat. No. 5,491,019, to Kuo, which is hereby incorporated, in its entirety, by reference thereto.

Figure 15:
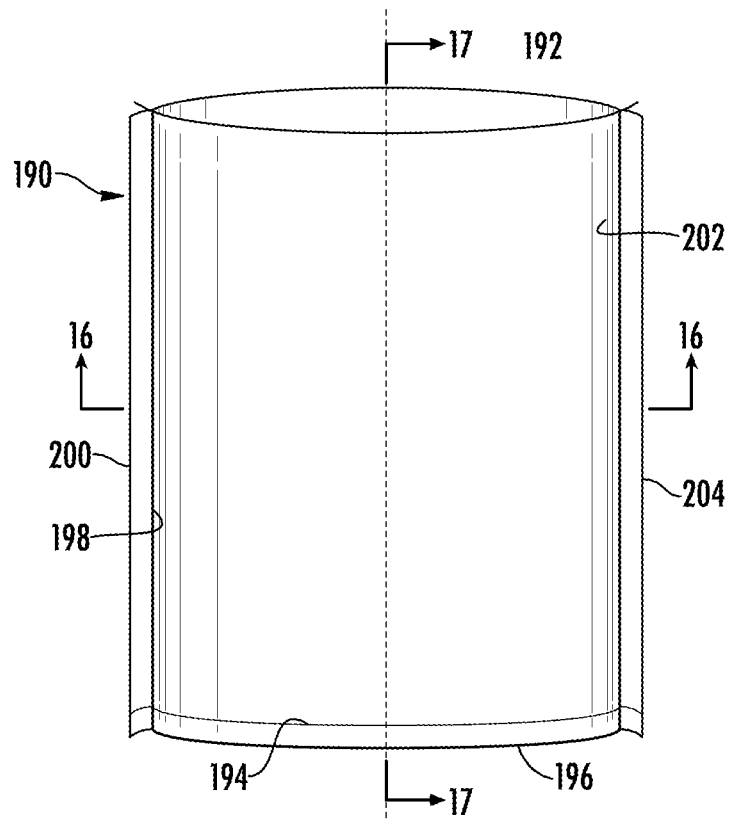
FIG. 15 is a schematic plan view of a pouch-type bag.
Figure 16:
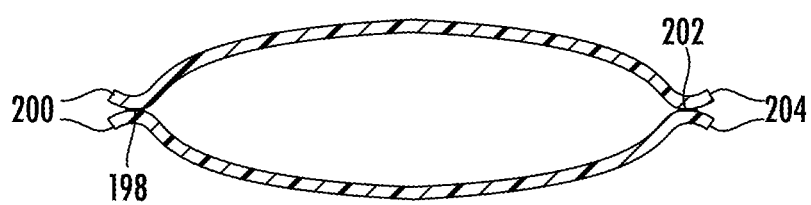
FIG. 16 is a transverse cross-sectional view of the pouch-type bag of FIG. 15, taken through section 16-16 of FIG. 15.
Figure 17:
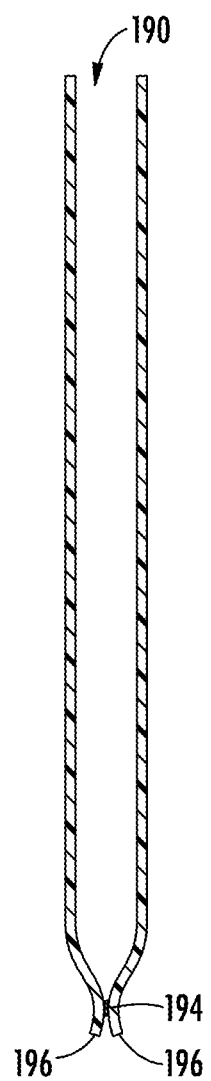
FIG. 17 is a longitudinal cross-sectional view of the pouch-type bag of FIG. 15, taken through section 17-17 of FIG. 15.

FIGS. 15, 16, and 17 illustrate a pouch-type bag 190 made from sealing two separate pieces of flat film together. In FIGS. 15, 16, and 17, pouch 190 has open top 192, bottom heat seal 194 and bottom edge 196, first side seal 198 and first side edge 200, second side seal 202 and second side edge 204. Together, first and second side seals 198 and 200 connect with bottom seal 194 to form a "U-shaped" seal connecting the two pieces of flat film together to form the pouch-type bag 190.

Figure 18:
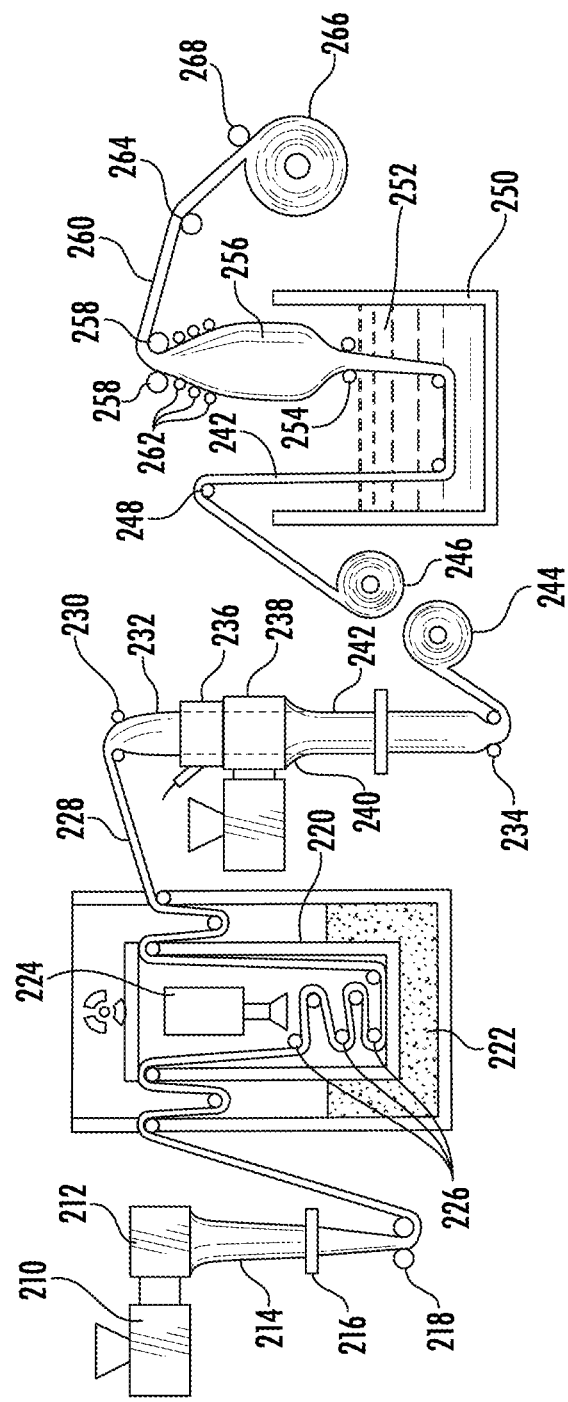
FIG. 18 is a schematic view of the process used to make a heat-shrinkable film for use in the packaging article.

FIG. 18 illustrates a schematic of a preferred process for producing the multilayer heat-shrinkable film from which the packaging article can be made. In the process illustrated in FIG. 8, solid polymer beads (not illustrated) are fed to a plurality of extruders 210 (for simplicity, only one extruder is illustrated). Inside extruders 210, the polymer beads are forwarded, melted, and degassed, following which the resulting bubble-free melt is forwarded into die head 212, and extruded through an annular die, resulting in substrate tubing 214.

After cooling or quenching by water spray from cooling ring 216, tubing 214 is collapsed by pinch rolls 218, and is thereafter fed through irradiation vault 220 surrounded by shielding 222, where tubing 214 is irradiated with high energy electrons (i.e., ionizing radiation) from iron core transformer accelerator 224. Tubing 214 is guided through irradiation vault 220 on rolls 226. Preferably, tubing 214 is irradiated to a level of about 6.4 megarads (i.e., 64 kilograys, kGy).

After irradiation, irradiated tubing 228 is directed through nip rolls 230, following which tubing 228 is slightly inflated, resulting in trapped bubble 232. However, at trapped bubble 232, the tubing is not significantly drawn longitudinally, as the surface speed of nip rolls 234 are about the same speed as nip rolls 230. Furthermore, irradiated tubing 228 is inflated only enough to provide a substantially circular tubing without significant transverse orientation, i.e., without stretching.

Slightly inflated, irradiated tubing 232 is passed through vacuum chamber 236, and thereafter forwarded through coating die 238. Second tubular film 240 is melt extruded from coating die 238 and coated onto slightly inflated, irradiated tube 232, to form two-ply tubular film 242. Second tubular film 240 preferably comprises an $O_2$-barrier layer, which does not pass through the ionizing radiation.

The combined substrate and coating may have a thickness, before orientation, of from 10 to 30 mils, or from 15 to 25 mils. The substrate may have a thickness, before orientation, of from 6 to 18 mils, or from 9 to 15 mils. The coating may have a thickness, before orientation, of from 4 to 12 mils, or from 6 to 10 mils.

Further details of the above-described coating step are generally as set forth in U.S. Pat. No. 4,278,738, to BRAX et. al., which is hereby incorporated, in its entirety, by reference thereto.

After irradiation and coating, two-ply tubing film 252 may optionally be wound up onto windup roll 244, and thereafter installed as unwind roll 246, on a second stage in the process of making the tubing film as ultimately desired. Two-ply tubular film 242, from unwind roll 246, is unwound and passed over guide roll 248, after which two-ply tubular film 242 passes into hot water bath tank 250 containing hot water 252. [Alternatively, though not illustrated, the process can be uninterrupted by forwarding two-ply tubing film into hot water bath tank 250.] The now collapsed, irradiated, coated tubular film 242 is submersed in hot water 252 (having a temperature of about 210° F.) for a retention time of at least about 5 seconds, i.e., for a time period in order to bring irradiated tubular film 242 up to a desired softening temperature for biaxial orientation while irradiated tubular film 242 is in the solid state. Thereafter, irradiated tubular film 242 is directed through nip rolls 254, and bubble 256 is blown, thereby transversely stretching tubular film 242. Furthermore, while being blown, i.e., transversely stretched, nip rolls 258 draw tubular film 242 in the longitudinal direction, as nip rolls 258 have a surface speed higher than the surface speed of nip rolls 254.

As a result of the transverse stretching and longitudinal drawing, irradiated, coated biaxially-oriented blown tubing film 260 is produced, this blown tubing preferably having been both stretched in a ratio of from about 1:1.5-1:6, and drawn in a ratio of from about 1:1.5-1:6. More preferably, the stretching and drawing are each performed a ratio of from about 1:2-1:4. The result is a biaxial orientation of from about 1:2.25-1:36, more preferably, 1:4-1:16. While bubble 256 is maintained between pinch rolls 254 and 258, stretched tubing film 260 is collapsed by rolls 262, and thereafter conveyed through nip rolls 258 and across guide roll 264, and then rolled onto wind-up roll 266. Idler roll 268 assures a good wind-up. The resulting heat-shrinkable film tubing 170 can be used to make the packaging articles described herein.

FIG. 19 illustrates a perspective view of package 270 made by placing a meat product into an end-seal bag having end seal 272, evacuating the atmosphere from within the bag, and sealing the bag closed with packing seal 280, and thereafter trimming off and discarding the excess bag length. Bag skirt 274 has slit 276 therein as the tear initiators for initiating manual opening of package 270. Slit 276 extends in the machine direction, toward end seal 272 from bag bottom edge 278.

Figure 20:
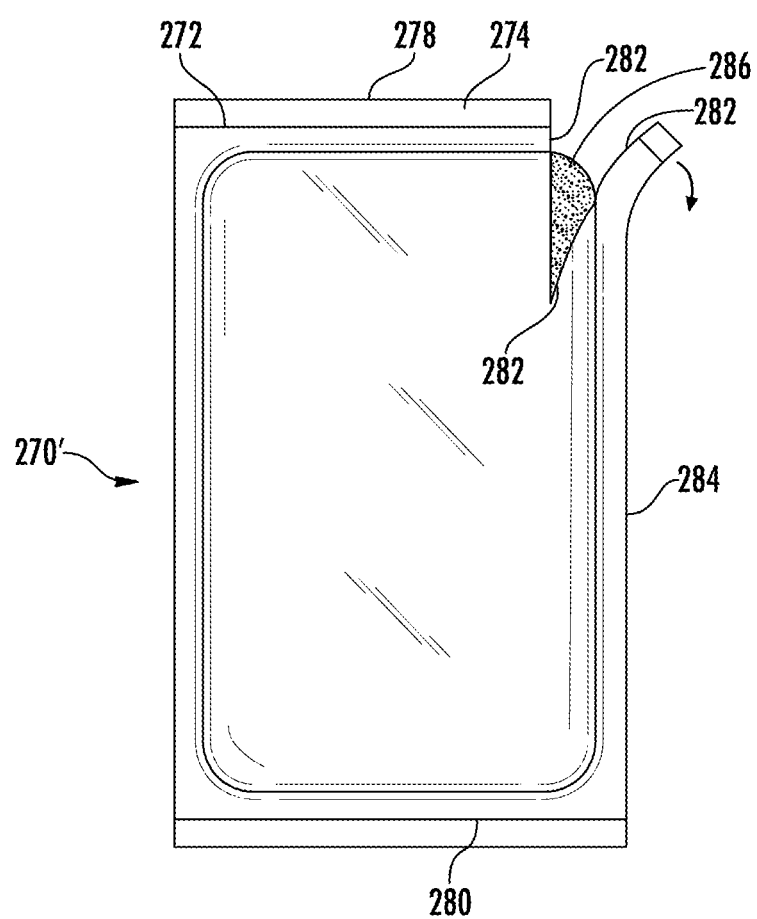
FIG. 20 is a schematic of the packaged product of FIG. 19 after the tearing has been initiated, but as the tearing remains in an intermediate state, the tearing proceeding down the bag film in the machine direction.

FIG. 20 illustrates package 270' at an intermediate stage of the manual opening process, i.e., after having initiated tearing of the bag for a distance of about 25% of the length of the bag, revealing meat product 286. Linear, machine-direction tear 282 has been manually propagated through end seal 272 and down the length of package 270' which was made from an end-seal bag. Note that machine direction tear 282 is not terminated by being propagated to side edge 284 of package 270'.

Figure 21:
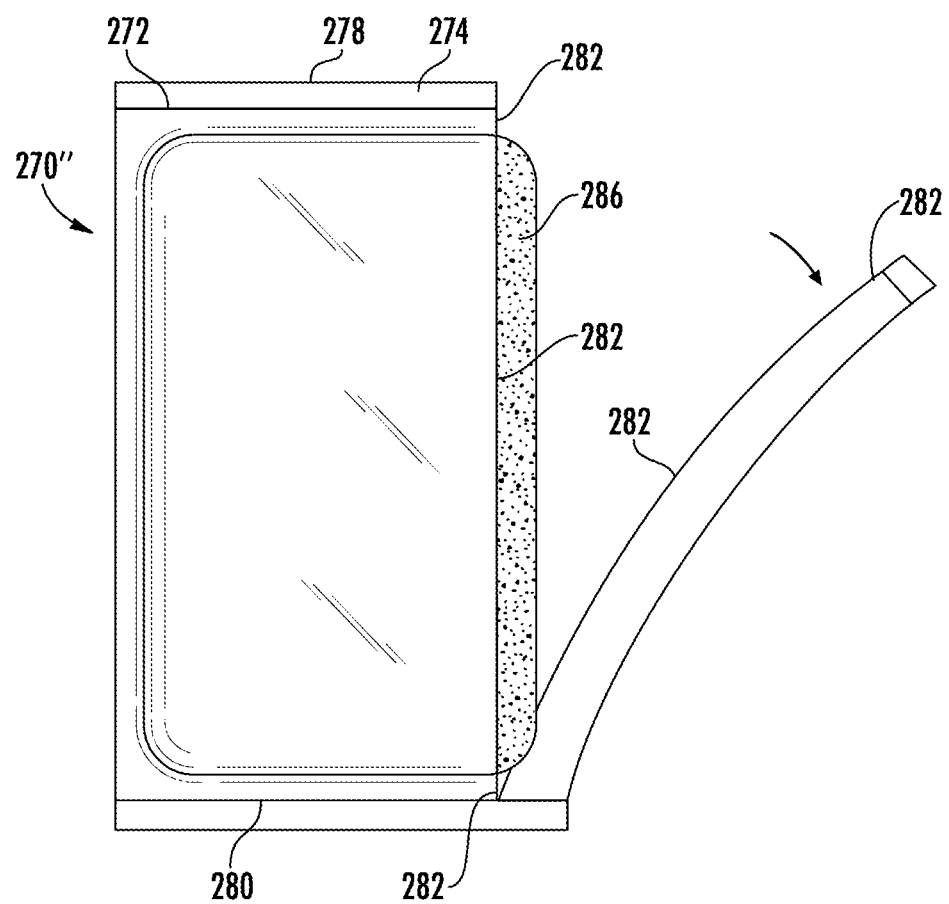
FIG. 21 is a schematic of the packaged product of FIGS. 19 and 20, after the tearing is completed enough for the product to be readily removed.

FIG. 21 illustrates package 270" at a final stage in the manual opening process, i.e., after having torn the end-seal bag for a distance corresponding with over 90% of its length, toward the opposite edge of the packaging article of the package, exposing enough of the length of meat product 286 that the product can be readily removed from package 270". Linear, machine-direction tear 282 has been manually propagated through end seal 272 and down the length of the package made from the end-seal bag.

Figure 22:
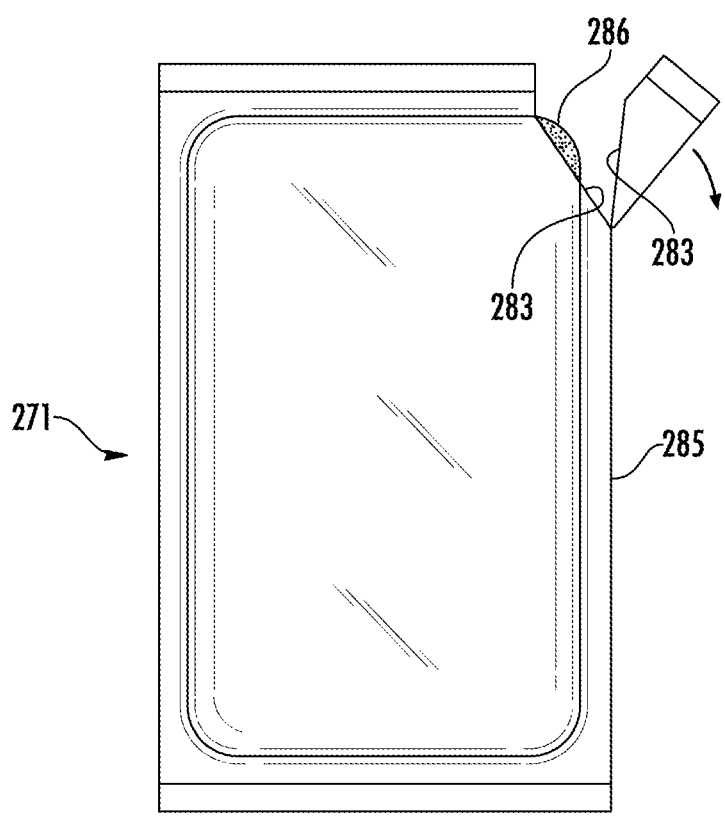
FIG. 22 is a schematic of a comparative packaged product exhibiting a tear character that does not allow tearing down the full length of the package.

FIG. 22 illustrates a perspective view of comparative package 271 after tearing has been initiated and propagated almost to completion, i.e., almost to termination at side edge 285, about 15 to 20 percent down the length of the package. Package 271 is representative of various heat-shrinkable bags in the marketplace today, which, if provided with a tear initiator in the bag skirt, undergo this type of "dog-leg" manual tear 283 initiation and propagation to side edge 285, whereby meat product 286 cannot be readily removed from torn package 271.

Figure 23:
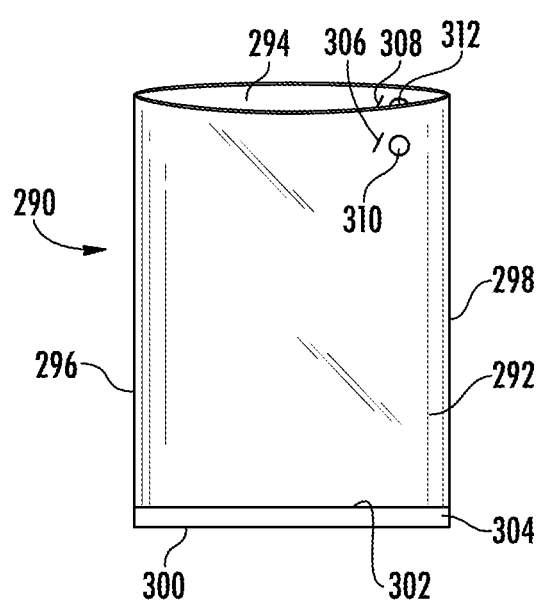
FIG. 23 is a schematic of an alternative heat-shrinkable end-seal bag in lay-flat configuration.

FIG. 23 illustrates a schematic of an alternative heat-shrinkable end-seal bag 290, in a lay-flat position. End-seal bag 290 comprises heat-shrinkable bag film 292, bag top edge 294 defining an open top, folded first side edge 296, folded second side edge 298, bottom edge 300, and end seal 302. End-seal bag 290 further has bag skirt 304 outward of end seal 302. The end-seal bag has slit 306 that is a tear initiator in the first lay-flat side of the bag, and slit 308 that is a tear initiator in the second lay-flat side of the bag. The end-seal bag also has hole 310 that is a grip assister in the first lay-flat side of the bag, and hole 312 that is a grip assister in the second lay-flat side of the bag. The tear initiators and the grip assisters are located near bag top edge 294. When a product is placed in the bag and the bag sealed closed so that it surrounds the product, the tear initiator and the grip assister will then be located in the excess bag length known as the "bag tail" or as the bag "header". Frequently, the bag tail provides more area for inclusion of the tear initiators and the grip assisters than bag skirt 304.

Figure 24:
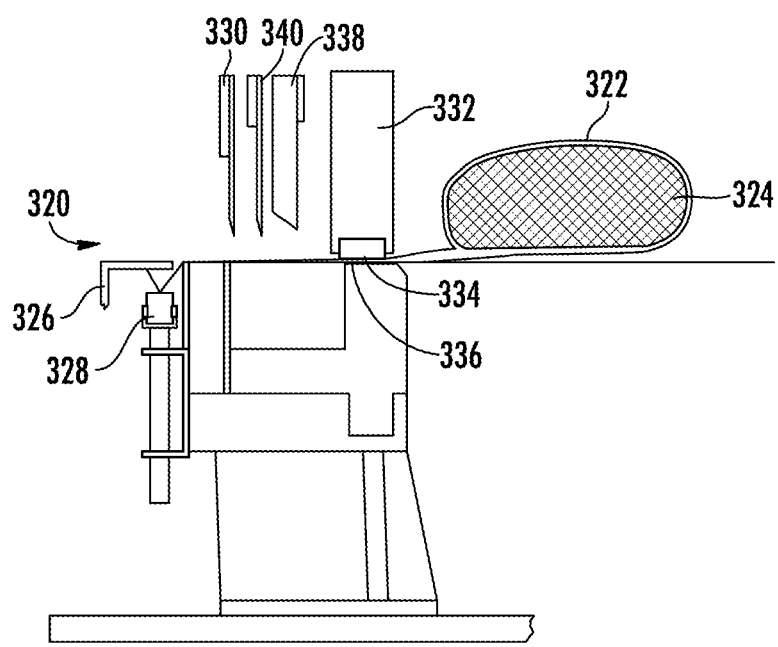
FIG. 24 is a schematic of an apparatus for carrying out the process of placing tear initiators in the header region of a packaging article.

FIG. 24 is a schematic of an apparatus for carrying out the process of placing tear initiators in the header region of a heat-shrinkable end-seal bag, with the tear initiators being made in the header during the packaging process. The tear initiators (and the optional grip assisters) can be made in the bag either before or after the product is placed into the packaging article, either before or after the bag is evacuated, and either before or after the heat seal is made to close the bag. Placing the tear initiators in the bag after the product is placed in the bag eliminates the potential for the tear initiator to cause the bag to tear during loading. Although the packaging article in FIG. 24 is an end-seal bag, the packaging article could be any packaging article in accordance with any one or more of the various aspects of the invention described above.

FIG. 24 illustrates a portion of vacuum chamber packaging machine 320, such as a series 8600 automated rotary chamber vacuum packaging machine from Cryovac, Inc. After end-seal bag 322 having product 324 therein is placed into the opened vacuum chamber, vacuum chamber lid 326 comes down to close the vacuum chamber and clamp across the top (header) portion of bag 322, so that bag 322 is clamped between chamber lid 326 and vacuum chamber base 328. For simplicity, only small portions of chamber lid 306 and chamber base 308 are illustrated in FIG. 24. For more detailed information on this machine, see U.S. Pat. No. 4,550,548, which is hereby incorporated by reference, in its entirety.

Once bag 322 is clamped into position and chamber lid 326 closed, one or more holes are punched through both sides of the header portion of bag 322 by the downward movement of piercing knife 330, which thereafter is retracted to the position illustrated. These holes allow atmosphere to readily evacuate bag 322 as the atmosphere is evacuated from the closed vacuum chamber. After atmospheric evacuation has been completed, seal seat 332 moves downward (i.e., into the position illustrated in FIG. 17) so that bag 322 is clamped between heat seal wires 334 and heat seal platen 326. Heat seal wires 334 are heated to produce a heat seal across bag 322, resulting in the closure of bag 322 and the formation of a packaged product. Shortly thereafter, tear-initiator knife 338 is activated downward and then retracted, with tear-initiator knife 338 piercing both sides of bag 322 to produce machine-direction tear initiators in each side of the header of bag 322. Optionally, a separate grip-assister knife (not illustrated, but preferably located alongside and spaced a short distance from knife 338) is activated downwardly and then retracted, so that it cuts through both sides of the header of bag 322, to form a grip assister in each side of bag 322. Cut-off knife 340 is then downwardly activated to cut off the excess length from the header of bag 322. Then the chamber is opened and the now easy-open packaged product is removed from the chamber.

While the process described above with respect to FIG. 24 could be used to make an easy open packaged product, alternatively the process could be carried out on vertical form fill and seal machines or on horizontal form fill and seal machines, to produce easy open packaged products. Typically, vertical and horizontal form fill and seal processes are not carried out under vacuum. Such equipment, packages, and processes are set forth in U.S. Pat. Nos. 4,905,452, 4,861,414, and 4,768,411, each of which is hereby incorporated, in its entirety, by reference thereto.

The tear initiators (and the optional grip assisters) can also be designed to facilitate automated opening, in addition to being designed to facilitate manual tearing to open the package. Automated tearing devices include hooks actuated by pneumatic actuators (air or hydraulic or electric), divergent hooks on chain conveyors, motorized hooks, and clamps in place of hooks.

Figure 25:
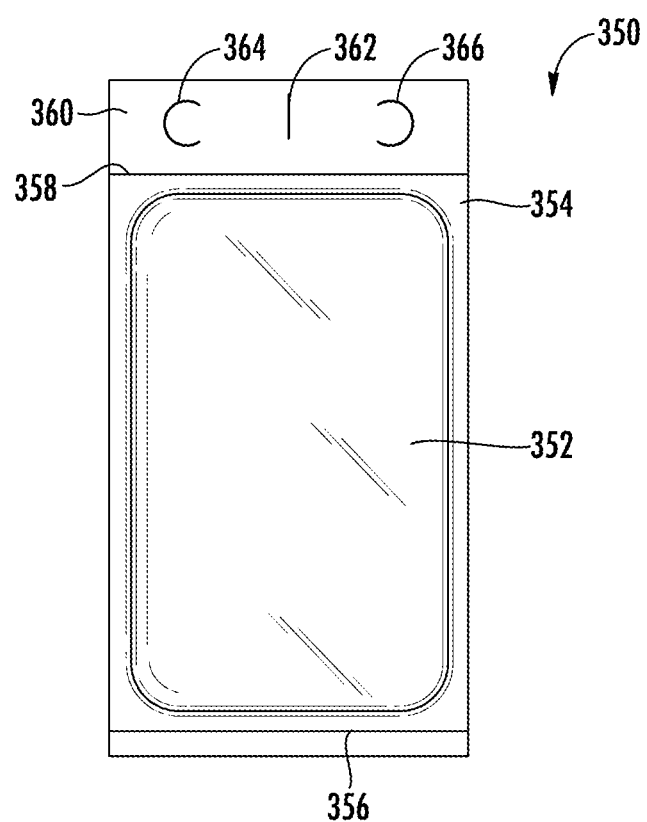
FIG. 25 illustrates a schematic of an easy open package in which the easy open feature is similar to the feature in FIG. 6.

FIG. 25 illustrates a schematic of packaged product 350 in which product 352 is packaged inside packaging article 354 having factory seal 356 and customer seal 358. Packaging article 354 includes header 360 with tear initiator 362 through each side of the package and with pairs of grip assisters 364 and 366, each pair being through both sides of the package, with one pair being on a first side of tear initiator 362, and the other pair being on the other side of tear initiator 362. In this manner, pairs of hooks or clamps can grip the package utilizing grip assisters 364 and 366 to thereafter automatically open packaging article 354. A robot, or another device that grips and tears the package open, or hanging the packaged product on hooks on diverging tracks, could be used to automatically open package 354.

Figure 26:
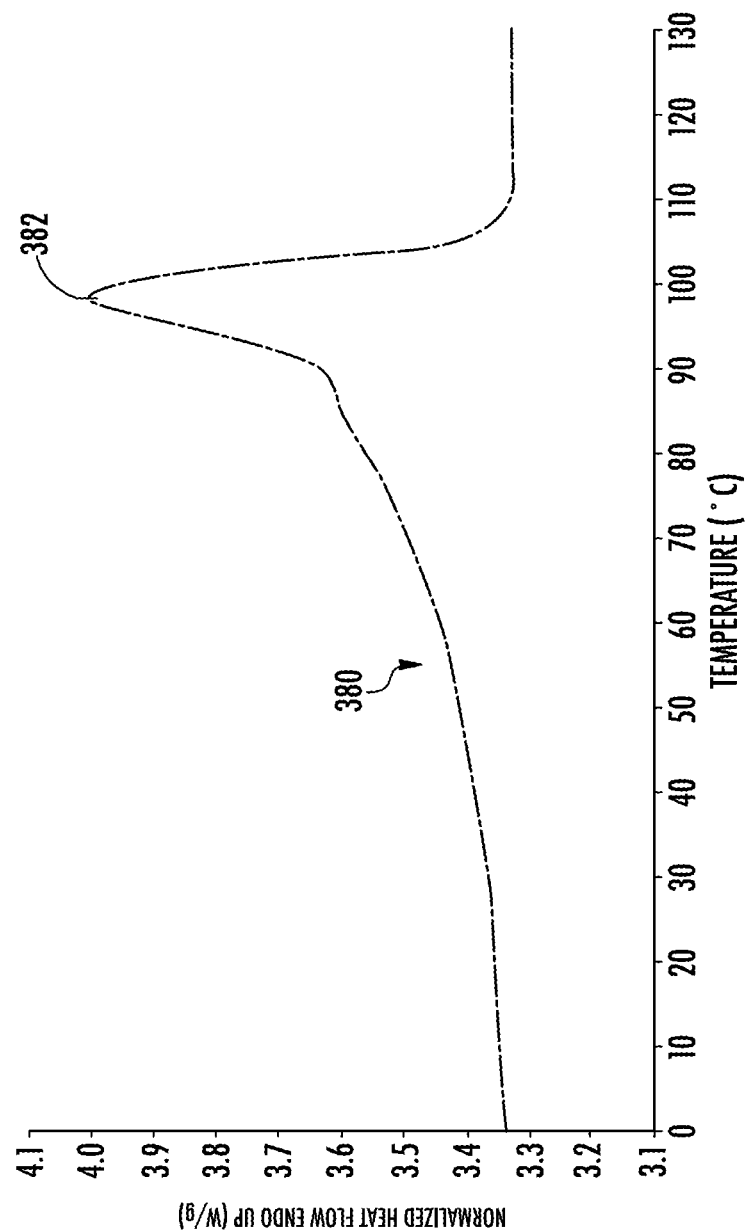
FIG. 26 is a differential scanning calorimetry curve of SSPE1 (single site catalyzed ethylene/alpha-olefin copolymer) disclosed in Table 1, below.

FIG. 26 is a differential scanning calorimetry (DSC) curve 380 of SSPE1, disclosed in Table 1, below. The curve represents the uptake of heat (Y axis) as a function of polymer temperature (X axis). This DSC curve was generated by: (i) holding the polymer sample at a temperature of 30° C. for one minute, then (ii) heating the polymer sample from 30° C. to 147° C. at 10° C./min, then (iii) holding the sample 147° C. for 1 min, then (iv) cooling the sample from 147° C. to −43° C. at 10° C./min, then (iv) holding the sample at −43° C. for one minute, then (v) heating the sample from −40° C. to 147° C. at 10° C./min.at the polymer is heated (single site catalyzed ethylene/alpha-olefin copolymer) disclosed in Table 1, below. Thus, the DSC curve in FIG. 26 is the plot of the "second heating" of the sample. The peak melting point of SSPE1 is located at peak 382, which corresponds with 98.32° C.

Figure 27:
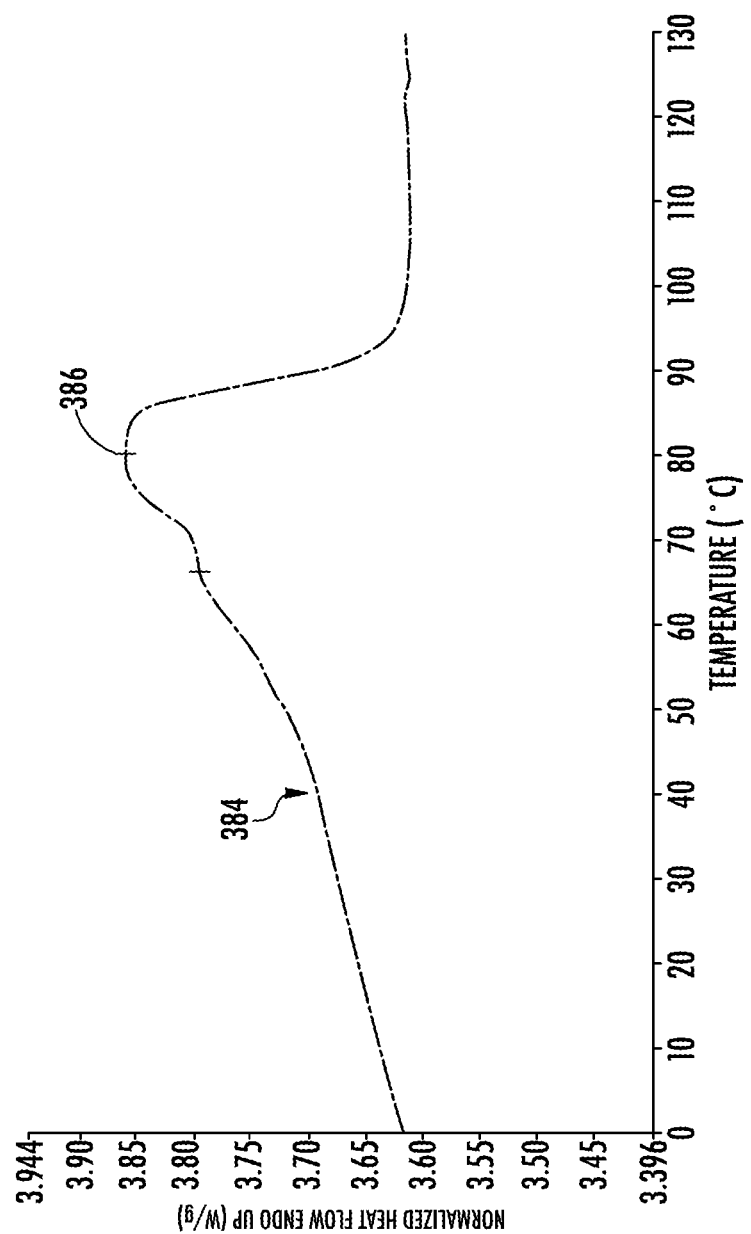
FIG. 27 is a differential scanning calorimetry curve of PLAS1 (ethylene/alpha-olefin plastomer) disclosed in Table 1, below.

FIG. 27 is a DSC curve 384 of PLAS1, also disclosed in Table 1, below. This DSC curve was generated using the same procedure set forth for SSPE1 illustrated in FIG. 26, described above. The peak melting point of PLAS1 is located at peak 386, which corresponds with 80.42° C.

Figure 28:
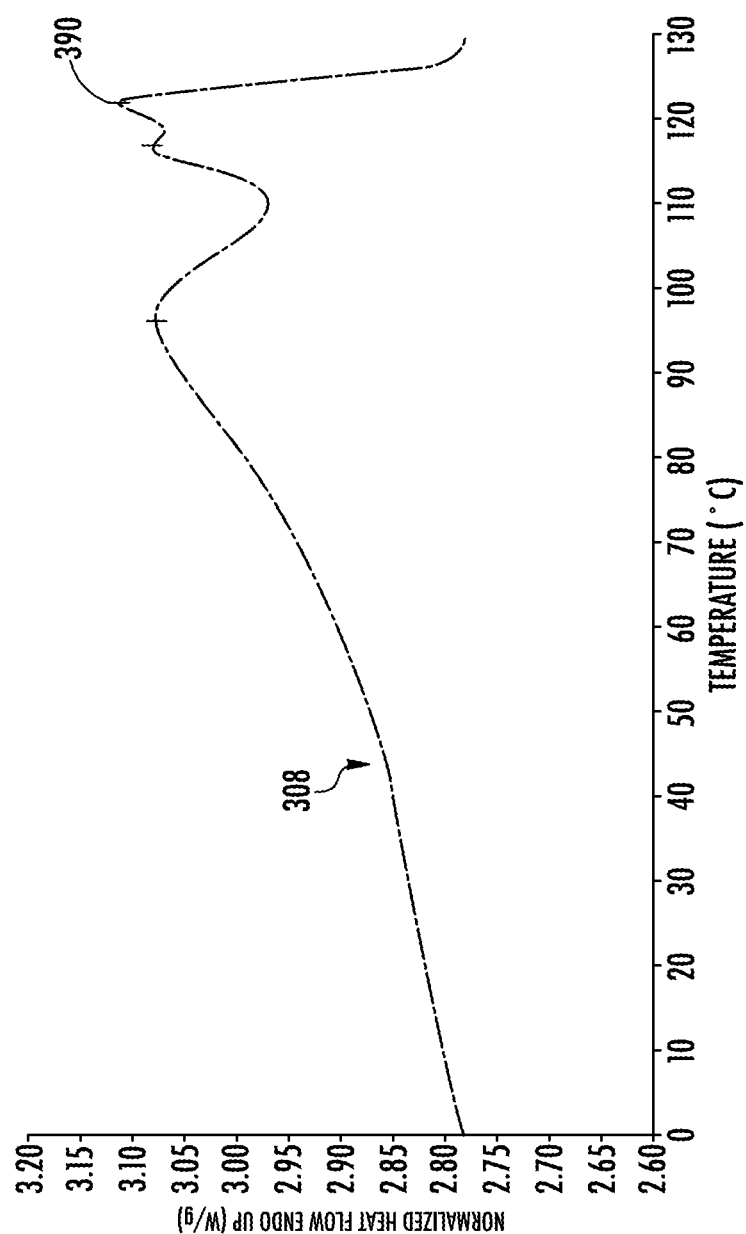
FIG. 28 is a differential scanning calorimetry curve of VLDPE1 (very low density ethylene/alpha-olefin copolymer) disclosed in Table 1, below.

FIG. 28 is a DSC curve 388 of VLDPE1, also disclosed in Table 1, below. This DSC curve was generated using the same procedure set forth for SSPE1 illustrated in FIG. 26, described above. The peak melting point of VLDPE1 is located at peak 390, which corresponds with 121.74° C.

TABLE 1

Examples
Compositions Used in Films

| Resin code | Tradename | Generic Name | Density (g/cc) | Melt Index (dg/min @190° C. & 2.16 kg) | Supplier |
|---|---|---|---|---|---|
| SSPE 1 | AFFINITY ® PL 1281G1 | homogeneous ethylene/octene copolymer | 0.900 g/cc mp: 99° C. | 6.0 | Dow |
| SSPE2 | AFFINITY ® PL 1880G | homogeneous ethylene/octene copolymer | 0.902 g/cc | 1.1 | Dow |
| SSPE3 | EXACT ® 3128 | homogeneous ethylene/butene copolymer | 0.900 g/cc | 1.3 | Exxon Mobil |
| SSPE4 | AFFINITY ® PL 1850G | homogeneous ethylene/octene copolymer | 0.902 g/cc | 3.0 (@200° C., 2.16 kg) | Dow |
| SSPE5 | EXCEED ® 1012HJ | homogeneous ethylene/hexene copolymer | 0.912 g/cc | 1.0 | Exxon Mobil |
| ssPE6 | EXCEED ® XP 8318XX | homogeneous ethylene/alpha-olefin copolymer | 0.918 g/cc | 1.0 | Exxon Mobil |
| ssPE7 | EXCEED ® XP 8358XX | homogeneous ethylene/alpha-olefin copolymer | 0.918 g/cc | 0.5 | Exxon Mobil |
| PLAS1 | ENGAGE ® 8003 | homogeneous ethylene/octene plastomer | 0.885 g/cc mp: 77° C. | 1 | Dow |
| PLAS2 | ENGAGE ® 8157 | homogeneous ethylene/octene copolymer | 0.868 mp: 55° C. | 0.50 | Dow |
| VLDPE1 | XUS 61520.15L | heterogeneous ethylene/alpha-olefin copolymer | 0.903 | 0.5 | Dow |
| VLDPE2 | ATTANE 4203 | heterogeneous ethylene/alpha-olefin copolymer | 0.905 | 8.6 | Dow |
| LLDPE 1 | DOWLEX ® 2045.03 | Heterogeneous linear low density polyethylene | 0.920 | 1.1 | Dow |
| LLDPE 2 | LL 3003.32 | heterogeneous ethylene/hexene copolymer | 0.9175 | 3.2 | Exxon Mobil |
| LLDPE 3 | XUS 61520.21 | Heterogeneous linear low density polyethylene | 0.903 | 0.5 | Dow |
| EPC | VISTAMAXX ® 3588FL | homogeneous propylene/ethylene copolymer (8% ethylene) | 0.889 | 8 (@230° C., 2.16 kg) | Exxon Mobil |
| EPDM | VISTALON ® 7800 | ethylene/propylene/diene monomer | n/a | n/a | Exxon Mobil |
| ION | SURLYN ® 1702-1 | ionomer resin (16% methacrylic acid) | 0.950 | 14.00 | DuPont |
| EVA 1 | EB524AA | ethylene/vinyl acetate copolymer (14.5% vinyl acetate) | 0.934 | 3.5 | Westlake Chemical |
| EVA 2 | ESCORENE ® LD 716.36 | ethylene/vinyl acetate copolymer (26.7% vinyl acetate) | 0.951 | 5.75 | Exxon Mobil |
| EVA3 | EF528AA | ethylene/vinyl acetate copolymer (18.5% vinyl acetate) | 0.940 | 2.5 | Westlake Chemical |
| EVA4 | EB592AA | ethylene/vinyl acetate copolymer (9% vinyl acetate) | 0.931 | 2.0 | Westlake Chemical |
| EVA5 | ESCORENE ® LD 720.92 | ethylene/vinyl acetate copolymer (18.5% vinyl acetate) | 0.940 | 1.55 | Exxon Mobil |
| mEVA | BYNEL ® 3101 | acid/acrylate modified ethylene/vinyl acetate copolymer tie adhesive (18.4% vinyl acetate) | 0.943 | 3.2 | DuPont |
| PVDC1 | IXAN ® PV910 | vinylidene chloride/methyl acrylate copolymer | 1.71 | — | Solvin |
| PVDC2 | SARAN ® 806 | vinylidene chloride/methyl acrylate copolymer | 1.70 | — | Dow |

TABLE 1-continued

Examples
Compositions Used in Films

| Resin code | Tradename | Generic Name | Density (g/cc) | Melt Index (dg/min @190° C. & 2.16 kg) | Supplier |
|---|---|---|---|---|---|
| PA1 | ULTRAMID® RX2267 | Polyamide 6/66 | 1.135 | 181° C. mp | BASF |
| PA2 | ULTRAMID® C40 01 | Polyamide 6/66 | 1.12 | 190° C. mp | BASF |
| PA3 | ULTRAMID® C40 L | polyamide 6/66 | 1.12 | 193° C. mp | BASF |
| PA4 | ULTRAMID® C40 LX | polyamide 6/66 - lubricated | 1.12 | 189° C. mp | BASF |
| coPET 1 | EASTAPAK® COPOLYESTER 9921 | polyethylene terephthalate | 1.40 | 255° C. melt point | Eastman Chemical |
| coPET2 | EASTMAN COPOLYESTER EN058 | polyester | 1.40 | Intrinsic viscosity 0.6 mPa sec | Eastman Chemical |
| PET3 | POLYCLEAR® PET 5704 | Polyester | 52 lb/ft$^3$ | Intrinsic viscosity 0.72 mPa sec | Indorama |
| PETG4 | ASPIRA® COPOLYESTER EB062 | polyethylene terephthalate/glycol | 1.25 g/cc | n/a | Eastman Chemical |
| PETG5 | EMBRACE® LV copolyester | polyethylene terephthalate/glycol | 1.30 g/cc | Inherent viscosity 0.70 mPa sec | Eastman Chemical |
| PETG6 | GN001 | polyethylene terephthalate/glycol | 1.27 g/cc | Intrinsic viscosity 0.75 dl/g | Eastman Chemical |
| EMA-1 | ELVALOY® AC 1218 | ethylene/methyl acrylate copolymer (18% vinyl acetate) | 0.940 | 2 | DuPont |
| EMA-2 | EMAC® SP2402 | ethylene/methyl acrylate copolymer (18.5% vinyl acetate) | 0.941 | 2.5 | Westlake Chemical |
| MB1 | 89% LLDPE 3.5% erucamide; 3.5% N,N'-ethylene-bis-stearamide; 4% sodium aluminosilicate antiblock | Blended masterbatch | — | — | Prepared in-house |
| MB2 | ATMER® 7540 | Slip masterbatch | — | — | Croda |
| MB3 | 89% LLDPE 3.5% erucamide; 3.5% N,N'-ethylene-bis-stearamide; 4% sodium aluminosilicate antiblock | Polyethylene homopolymer antiblock and slip agent | — | — | Prepared in-house |
| MB4 | SILOXANE MB50-10 | Polyester with siloxane additive | n/a | n/a | Dow Corning |

Unless indicated as a prophetic example, each of the films below was produced using the extrusion coating process illustrated in FIG. 18, described above. The resins used in each layer are as identified in the table above. The orientation was carried out by passing the tape through a 198° F. to 202° F. water bath for a period of about 20 seconds. The coated tape was oriented in the solid state to the maximum which could be obtained without causing an impractical level of bubble breaks, with the total orientation (MID×TD) of from about 10× to about 13×, e.g., about 3.4× in each direction.

Unless otherwise indicated, in the various film tables below the films designated with the suffix "I" had substrate sections which were irradiated at 64 kGy. Films designated with the suffix "N" had substrate sections which were not subjected to irradiation. None of the coating sections were subjected to irradiation. The narrow empty column in each table separates the substrate section from the coating section. The substrate includes all layers to the left of the empty column; the coating includes all layers to the right of the empty column.

| Film 1I (working) | | | | | | |
|---|---|---|---|---|---|---|
| Layer 1 | Layer 2 | Layer 3 | Layer 4 | Layer 5 | Layer 6 | Layer 7 |
| Sealant | Core | Tie #1 | Barrier | Tie #2 | Tie #3 | Abuse |
| Substrate Section 64 kGy | | | | Coating Section 0 kGy | | |
| 80 SSPE1 20 LLDPE2 | 55 VLDPE1 15 PLAS1 30 EVA1 | EVA2 | PVDC1 | EVA2 | mEVA | coPET1 |
| 0.3 mil | 0.73 mil | 0.11 mil | 0.18 mil | 0.09 mil | 0.14 mil | 0.11 mil |

-continued

| Film 1N (comparative) | | | | | | |
|---|---|---|---|---|---|---|
| Layer 1 | Layer 2 | Layer 3 | Layer 4 | Layer 5 | Layer 6 | Layer 7 |
| Sealant Substrate 0 kGy | Core Section | Tie #1 | Barrier | Tie #2 Coating Section 0 kGy | Tie #3 | Abuse |
| 80 SSPE1 20 LLDPE2 | 55 VLDPE1 15 PLAS1 30 EVA1 | EVA2 | PVDC1 | EVA2 | mEVA | coPET1 |
| 0.3 mil | 0.73 mil | 0.11 mil | 0.18 mil | 0.09 mil | 0.14 mil | 0.11 mil |

| Film 2I | | | | | | |
|---|---|---|---|---|---|---|
| Layer 1 | Layer 2 | Layer 3 | Layer 4 | Layer 5 | Layer 6 | Layer 7 |
| Sealant Substrate 64 kGy | Core Section | Tie #1 | Barrier | Tie #2 Coating Section 0 kGy | Tie #3 | Abuse |
| 80 SSPE1 20 LLDPE2 | 60 VLDPE1 40 EVA1 | EVA2 | PVDC1 | EVA2 | mEVA | coPET1 |
| 0.3 mil | 0.73 mil | 0.11 mil | 0.18 mil | 0.09 mil | 0.14 mil | 0.11 mil |

| Film 2N | | | | | | |
|---|---|---|---|---|---|---|
| Layer 1 | Layer 2 | Layer 3 | Layer 4 | Layer 5 | Layer 6 | Layer 7 |
| Sealant Substrate 0 kGy | Core Section | Tie #1 | Barrier | Tie #2 Coating Section 0 kGy | Tie #3 | Abuse |
| 80 SSPE1 20 LLDPE2 | 60 VLDPE1 40 EVA1 | EVA2 | PVDC1 | EVA2 | mEVA | coPET1 |
| 0.3 mil | 0.73 mil | 0.11 mil | 0.18 mil | 0.09 mil | 0.14 mil | 0.11 mil |

| Film 3I & Film 3N | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 60 VLDPE1 40 EMA1 | EVA2 | PVDC1 | EVA2 | mEVA | coPET1 |
| 0.3 mil | 0.73 mil | 0.11 mil | 0.18 mil | 0.09 mil | 0.14 mil | 0.11 mil |

| Film 4I & Film 4N | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 60 VLDPE1 40 EVA1 | EMA-1 | PVDC1 | EMA-1 | mEVA | coPET1 |
| 0.3 mil | 0.73 mil | 0.11 mil | 0.18 mil | 0.09 mil | 0.14 mil | 0.11 mil |

| Film 5I & Film 5N | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 60 VLDPE1 40 EMA-1 | EMA-1 | PVDC1 | EMA-1 | mEVA | coPET1 |
| 0.3 mil | 0.73 mil | 0.11 mil | 0.18 mil | 0.09 mil | 0.14 mil | 0.11 mil |

| Film 6I & Film 6N | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| ION | 60 VLDPE1 40 EMA-1 | EMA-1 | PVDC1 | EMA-1 | mEVA | coPET1 |
| 0.3 mil | 0.73 mil | 0.11 mil | 0.18 mil | 0.09 mil | 0.14 mil | 0.11 mil |

-continued

| | | | Film 7I & Film 7N | | | |
|---|---|---|---|---|---|---|
| Layer 1 | Layer 2 | Layer 3 | Layer 4 | Layer 5 | Layer 6 | Layer 7 |
| Sealant | Core | Tie #1 | Barrier | Tie #2 | Tie #3 | Abuse |
| Substrate Section | | | | Coating Section | | |
| 80 SSPE1 20 LLDPE2 | 60 VLDPE1 40 EMA-1 | EMA-1 | PVDC1 | EMA-1 | mEVA | 50 coPET1 50 coPET2 |
| 0.3 mil | 0.73 mil | 0.11 mil | 0.18 mil | 0.09 mil | 0.14 mil | 0.11 mil |

| | | | Film 8I & Film 8N | | | |
|---|---|---|---|---|---|---|
| Layer 1 | Layer 2 | Layer 3 | Layer 4 | Layer 5 | Layer 6 | Layer 7 |
| Sealant | Core | Tie #1 | Barrier | Tie #2 | Tie #3 | Abuse |
| Substrate Section | | | | Coating Section | | |
| 80 SSPE1 20 LLDPE2 | 60 VLDPE1 40 EMA-2 | EMA-2 | PVDC1 | EMA-2 | mEVA | coPET1 |
| 0.3 mil | 0.73 mil | 0.11 mil | 0.18 mil | 0.09 mil | 0.14 mil | 0.11 mil |

| | | | Film 9I & Film 9N | | | |
|---|---|---|---|---|---|---|
| Layer 1 | Layer 2 | Layer 3 | Layer 4 | Layer 5 | Layer 6 | Layer 7 |
| Sealant | Core | Tie #1 | Barrier | Tie #2 | Tie #3 | Abuse |
| Substrate Section | | | | Coating Section | | |
| 80 SSPE1 20 LLDPE2 | 55 VLDPE1 15 PLAS1 30 EVA1 | EMA-2 | PVDC1 | EMA-2 | mEVA | coPET1 |
| 0.3 mil | 0.73 mil | 0.11 mil | 0.18 mil | 0.09 mil | 0.14 mil | 0.11 mil |

| | | | Film 10I & Film 10N | | | |
|---|---|---|---|---|---|---|
| Layer 1 | Layer 2 | Layer 3 | Layer 4 | Layer 5 | Layer 6 | Layer 7 |
| Sealant | Core | Tie #1 | Barrier | Tie #2 | Tie #3 | Abuse |
| Substrate Section | | | | Coating Section | | |
| ION | 55 VLDPE1 15 PLAS1 30 EVA1 | EMA-2 | PVDC1 | EMA-2 | mEVA | coPET1 |
| 0.3 mil | 0.73 mil | 0.11 mil | 0.18 mil | 0.09 mil | 0.14 mil | 0.11 mil |

| | | | | Film 11N | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core | Tie #1 | Barrier | Tie #2 | Tie #3 | Core | Tie #3 | Abuse |
| | Substrate | | | | | Coating | | |
| 80 SSPE1 20 LLDPE2 | 55 VLDPE1 15 PLAS1 30 EVA1 | EVA 2 | PVDC1 | EVA 2 | EVA-2 | 55 VLDPE1 15 PLAS1 30 EVA1 | mEVA | coPET1 |
| 0.3 mil | 0.5 mil | 0.11 | 0.18 mil | 0.09 | 0.09 mil | 0.25 | 0.11 mil | 0.11 mil |

| | | | | Film 12N | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core | Tie #1 | Barrier | Tie #2 | Tie #3 | Core | Tie #3 | Abuse |
| | Substrate | | | | | Coating | | |
| 80 SSPE1 20 LLDPE2 | 55 VLDPE1 15 PLAS1 30 EVA1 | EVA 2 | PVDC1 | EVA 2 | EVA-2 | 55 VLDPE1 15 PLAS1 30 EVA1 | mEVA | 50 coPET1 50 coPET2 |
| 0.3 mil | 0.5 mil | 0.11 | 0.18 mil | 0.09 | 0.09 mil | 0.25 | 0.11 mil | 0.11 mil |

| | | | | Film 13N | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core | Tie #1 | Barrier | Tie #2 | Tie #3 | Core | Tie #3 | Abuse |
| | Substrate | | | | | Coating | | |
| 80 SSPE1 20 LLDPE2 | 70VLDPE1 30 EVA1 | EVA 2 | PVDC1 | EVA 2 | EVA-2 | 70 VLDPE1 30 EVA1 | mEVA | coPET1 |
| 0.3 mil | 0.5 mil | 0.11 | 0.18 mil | 0.09 | 0.09 mil | 0.25 | 0.11 mil | 0.11 mil |

-continued

Film 14N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 | Barrier | Tie #2 | Tie #3 | Core | Tie #3 | Abuse |
|  | Substrate |  |  |  |  | Coating |  |  |
| 80 SSPE1 | 55 VLDPE1 | EVA 2 | PVDC1 | EVA 2 | EVA-2 | 55 VLDPE1 | mEVA | 99 coPET1 |
| 20 LLDPE2 | 15 PLAS1 |  |  |  |  | 15 PLAS1 |  | 1 EMA-1 |
|  | 30 EVA1 |  |  |  |  | 30 EVA1 |  |  |
| 0.3 mil | 0.5 mil | 0.11 | 0.18 mil | 0.09 | 0.09 mil | 0.25 | 0.11 mil | 0.11 mil |

Film 15N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 | Barrier | Tie #2 | Tie #3 | Core | Tie #3 | Abuse |
|  | Substrate |  |  |  |  | Coating |  |  |
| 80 SSPE1 | 40 VLDPE1 | EVA 2 | PVDC1 | EVA 2 | EVA-2 | 40 VLDPE1 | mEVA | 50 coPET1 |
| 20 LLDPE2 | 30 PLAS1 |  |  |  |  | 30 PLAS1 |  | 50 coPET2 |
|  | 30 EVA1 |  |  |  |  | 30 EVA1 |  |  |
| 0.3 mil | 0.5 mil | 0.11 | 0.18 mil | 0.09 | 0.09 mil | 0.25 | 0.11 mil | 0.11 mil |

Film 16N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 | Barrier | Tie #2 | Tie #3 | Core | Tie #3 | Abuse |
|  | Substrate |  |  |  |  | Coating |  |  |
| 80 SSPE1 | 55 VLDPE1 | EVA 2 | PVDC1 | EVA 2 | EVA-2 | 55 VLDPE1 | mEVA | coPET1 |
| 20 MB1 | 15 PLAS1 |  |  |  |  | 15 PLAS1 |  |  |
|  | 30 EVA1 |  |  |  |  | 30 EVA1 |  |  |
| 0.3 mil | 0.5 mil | 0.11 | 0.18 mil | 0.09 | 0.09 mil | 0.25 | 0.11 mil | 0.11 mil |

Film 17N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 | Barrier | Tie #2 | Tie #3 | Core | Tie #3 | Abuse |
|  | Substrate |  |  |  |  | Coating |  |  |
| 80 LLDPE3 | 55 VLDPE1 | EVA 2 | PVDC1 | EVA 2 | EVA-2 | 55 VLDPE1 | mEVA | coPET1 |
| 20 SSPE1 | 15 PLAS1 |  |  |  |  | 15 PLAS1 |  |  |
|  | 30 EVA1 |  |  |  |  | 30 EVA1 |  |  |
| 0.3 mil | 0.5 mil | 0.11 | 0.18 mil | 0.09 | 0.09 mil | 0.25 | 0.11 mil | 0.11 mil |

Film 20N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 | Barrier | Tie #2 | Tie #3 | Core | Tie #3 | Abuse |
|  | Substrate |  |  |  |  | Coating |  |  |
| 80 SSPE2 | 55 VLDPE1 | EVA 2 | PVDC1 | EVA 2 | EVA-2 | 55 VLDPE1 | mEVA | coPET1 |
| 20 SSPE1 | 15 PLAS1 |  |  |  |  | 15 PLAS1 |  |  |
|  | 30 EVA1 |  |  |  |  | 30 EVA1 |  |  |
| 0.3 mil | 0.5 mil | 0.11 | 0.18 mil | 0.09 | 0.09 mil | 0.25 | 0.11 mil | 0.11 mil |

Film 21N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 | Barrier | Tie #2 | Tie #3 | Core | Tie #3 | Abuse |
|  | Substrate |  |  |  |  | Coating |  |  |
| 80 SSPE1 | 55 VLDPE1 | EVA 2 | PVDC1 | EVA 2 | EVA-2 | 55 VLDPE1 | mEVA | PA1 |
| 20 LLDPE2 | 15 PLAS1 |  |  |  |  | 15 PLAS1 |  |  |
|  | 30 EVA1 |  |  |  |  | 30 EVA1 |  |  |
| 0.3 mil | 0.5 mil | 0.11 | 0.18 mil | 0.09 | 0.09 mil | 0.25 | 0.11 mil | 0.11 mil |

Film 22N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 | Barrier | Tie #2 | Tie #3 | Core | Tie #3 | Abuse |
|  | Substrate |  |  |  |  | Coating |  |  |
| 80 SSPE1 | 55 VLDPE1 | EVA 2 | PVDC1 | EVA 2 | EVA-2 | 55 VLDPE1 | mEVA | PA2 |
| 20 LLDPE2 | 15 PLAS1 |  |  |  |  | 15 PLAS1 |  |  |
|  | 30 EVA1 |  |  |  |  | 30 EVA1 |  |  |
| 0.3 mil | 0.5 mil | 0.11 | 0.18 mil | 0.09 | 0.09 mil | 0.25 | 0.11 mil | 0.11 mil |

Film 23N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE3 20 EVA4 | 55 VLDPE1 15 PLAS1 30 EVA1 | EVA 2 | PVDC1 | EVA 2 | EVA-2 | 55 VLDPE1 15 PLAS1 30 EVA1 | mEVA | coPET1 |
| 0.3 mil | 0.5 mil | 0.11 | 0.18 mil | 0.09 | 0.09 mil | 0.25 | 0.11 mil | 0.11 mil |

Film 24I & Film 24N

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier | Tie #2 Coating Section | Tie #3 | Abuse |
| 80 SSPE1 20 LLDPE2 | 55 VLDPE1 15 PLAS1 30 EVA1 | EVA2 | PVDC1 | EVA2 | mEVA | 50 coPET1 50 coPET2 |
| 0.3 mil | 0.73 mil | 0.11 mil | 0.18 mil | 0.09 mil | 0.14 mil | 0.11 mil |

Film 25I & 25N

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier | Tie #2 Coating Section | Tie #3 | Abuse |
| 80 SSPE1 20 LLDPE2 | 55 VLDPE1 15 PLAS1 30 EVA1 | EVA2 | PVDC1 | EVA2 | mEVA | 50 coPET1 49 coPET2 1 MB2 |
| 0.3 mil | 0.73 mil | 0.11 mil | 0.18 mil | 0.09 mil | 0.14 mil | 0.11 mil |

Film 26I

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier | Tie #2 Coating Section | Tie #3 | Abuse |
| 80 SSPE1 20 LLDPE2 | 55 VLDPE1 15 PLAS1 30 EVA1 | EVA2 | PVDC1 | EVA2 | mEVA | 50 coPET1 48 coPET2 2 MB2 |
| 0.3 mil | 0.73 mil | 0.11 mil | 0.18 mil | 0.09 mil | 0.14 mil | 0.11 mil |

Film 27I

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier | Tie #2 Coating Section | Tie #3 | Abuse |
| 80 SSPE1 20 LLDPE2 | 55 SSPE2 15 PLAS1 30 EVA1 | EVA2 | PVDC1 | EVA2 | mEVA | 50 coPET1 50 coPET2 |
| 0.3 mil | 0.73 mil | 0.11 mil | 0.18 mil | 0.09 mil | 0.14 mil | 0.11 mil |

Film 28I & Film 28N

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier | Tie #2 Coating Section | Tie #3 | Abuse |
| 80 SSPE1 20 LLDPE2 | 70 SSPE2 30 EVA1 | 70 EVA2 30 PLAS1 | PVDC1 | 70 EVA2 30 PLAS1 | mEVA | 50 coPET1 50 coPET2 |
| 0.3 mil | 0.73 mil | 0.11 mil | 0.18 mil | 0.09 mil | 0.14 mil | 0.11 mil |

Film 29I & Film 29N

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier | Tie #2 Coating Section | Tie #3 | Abuse |
| 80 SSPE1 20 | 70 VLDPE1 30 EVA1 | EVA2 | PVDC1 | EVA2 | mEVA | 50 coPET1 |

-continued

| | | | | | | 49 coPET2 1 MB2 |
|---|---|---|---|---|---|---|
| LLDPE2 | | | | | | |
| 0.3 mil | 0.73 mil | 0.11 mil | 0.18 mil | 0.09 mil | 0.14 mil | 0.11 mil |

| Film 30I | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |
| 80 SSPE1 20 LLDPE2 | 55 SSPE2 15 PLAS1 30 EVA1 | EVA2 | PVDC1 | EVA2 | mEVA | PET3 |
| 0.3 mil | 0.73 mil | 0.11 mil | 0.18 mil | 0.09 mil | 0.14 mil | 0.11 mil |

| Film 31I (prophetic) | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |
| 80 SSPE1 20 LLDPE2 | 55 SSPE2 15 PLAS1 30 EVA1 | EVA2 | PVDC1 | EVA2 | mEVA | PETG4 |
| 0.3 mil | 0.73 mil | 0.11 mil | 0.18 mil | 0.09 mil | 0.14 mil | 0.11 mil |

| Film 32I | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |
| 80 SSPE1 20 LLDPE2 | 55 SSPE2 15 PLAS1 30 EVA1 | EVA2 | PVDC1 | EVA2 | mEVA | PETG5 |
| 0.3 mil | 0.73 mil | 0.11 mil | 0.18 mil | 0.09 mil | 0.14 mil | 0.11 mil |

| Film 33I | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |
| 80 SSPE1 20 LLDPE2 | 55 SSPE2 15 PLAS1 30 EVA1 | EVA1 | PVDC1 | EVA1 | mEVA | 50 coPET1 50 coPET2 |
| 0.3 mil | 0.73 mil | 0.11 mil | 0.18 mil | 0.09 mil | 0.14 mil | 0.11 mil |

| Film 34N | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |
| 80 SSPE1 20 LLDPE2 | 55 VLDPE1 15 PLAS1 30 EVA1 | EVA2 | PVDC1 | EVA2 | mEVA | coPET2 |
| 0.3 mil | 0.74 mil | 0.10 mil | 0.19 mil | 0.10 mil | 0.13 mil | 0.11 mil |

| Film 35I & Film 35N | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |
| 80 SSPE1 20 LLDPE2 | 70 SSPE2 30 EVA1 | EVA2 | PVDC1 | EVA2 | mEVA | 50 coPET1 50 coPET2 |
| 0.3 mil | 0.73 mil | 0.11 mil | 0.18 mil | 0.09 mil | 0.14 mil | 0.11 mil |

| Film 36I | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |

-continued

| | | | | | | |
|---|---|---|---|---|---|---|
| 80 SSPE1 | 55 VLDPE1 | EVA2 | PVDC1 | EVA2 | mEVA | coPET1 |
| 20 MB3 | 15 PLAS1 | | | | | |
| | 30 EVA1 | | | | | |
| 0.3 mil | 0.73 mil | 0.11 mil | 0.18 mil | 0.09 mil | 0.14 mil | 0.11 mil |

Film 37I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate | Section | | | Coating Section | | |
| 80 SSPE1 | 55 VLDPE1 | EVA-2 | PVDC1 | EVA-2 | mEVA | PET3 |
| 20 MB3 | 15 PLAS1 | | | | | |
| | 30 EVA1 | | | | | |
| 0.3 mil | 0.73 mil | 0.11 mil | 0.18 mil | 0.09 mil | 0.14 mil | 0.11 mil |

Film 38I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate | Section | | | Coating Section | | |
| 80 SSPE1 | 60 VLDPE1 | EVA2 | PVDC1 | EVA2 | mEVA | coPET1 |
| 20 LLDPE2 | 10 EPDM | | | | | |
| | 30 EVA1 | | | | | |
| 0.3 mil | 0.73 mil | 0.11 mil | 0.18 mil | 0.09 mil | 0.14 mil | 0.11 mil |

Film 39I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate | Section | | | Coating Section | | |
| 80 SSPE1 | 55 VLDPE1 | EVA2 | PVDC1 | EVA2 | mEVA | 99 coPET1 |
| 20 MB3 | 15 PLAS1 | | | | | 1 MB4 |
| | 30 EVA1 | | | | | |
| 0.3 mil | 0.73 mil | 0.11 mil | 0.18 mil | 0.09 mil | 0.14 mil | 0.11 mil |

Film 40I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate | Section | | | Coating Section | | |
| 80 SSPE1 | 55 VLDPE1 | EVA2 | PVDC1 | EVA2 | mEVA | 80 SSPE4 |
| 20 MB3 | 15 PLAS1 | | | | | 20 LLDPE1 |
| | 30 EVA1 | | | | | |
| 0.3 mil | 0.73 mil | 0.11 mil | 0.18 mil | 0.09 mil | 0.14 mil | 0.11 mil |

Film 41I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate | Section | | | Coating Section | | |
| 80 SSPE1 | 55 VLDPE1 | EVA1 | PVDC1 | EVA1 | mEVA | 99 coPET1 |
| 20 MB3 | 15 EPDM | | | | | 1 MB2 |
| | 30 EVA1 | | | | | |
| 0.3 mil | 0.73 mil | 0.11 mil | 0.18 mil | 0.09 mil | 0.14 mil | 0.11 mil |

Film 42I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate | Section | | | Coating Section | | |
| 80 SSPE1 | 60 VLDPE1 | EVA-2 | PVDC1 | EVA-2 | mEVA | 99 coPET1 |
| 20 LLDPE2 | 10 EPDM | | | | | 1 MB2 |
| | 30 EVA-1 | | | | | |
| 0.3 mil | 0.73 mil | 0.11 mil | 0.18 mil | 0.09 mil | 0.14 mil | 0.11 mil |

Film 43N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 | Barrier | Tie #2 | Tie #3 | Core | Tie #3 | Abuse |
| | Substrate | | | | | Coating | | |
| 80 SSPE1 | 55 VLDPE1 | EVA 2 | PVDC1 | EVA 2 | EVA-2 | 55 VLDPE1 | mEVA | coPET1 |
| 20 MB3 | 15 PLAS1 | | | | | 15 PLAS1 | | |

-continued

|  |  |  |  |  |  |  |  |  |
|---|---|---|---|---|---|---|---|---|
|  | 30 EVA1 |  |  |  |  | 30 EVA1 |  |  |
| 0.3 mil | 0.5 mil | 0.11 | 0.18 mil | 0.09 | 0.09 mil | 0.25 mil | 0.11 mil | 0.11 mil |

Film 44N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 | 55 VLDPE1 | EVA 2 | PVDC1 | EVA 2 | EVA-2 | 55 VLDPE1 | mEVA | 99 coPET1 |
| 20 MB3 | 15 PLAS1 |  |  |  |  | 15 PLAS1 |  | 1 MB2 |
|  | 30 EVA1 |  |  |  |  | 30 EVA1 |  |  |
| 0.3 mil | 0.5 mil | 0.11 | 0.18 mil | 0.09 | 0.09 mil | 0.25 mil | 0.11 mil | 0.11 mil |

Film 45N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 | 55 VLDPE1 | EVA 1 | PVDC1 | EVA 1 | EVA-1 | 55 VLDPE1 | mEVA | coPET1 |
| 20 LLDPE2 | 15 PLAS1 |  |  |  |  | 15 PLAS1 |  |  |
|  | 30 EVA1 |  |  |  |  | 30 EVA1 |  |  |
| 0.3 mil | 0.5 mil | 0.11 | 0.18 mil | 0.09 | 0.09 mil | 0.25 mil | 0.11 mil | 0.11 mil |

Film 46N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 | 55 SSPE2 | EVA 1 | PVDC1 | EVA 1 | EVA-1 | 55 SSPE2 | mEVA | coPET 1 |
| 20 LLDPE2 | 15 PLAS1 |  |  |  |  | 15 PLAS1 |  |  |
|  | 30 EVA1 |  |  |  |  | 30 EVA1 |  |  |
| 0.3 mil | 0.5 mil | 0.11 | 0.18 mil | 0.09 | 0.09 mil | 0.25 mil | 0.11 mil | 0.11 mil |

Film 47N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 | 70 VLDPE1 | EVA 2 | PVDC1 | EVA 2 | EVA-2 | 70 VLDPE1 | mEVA | coPET1 |
| 20 MB3 | 30 EVA1 |  |  |  |  | 30 EVA1 |  |  |
| 0.3 mil | 0.5 mil | 0.11 | 0.18 mil | 0.09 | 0.09 mil | 0.25 mil | 0.11 mil | 0.11 mil |

Film 48N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 | 55 VLDPE1 | EVA 2 | PVDC1 | EVA 2 | EVA-2 | 55 VLDPE1 | mEVA | PETG4 |
| 20 LLDPE2 | 15 PLAS1 |  |  |  |  | 15 PLAS1 |  |  |
|  | 30 EVA1 |  |  |  |  | 30 EVA1 |  |  |
| 0.3 mil | 0.5 mil | 0.11 | 0.18 mil | 0.09 | 0.09 mil | 0.25 mil | 0.11 mil | 0.11 mil |

Film 49N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 | 55 VLDPE1 | EVA 2 | PVDC1 | EVA 2 | EVA-2 | 55 VLDPE1 | mEVA | PETG5 |
| 20 LLDPE2 | 15 PLAS1 |  |  |  |  | 15 PLAS1 |  |  |
|  | 30 EVA1 |  |  |  |  | 30 EVA1 |  |  |
| 0.3 mil | 0.5 mil | 0.11 | 0.18 mil | 0.09 | 0.09 mil | 0.25 mil | 0.11 mil | 0.11 mil |

Film 50N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 | 55 VLDPE1 | EVA 2 | PVDC1 | EVA 2 | EVA-2 | 55 VLDPE1 | mEVA | 99 coPET1 |
| 20 LLDPE2 | 15 PLAS1 |  |  |  |  | 15 PLAS1 |  | 1 MB4 |
|  | 30 EVA1 |  |  |  |  | 30 EVA1 |  |  |
| 0.3 mil | 0.5 mil | 0.11 | 0.18 mil | 0.09 | 0.09 mil | 0.25 mil | 0.11 mil | 0.11 mil |

-continued

Film 51N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | mEVA | 55 VLDPE1 15 PLAS1 30 EVA1 | mEVA | coPET1 |
| 0.3 mil | 0.47 mil | 0.11 | 0.18 mil | 0.09 | 0.09 mil | 0.25 mil | 0.11 mil | 0.11 mil |

Film 52N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | mEVA | 55 VLDPE1 15 PLAS1 30 EVA1 | mEVA | PET3 |
| 0.3 mil | 0.47 mil | 0.11 | 0.18 mil | 0.09 | 0.09 mil | 0.25 mil | 0.11 mil | 0.11 mil |

Film 53N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | mEVA | 55 VLDPE1 15 PLAS1 30 EVA1 | mEVA | PET3 |
| 0.3 mil | 0.47 mil | 0.11 | 0.18 mil | 0.09 | 0.09 mil | 0.25 mil | 0.11 mil | 0.11 mil |

Film 54N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 20 LLDPE2 | 55 VLDPE1 15 PLAS1 30 EVA1 | EVA1 | PVDC1 | EVA 1 | mEVA | 55 VLDPE1 15 PLAS1 30 EVA1 | mEVA | PET3 |
| 0.3 mil | 0.47 mil | 0.11 | 0.18 mil | 0.09 | 0.09 mil | 0.25 mil | 0.11 mil | 0.11 mil |

Film 55N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 20 MB3 | 60 VLDPE1 40 EVA1 | EVA 1 | PVDC1 | EVA 1 | mEVA | 60 VLDPE1 40 EVA1 | mEVA | PET3 |
| 0.3 mil | 0.47 mil | 0.11 | 0.18 mil | 0.09 | 0.09 mil | 0.25 mil | 0.11 mil | 0.11 mil |

Film 56N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 20 MB3 | 60 VLDPE1 40 EVA1 | EVA 1 | PVDC1 | EVA 1 | mEVA | PETG5 | mEVA | PET3 |
| 0.3 mil | 0.47 mil | 0.11 | 0.18 mil | 0.09 | 0.09 mil | 0.25 mil | 0.11 mil | 0.11 mil |

Film 57N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core | Tie #1 Substrate | Barrier | Tie #2 | Tie #3 | Core Coating | Tie #3 | Abuse |
| 80 SSPE1 20 MB3 | 60 VLDPE1 40 EVA1 | EVA1 | PVDC1 | EVA1 | mEVA | 60 VLDPE1 40 EVA1 | mEVA | PET3 |
| 0.3 mil | 0.47 mil | 0.11 | 0.18 mil | 0.09 | 0.09 mil | 0.25 mil | 0.11 mil | 0.11 mil |

Film 58I & Film 58N

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate Section | | | | Coating Section | | |
| 80 SSPE1 | 70 SSPE5 | EVA-2 | PVDC1 | EVA-2 | mEVA | coPET1 |
| 20 LLDPE2 | 30 EVA1 | | | | | |
| 0.3 mil | 0.73 mil | 0.11 mil | 0.18 mil | 0.09 mil | 0.14 mil | 0.11 mil |

Film 59I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate Section | | | | Coating Section | | |
| 80 SSPE1 | 55 SSPE5 | EVA-2 | PVDC1 | EVA-2 | mEVA | coPET1 |
| 20 LLDPE2 | 15 PLAS1 | | | | | |
| | 30 EVA1 | | | | | |
| 0.3 mil | 0.73 mil | 0.11 mil | 0.18 mil | 0.09 mil | 0.14 mil | 0.11 mil |

Film 60I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate Section | | | | Coating Section | | |
| 80 SSPE1 | 70 VLDPE1 | EVA-2 | PVDC1 | EVA-2 | mEVA | 80 SSPE4 |
| 20 LLDPE2 | 30 EVA1 | | | | | 20 LLDPE1 |
| 0.3 mil | 0.73 mil | 0.11 mil | 0.18 mil | 0.09 mil | 0.14 mil | 0.11 mil |

Film 61I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate Section | | | | Coating Section | | |
| 80 SSPE1 | 70 SSPE6 | EVA-2 | PVDC1 | EVA-2 | mEVA | 80 SSPE4 |
| 20 LLDPE2 | 30 EVA1 | | | | | 20 LLDPE1 |
| 0.3 mil | 0.73 mil | 0.11 mil | 0.18 mil | 0.09 mil | 0.14 mil | 0.11 mil |

Film 62I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate Section | | | | Coating Section | | |
| 80 SSPE1 | 70 SSPE7 | EVA-2 | PVDC1 | EVA-2 | mEVA | 80 SSPE4 |
| 20 LLDPE2 | 30 EVA1 | | | | | 20 LLDPE1 |
| 0.3 mil | 0.73 mil | 0.11 mil | 0.18 mil | 0.09 mil | 0.14 mil | 0.11 mil |

Film 63I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate Section | | | | Coating Section | | |
| ION | 70 SSPE5 | EVA-2 | PVDC1 | EVA-2 | mEVA | coPET1 |
| | 30 EVA1 | | | | | |
| 0.3 mil | 0.73 mil | 0.11 mil | 0.18 mil | 0.09 mil | 0.14 mil | 0.11 mil |

Film 64I

| Layer 1 | Layer 2 | Layer 3 | Layer 4 | Layer 5 | Layer 6 | Layer 7 |
|---|---|---|---|---|---|---|
| Sealant | Core | Tie #1 | Barrier | Tie #2 | Tie #3 | Abuse |
| Substrate Section | | | | Coating Section | | |
| 80 SSPE1 | 70 SSPE6 | EVA-2 | PVDC1 | EVA-2 | mEVA | coPET1 |
| 20 LLDPE2 | 30 EVA1 | | | | | |
| 0.3 mil | 0.73 mil | 0.11 mil | 0.18 mil | 0.09 mil | 0.14 mil | 0.11 mil |

-continued

Film 65I

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier Coating Section | Tie #2 | Tie #3 | Abuse |
| 80 SSPE1 20 LLDPE2 | 70 SSPE7 30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 66I

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier Coating Section | Tie #2 | Tie #3 | Abuse |
| 80 SSPE1 20 LLDPE2 | 55 VLDPE1 15 PLAS1 30 EVA1 | EVA-2 | PVDC1 | EVA-2 | mEVA | PETG5 |
| 0.3 mil | 0.73 mil | 0.11 mil | 0.18 mil | 0.09 mil | 0.14 mil | 0.11 mil |

Film 67I

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier Coating Section | Tie #2 | Tie #3 | Abuse |
| 80 SSPE1 20 LLDPE2 | 55 VLDPE1 15 PLAS1 30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 68I

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier Coating Section | Tie #2 | Tie #3 | Abuse |
| ION | 70 SSPE5 30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 69I

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier Coating Section | Tie #2 | Tie #3 | Abuse |
| 80 SSPE1 20 LLDPE2 | 55 VLDPE1 15 PLAS1 30 EVA1 | EVA-2 | PVDC1 | EVA-2 | mEVA | PET3 |
| 0.3 mil | 0.73 mil | 0.11 mil | 0.18 mil | 0.09 mil | 0.14 mil | 0.11 mil |

Film 70I (@200 kV) and Film 70I (@500 kV)

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier Coating Section | Tie #2 | Tie #3 | Abuse |
| 80 SSPE1 20 LLDPE2 | 55 VLDPE1 15 PLAS1 30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 71I (prophetic)

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier Coating Section | Tie #2 | Tie #3 | Abuse |
| 80 SSPE1 20 LLDPE2 | 55 VLDPE1 15 PLAS1 30 EVA1 | EVA-2 | PVDC1 | EVA-2 | mEVA | 99 PETG5 1 MB2 |
| 0.3 mil | 0.73 mil | 0.11 mil | 0.18 mil | 0.09 mil | 0.14 mil | 0.11 mil |

-continued

| Film 72I (prophetic) | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 70 SSPE5 30 EVA1 | EVA-2 | PVDC1 | EVA-2 | mEVA | PETG5 |
| 0.3 mil | 0.73 mil | 0.11 mil | 0.18 mil | 0.09 mil | 0.14 mil | 0.11 mil |

| Film 73I (@200 kV) and 73I (@500 kV) | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 60 VLDPE1 10 EPDM 30 EVA1 | EVA-2 | PVDC1 | EVA-2 | mEVA | PETG5 |
| 0.3 mil | 0.73 mil | 0.11 mil | 0.18 mil | 0.09 mil | 0.14 mil | 0.11 mil |

| Film 74I (prophetic) | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 70 VLDPE1 30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

| Film 75I | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 85 VLDPE1 15 EVA5 | EVA-1 | PVDC1 | EVA-1 | mEVA | coPET1 |
| 0.31 mil | 0.72 mil | 0.11 mil | 0.18 mil | 0.09 mil | 0.24 mil | 0.11 mil |

| Film 76I | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 78 VLDPE1 22 EVA5 | EVA-1 | PVDC1 | EVA-1 | mEVA | coPET1 |
| 0.31 mil | 0.72 mil | 0.11 mil | 0.18 mil | 0.09 mil | 0.24 mil | 0.11 mil |

| Film 77 | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 60 VLDPE1 10 PLAS1 30 EVA-1 | EVA-1 | PVDC1 | EVA-1 | mEVA | coPET1 |
| 0.32 mil | 1.03 mil | 0.17 mil | 0.08 mil | 0.21 mil | 0.12 mil | 0.00 mil |

| Film 78I | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 65 VLDPE1 5 PLAS1 30 EVA-1 | EVA-1 | PVDC1 | EVA-1 | mEVA | coPET1 |
| 0.32 mil | 1.03 mil | 0.17 mil | 0.08 mil | 0.21 mil | 0.12 mil | 0.00 mil |

Film 79N

| Layer 1 | Layer 2 | Layer 3 | Layer 4 | Layer 5 | Layer 6 | Layer 7 |
| --- | --- | --- | --- | --- | --- | --- |
| Sealant Substrate | Core Section | Tie #1 | Barrier | Tie #2 Coating Section | Tie #3 | Abuse |
| 80 SSPE1 20 LLDPE2 | 65 VLDPE1 5 PLAS1 30 EVA-1 | EVA-1 | PVDC1 | EVA-1 | mEVA | PETG6 |
| 0.32 mil | 1.03 mil | 0.17 mil | 0.08 mil | 0.21 mil | 0.12 mil | 0.00 mil |

Film 80N

| Layer 1 | Layer 2 | Layer 3 | Layer 4 | Layer 5 | Layer 6 | Layer 7 |
| --- | --- | --- | --- | --- | --- | --- |
| Sealant Substrate | Core Section | Tie #1 | Barrier | Tie #2 Coating Section | Tie #3 | Abuse |
| 80 SSPE1 20 LLDPE2 | 55 VLDPE1 15 PLAS1 30 EVA-1 | EVA-1 | PVDC1 | EVA-1 | mEVA | PETG6 |
| 0.27 mil | 1.03 mil | 0.09 mil | 0.16 mil | 0.08 mil | 0.20 mil | 0.09 mil |

Film 81N

| Layer 1 | Layer 2 | Layer 3 | Layer 4 | Layer 5 | Layer 6 | Layer 7 |
| --- | --- | --- | --- | --- | --- | --- |
| Sealant Substrate | Core Section | Tie #1 | Barrier | Tie #2 Coating Section | Tie #3 | Abuse |
| 80 SSPE1 20 LLDPE2 | 55 SSPE7 15 PLAS1 30 EVA-1 | EVA-2 | PVDC1 | EVA-2 | mEVA | PET3 |
| 0.32 mil | 1.03 mil | 0.17 mil | 0.08 mil | 0.21 mil | 0.12 mil | 0.00 mil |

Film 82N

| Layer 1 | Layer 2 | Layer 3 | Layer 4 | Layer 5 | Layer 6 | Layer 7 |
| --- | --- | --- | --- | --- | --- | --- |
| Sealant Substrate | Core Section | Tie #1 | Barrier | Tie #2 Coating Section | Tie #3 | Abuse |
| 80 SSPE1 20 LLDPE2 | 55 VLDPE1 15 PLAS1 30 EVA-1 | EVA-2 | PVDC1 | EVA-2 | mEVA | PET3 |
| 0.30 mil | 0.73 mil | 0.11 mil | 0.18 mil | 0.09 mil | 0.14 mil | 0.11 mil |

Film 83

| Layer 1 | Layer 2 | Layer 3 | Layer 4 | Layer 5 | Layer 6 | Layer 7 |
| --- | --- | --- | --- | --- | --- | --- |
| Sealant Substrate | Core Section | Tie #1 | Barrier | Tie #2 Coating Section | Tie #3 | Abuse |
| 80 SSPE1 20 LLDPE2 | 55 VLDPE1 15 PLAS2 30 EVA-1 | EVA-1 | PVDC1 | EVA-1 | mEVA | PETG5 |
| 0.27 mil | 1.03 mil | 0.09 mil | 0.16 mil | 0.08 mil | 0.20 mil | 0.09 mil |

Film 84I

| Layer 1 | Layer 2 | Layer 3 | Layer 4 | Layer 5 | Layer 6 | Layer 7 |
| --- | --- | --- | --- | --- | --- | --- |
| Sealant Substrate | Core Section | Tie #1 | Barrier | Tie #2 Coating Section | Tie #3 | Abuse |
| ION | 70 VLDPE2 30 EVA-1 | EVA-2 | PVDC1 | EVA-2 | mEVA | coPET1 |
| 0.31 mil | 0.73 mil | 0.09 mil | 0.19 mil | 0.09 mil | 0.11 mil | 0.12 mil |

Film 85N

| Layer 1 | Layer 2 | Layer 3 | Layer 4 | Layer 5 | Layer 6 |
| --- | --- | --- | --- | --- | --- |
| Sealant Substrate | Core Section | Tie #1 | Barrier | Tie #2 | outer |
| 80 SSPE1 20 LLDPE2 | 70 VLDPE1 30 EVA-1 | EVA-2 | PVDC2 | EVA-2 | mEVA |
| 0.32 mil | 1.03 mil | 0.17 mil | 0.08 mil | 0.21 mil | 0.12 mil |

-continued

Film 86I

| Layer 1 | Layer 2 | Layer 3 | Layer 4 | Layer 5 | Layer 6 |
|---|---|---|---|---|---|
| Sealant Substrate | Core Section | Tie #1 | Barrier | Tie #2 | outer |
| ION | 70 VLDPE1 30 EVA-1 | EVA-2 | PVDC2 | EVA-2 | mEVA |
| 0.32 mil | 1.03 mil | 0.17 mil | 0.08 mil | 0.21 mil | 0.12 mil |

Film 87N

| Layer 1 | Layer 2 | Layer 3 | Layer 4 | Layer 5 | Layer 6 |
|---|---|---|---|---|---|
| Sealant Substrate | Core Section | Tie #1 | Barrier | Tie #2 | outer |
| 80 SSPE1 20 LLDPE2 | 70 VLDPE2 30 EVA-1 | EVA-2 | PVDC2 | EVA-2 | mEVA |
| 0.32 mil | 1.03 mil | 0.17 mil | 0.08 mil | 0.21 mil | 0.12 mil |

Film 88N

| Layer 1 | Layer 2 | Layer 3 | Layer 4 | Layer 5 | Layer 6 |
|---|---|---|---|---|---|
| Sealant Substrate | Core Section | Tie #1 | Barrier | Tie #2 | outer |
| 60 SSPE1 20 LLDPE2 20 MB3 | 70 VLDPE2 30 EVA-1 | EVA-2 | PVDC2 | EVA-2 | mEVA |
| 0.32 mil | 1.03 mil | 0.17 mil | 0.08 mil | 0.21 mil | 0.12 mil |

Film 89N

| Layer 1 | Layer 2 | Layer 3 | Layer 4 | Layer 5 | Layer 6 |
|---|---|---|---|---|---|
| Sealant Substrate | Core Section | Tie #1 | Barrier | Tie #2 | outer |
| 60 SSPE1 20 LLDPE2 20 MB3 | 70 VLDPE2 30 EVA-1 | EVA-2 | PVDC2 | EVA-2 | mEVA |
| 0.32 mil | 1.03 mil | 0.17 mil | 0.08 mil | 0.21 mil | 0.12 mil |

Film 90I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| 80 SSPE1 20 LLDPE2 | 70 VLDPE1 30 EVA1 | EVA 2 | PVDC1 | EVA 2 | EVA 3 | EPC |
| 0.3 mil | 0.83 mil | 0.11 mil | 0.21 mil | 0.11 mil | 0.13 mil | 0.14 mil |

Results of various tests on the films and packages were made, with the results set forth in Table 2, below. These tests included free shrink, instrumented impact energy-to-break, instrumented impact peak load, Truburst, post-shrink tear character, post-shrink haze, and drop testing. The free shrink, instrumented impact energy-to-break, instrumented impact peak load, and Truburst tests were carried out in accordance with the ASTM tests described above. The Drop & Simulated Distribution Testing and Grip and Tear Testing were conducted as described below.

Drop & Distribution Test

Fresh halves of beef bottom rounds (total of 21 samples) were packaged in a test material or control bag. Bags were sealed and vacuumized on a rotary vacuum chamber machine as disclosed in U.S. Pat. No. 6,499,274 to McDonald et al, which is hereby incorporated, in its entirety, by reference thereto.

A single seal wire was used, with the seal being made by running a current of from 68-72 amps for a time of 0.53 seconds with a sealing pressure of 15.

Packages were shrunk using a shrink tunnel at a water temperature of approximately 85° C. The packages were in the shrink tunnel for about 1-3 seconds.

Packages were inspected for complete seals and ensure they were hermetic before being placed in a cardboard box. Each box contained one product from each formulation plus the control. Each box was individually dropped one time from a height of 36 inches using a LANSMONT drop tester machine (Model "Field to Lab" # S/N M-15764). Approximately 15 minutes after being dropped, packages were checked for failures. Leaking packages were marked for later failure mode identification.

Using fresh packages and boxes, for films 1I, 59I, 66I, and 70I, additional or alternative drop testing was carried out in the same manner except that the drop was conducted from a height of 30 inches using the same LANSMONT drop testing machine, with the packages being checked for failure using the same procedure described above for the 36" drop.

Boxes of dropped products were resealed (without removing the packages broken during the Drop Testing) and secured on a shaker table for a Distribution Simulation Test, using a LANSMONT Vibration System. The Simulated Distribution Test was conducted in accordance with ASTM D4169, which is hereby incorporated, in its entirety, by reference thereto. The Simulated Distribution Test was conducted at Truck level II for one hour. At the conclusion of the Simulated Distribution Testing, the boxes were re-opened and the packages reevaluated for failures. The modes of failure were recorded following the end of the Simulated Distribution Test. After testing was competed and failure modes identified, the products were repackaged in a new package made from a different film, the packaging occurring under the same and conditions as described previously. The repackaged products were placed in a freezer at −20° F. for 45 minutes prior to the next round of testing.

In conducting the drop testing using films having a total free shrink of ≥90% @85C, it was found that sealing the bag closed with the usual product-to-seal distance of about 4 centimeters resulted in seals that were extremely close and tight to the product once the film was shrunk. When these tight packages were dropped at a height of 36", it was found that the hydraulic pressure created seal and bag failures at the applied seal area. The predominate failure modes seen after drop testing were bag ripping at applied seal and applied seal failures, majority of failures were seen after drop testing. Edge tearing became apparent when materials were sealed at ≥73 amps at 530 msec.

The results for the combined Drop Test & Simulated Distribution Test Drop for packages made from Films 1I, 1N, 2I, 2N, 52N, 58I, 58N, 59I, 66I, 69I, 70I, 84I, and 86I are provided in Table 2 below. Lowering the seal pressure did not lower the percentage of failures in the drop testing.

Grip and Tear Capability Evaluation

During this testing, post-shrink Grip-and-Tear properties of the packages were evaluated. Tear initiation was assessed by determining whether tearing from the tear initiators could be manually initiated using grip assisters as finger holes for exerting a pulling force perpendicular to the desired tear direction. Tear propagation was assessed by determining whether the tears propagated re through the heat seal and to the opposite edge of the package. Ease of tearing was also noted comparing different formulations and control.

During testing, there were five possible outcomes: (#1) upon exerting force via the grip assisters, the tears did not readily initiate and propagate from the tear initiators, but the outward pulling force from the grip assisters caused the grip assisters to rip out; (#2) upon exerting force via the grip assisters, the finger holes did not rip out, and the tears propagated up to the factory seal, after which: (#2A) no further tear propagation occurred from the tear initiator, as the grip assisters thereafter ripped out, or (#2B) further tearing propagated only within the skirt, towards a package edge, without propagating through the factory seal, or (#2C) further tear propagation was though the seal, but thereafter the tear propagated off to a side edge of the package and did not propagate down the full length of the package to the opposite edge of the package, or (#2D) further tear propagation was through the seal and thereafter propagated all the way down the bag to the opposite end of the packaging article.

Film 52N exhibited difficulty with the tear propagating through the factory seal, causing material to tear off and delaminate at the skirt outward of the factory seal. The ease of tear initiation and propagation was better in materials that were irradiated when compared to those that were not irradiated.

TABLE 2

| Film No | 3-comp blend (wt %, total film basis) | Plastomer (wt %, total blend weight basis) | IRR (kGy) | Total Free Shrink (L + T) @ 85° C. | Inst. Impact energy to break (J/mil) | Inst. Impact peal load (N/mil) | Tru-burst (psi/mil) | Post-shrink MD tear | Post shrink haze (%) | Drop Test + distrib Test (% fail @ 36"/30") |
|---|---|---|---|---|---|---|---|---|---|---|
| 1I | 44 | 15 | 64 | 97 | 0.87 | 82.5 | 10.2 | Yes (#2D) | | 24/8 |
| 1N | 44 | 15 | 0 | 97 | 0.62 | 63.9 | 7.8 | No (#1) | | 19/— |
| 2I | 0 | 0 | 64 | 82 | 0.68 | 76.2 | 10.1 | Yes (#2D) | | 33/— |
| 2N | 0 | 0 | 0 | 82 | 0.42 | 56.6 | 7.0 | Yes (#2D) | | 33/— |
| 3I | 0 | 0 | 64 | 94 | | | | | | |
| 3N | 0 | 0 | 0 | 99 | | | | | | |
| 4I | 0 | 0 | 64 | 98 | | | | | | |
| 4N | 0 | 0 | 0 | 92 | | | | | | |
| 5I | 0 | 0 | 64 | 98 | | | | | | |
| 5N | 0 | 0 | 0 | | | | | | | |
| 6I | 0 | 0 | 64 | | | | | | | |
| 6N | 0 | 0 | 0 | | | | | | | |
| 7I | 0 | 0 | 64 | | | | | | | |
| 7N | 0 | 0 | 0 | | | | | | | |
| 8I | 0 | 0 | 64 | 99 | | | | | | |
| 8N | 0 | 0 | 0 | | | | | | | |
| 9I | 44 | 15 | 64 | 98 | | 82.5 | 10.2 | | | |
| 9N | 44 | 15 | 0 | 100 | | 63.9 | 7.8 | | | |
| 10I | 44 | 15 | 64 | | | | | | | |
| 10N | 44 | 15 | 0 | | | | | | | |
| 11N | 43.1 | 15 | 0 | | | | | | | |
| 12N | 43.1 | 15 | 0 | 99 | | | | | 6.3 | |
| 13N | 0 | 0 | 0 | | | | | | | |
| 14N | 43.1 | 15 | 0 | | | | | | | |
| 15N | 43.1 | 30 | 0 | | | | | | | |
| 16N | 43.1 | 15 | 0 | | | | | | | |
| 17N | 43.1 | 15 | 0 | 81.5 | | | | | 7.2 | |
| 20N | 43.1 | 15 | 0 | | | | | | | |
| 21N | 43.1 | 15 | 0 | 94.5 | | | | | 7.9 | |
| 22N | 43.1 | 15 | 0 | | | | | | | |

TABLE 2-continued

| Film No | 3-comp blend (wt %, total film basis) | Plastomer (wt %, total blend weight basis) | IRR (kGy) | Total Free Shrink (L + T) @ 85° C. | Inst. Impact energy to break (J/mil) | Inst. Impact peal load (N/mil) | Tru-burst (psi/mil) | Post-shrink MD tear | Post shrink haze (%) | Drop Test + distrib Test (% fail @ 36"/30" |
|---|---|---|---|---|---|---|---|---|---|---|
| 23N | 43.1 | 15 | 0 | | | | | | | |
| 24I | 44 | 15 | 64 | 92.5 | | 75.4 | 9.2 | | | |
| 24I-H | 44 | 15 | 0 | 94.5 | | 66.5 | 9.9 | | | |
| 24N-T | 44 | 15 | 0 | 93.5 | | 61.3 | 7.3 | | | |
| 24N-H | 44 | 15 | 0 | 97 | | 58.6 | 7.4 | | | |
| 25 | | | | | | | | | | |
| 25I-T | 44 | 15 | 64 | 99 | | 76.1 | 10.2 | | | |
| 25I-H | 44 | 15 | 64 | 98 | | 78.9 | 10.2 | | | |
| 25N-T | 44 | 15 | 0 | 92 | | 58.1 | 7.6 | | | |
| 25N-H | 44 | 15 | 0 | 90 | | 50.1 | 7.5 | | | |
| 26I | 44 | 15 | 64 | 94 | | | | | | |
| 27I | 44 | 15 | 64 | 84.5 | | 60.5 | 7.5 | | | |
| 28I | 0 | 3.6 | 64 | 92 | | 93.4 | 9.9 | | | |
| 28N | 0 | 3.6 | 0 | | | | | | | |
| 29 | 0 | | | | | | | | | |
| 29I-T | 0 | 0 | 64 | | | | 10.7 | | | |
| 29I-H | 0 | 0 | 64 | 95 | | 82.5 | 11.4 | | | |
| 29N-T | 0 | 0 | 0 | 96 | | 58.1 | 8.7 | | | |
| 29N-H | 0 | 0 | 0 | 88 | | 66.5 | 8.7 | | | |
| 30I | 44 | 15 | 64 | 96 | | | 10.6 | | | |
| 31I | 44 | 15 | N/P | N/P | N/P | N/P | N/P | | | |
| 32I | 44 | 15 | 64 | | | | | | | |
| 33I | 44 | 15 | 64 | 96 | | 78.9 | 9.9 | | | |
| 34N | 45 | 15 | 0 | 93 | | | | | | |
| 35 | 0 | 0 | | | | | | | | |
| 35I-T | 0 | 0 | 64 | 88.5% | | 95.4 | 10.6 | | | |
| 35I-H | 0 | 0 | 64 | 92% | | 84.5 | 11.0 | | | |
| 35N-T | 0 | 0 | 0 | 86% | | 70.2 | 8.6 | | | |
| 35N-H | 0 | 0 | 0 | 89% | | 76.0 | 8.8 | | | |
| 36I | 44 | 15 | 64 | | | | | | | |
| 37I | 44 | 15 | 64 | 91% | | | 9.6 | | | |
| 38I | 44 | 10 | 64 | 86 | | | 9.0 | | | |
| 39I | 44 | 15 | 64 | 81 | | | 8.3 | | | |
| 40I | 44 | 15 | 64 | | | | | | | |
| 41I | 44 | 15 | 64 | 85 | | | 8.9 | | | |
| 42I | 44 | 10 | 64 | | | | | | | |
| 43N | 43.1 | 15 | 0 | | | | | | | |
| 44N | 43.1 | 15 | 0 | | | | | | | |
| 45N | 43.1 | 15 | 0 | | | | | | | |
| 46N | 43.1 | 15 | 0 | | | | | | | |
| 47N | 0 | 0 | 0 | | | | | | | |
| 48N | 43.1 | 15 | 0 | | | | | | | |
| 49N | 43.1 | 15 | 0 | | | | | | | |
| 50N | 43.1 | 15 | 0 | | | | | | | |
| 51N | 42.7 | 15 | 0 | | | | | | | |
| 52N | 42.7 | 15 | 0 | 94 | | | 6.9 | | | 52/— |
| 53N | 42.7 | 15 | 0 | | | | | | | |
| 54N | 42.7 | 15 | 0 | | | | | | | |
| 55N | 0 | 0 | 0 | 92% | | | 7.2 | | | |
| 56N | 0 | 0 | 0 | 109% | | | 8.8 | | | |
| 57N | 0 | 0 | 0 | | | | 7.2 | | | |
| 58I | 0 | 0 | 0 | 80 | | | 9.4 | | | 24/— |
| 58N | 0 | 0 | 0 | 79 | | | 8.1 | | | 19/— |
| 59I | 44 | 15 | 64 | 93 | | | 7.3 | Yes (#2D) | | 14/4 |
| 60I | 0 | 0 | 64 | | | | | | | |
| 61I | 0 | 0 | 64 | 63 | | | 9.9 | | | |
| 62I | 0 | 0 | 64 | | | | | | | |
| 63I | 0 | 0 | 64 | | | | | | | |
| 64I | 0 | 0 | 64 | | | | | | | |
| 65I | 0 | 0 | 64 | | | | | | | |
| 66I | 44 | 15 | 64 | 98 | 0.65 | 74.0 | 8.9 | Yes (#2D) | 58 | 25/4 |
| 67I | 44 | 15 | 64 | 95 | | | | | | |
| 68I | 0 | 0 | 64 | | | | | | | |
| 69I | 44 | 15 | 64 | 103 | 0.70 | 81.9 | 10.3 | Yes (#2D) | 56 | 46/— |
| 70I | 44 | 15 | 64 | | | | | | | —/4 |
| 71I | 44 | 15 | 64 | N/P | N/P | N/P | N/P | N/P | N/P | N/P |
| 72I | 0 | 0 | 64 | N/P | N/P | N/P | N/P | N/P | N/P | N/P |
| 73I | 0 | 0 | 64 | | | | | | | |
| 74I | 0 | 0 | 64 | N/P | N/P | N/P | N/P | N/P | N/P | N/P |
| 75I | 0 | 0 | 64 | 89 | | | 10.6 | Yes (#2D) | | |
| 75N | 0 | 0 | 0 | 89 | | | 8.6 | No | | |
| 76I | 0 | 0 | 64 | 84 | 0.66 | 76.1 | 9.3 | Yes (#2D) | | |
| 77 | 53.4 | 10 | | | | | | | | |
| 78N | 53.4 | 5 | 0 | | | | | | | |

TABLE 2-continued

| Film No | 3-comp blend (wt %, total film basis) | Plastomer (wt %, total blend weight basis) | IRR (kGy) | Total Free Shrink (L + T) @ 85° C. | Inst. Impact energy to break (J/mil) | Inst. Impact peal load (N/mil) | Tru-burst (psi/mil) | Post-shrink MD tear | Post shrink haze (%) | Drop Test + distrib Test (% fail @ 36"/30") |
|---|---|---|---|---|---|---|---|---|---|---|
| 79N | 53.4 | 5 | 0 | | | | | | | |
| 80N | 53.6 | 15 | 0 | | | | | | | |
| 81N | 53.6 | 15 | 0 | 78 | | | 8.5 | | | |
| 82N | 44 | 15 | 0 | | | | | | | |
| 83 | 44 | 15 | | | | | | | | |
| 84I | 0 | 0 | 0 | 103 | | | 9.2 | No | | 29/— |
| 85N | 0 | 0 | 0 | 94 | | | 8.0 | | | |
| 86N | 0 | 0 | 0 | 101 | | | 8.0 | No | | 25/— |
| 87N | 0 | 0 | 0 | 96 | | | 6.7 | | | |
| 88N | 0 | 0 | 0 | 89 | | | | | | |
| 89N | 0 | 0 | 0 | | | | | | | |
| 90I | 0 | 0 | 64 | | | | | | | |

Results of Testing

Films 1I, 66I, and 69I were the only plastomer-containing films having an irradiated substrate which were tested for each of (i) shrink, (ii) energy-to-break, and (ii) post-shrink full-length MD tear. Moreover, Films 1I, 66I, and 69I were also the only films found to exhibit the combination of (i) at least 90% total free shrink @85° C., (ii) energy-to-break value of at least 0.65 J/mil, and (iii) post-shrink full-length MD tear. Film 1I had a layer containing a blend which was 15 wt % plastomer, with the plastomer making up 6.6 wt % of the film, on a total film weight basis.

As can be seen in the table above, of the plastomer-containing films which exhibited (i) more than 90% total free shrink @85° C. and (iii) full-length post-shrink MD tear, all had irradiated substrates (Films 1I, Film 59I, Film 66I, and Film 69I). Importantly, Film 1N, which differed from Film 1I only in that it was not irradiated, did not exhibit a full-length post-shrink MD tear. An attempt to tear Film 1N using grip assisters resulted in the grip assisters tearing out, rather than the film exhibiting full-length post-shrink MD tear from the tear initiators. A surprising result of this data was the conclusion that for plastomer-containing films having a total free shrink of at least 90% @85C, the presence of a cross-linked polymer network (i.e., produced by irradiation of the substrate in these examples) is necessary if the film is to exhibit full-length post-shrink MD tear.

A comparison of the relatively low 82% total free shrink @85° C. for Film 2I, versus the considerably higher 97% total free shrink @85° C. for Film 1I, revealed the surprising result that the addition of plastomer resulted in a 19% increase in the total free shrink @85° C., in combination with an increase in the energy-to-break from 0.68 J/mil (Film 2I) to 0.87 J/mil (Film 1I), i.e., a 28% increase in the energy-to-break.

Film 59I, which was plastomer-containing and had the shrink and tear properties of Films 1I, 66I, and 69I, if tested for energy-to-break, may also be found to exhibit an energy-to-break of at least 0.65 J/mil. However, this would only confirm the surprising result of the combination of shrink, energy-to-break, and post-shrink full-length linear tear combination of features discovered in Films 1I, 66I, and 69I.

A further comparison of Film 11 with Film 2I reveals that the presence of the plastomer improved performance in the drop test+distribution test. Although this improvement may be related to the increase in the energy-to-break of the film, the dominant failure modes from the drop test+distribution test were found to be: (i) bags ripping beside the applied seal (i.e., the seal which closed the bag after the meat was placed inside the bag), and (ii) applied seal failures. Moreover, if sealing was carried out by applying ≥73 amps to the seal wire for 0.53 seconds, edge tears (i.e., tearing along the seal due to film weakening from too much film thinning during sealing) were a failure mode found to occur during drop testing. Thus, the drop test failure modes show that drop test results are not simply an equivalent of energy-to-break. Rather, drop test results are related to the integrity of the film around the seal and the ability of the film to form strong seals, particularly seals through contamination.

As set forth in the table above, Film 1I had a 36" Drop+Distribution Test failure rate of 24%, while Film 2I had a 33% failure rate in the same test. Thus, the addition of the plastomer to the film not only resulted in an 18% increase in total free shrink @85° C. and a 28% increase in the energy-to-break, but also produced packages which exhibited a 27% decrease in failure rate in the 36" drop test. This Drop+Distribution Test data is considered to confirm the surprising result of the combination of high total free shrink and high impact strength possessed by the film of the invention.

Various and additional embodiments of the disclosed subject matter are described and recited in the following sentences A through YYY.

A. A packaging article comprises a multilayer, heat-shrinkable film comprising a first film portion laminated to a second film portion, wherein: A) the first film portion comprises a first layer which is a first outer layer and which is an inside layer of the packaging article and which serves as a heat-seal layer, the first film portion comprising a cross-linked polymer network; B) the second film portion comprises (b)(i) a second layer which is a second outer layer and which comprises polyester, the second outer layer being an outside layer of the packaging article, and (b)(ii) a third layer which is an oxygen barrier layer comprising at least one member selected from the group consisting of polyvinylidene chloride, saponified ethylene/vinyl acetate copolymer, polyamide, polyester, polypropylene, ethylene homopolymer, polyethylene naphthalate, polytrimethylene terephthalate, liquid crystal polymer, and $O_2$-scavenger, the third layer being between the first layer and the second layer; C) the multilayer, heat-shrinkable film further comprises a plastomer having peak melt point of less than 90° C., the plastomer being present in the first film portion or the second film portion, the plastomer being present in the multilayer, heat-shrinkable film in an amount of at least 3 wt %, based on total film weight; D) the multilayer, heat-shrinkable film further comprises an incompatible polymer blend comprising at least one member selected from the group consisting of: (c)(i) a blend of from 90 to 30 wt % ethylene homopolymer and/or ethylene/alpha-olefin copolymer with from 10 to 70 wt % ethylene/unsaturated ester copolymer having an unsaturated ester content of at least 10 wt %, (c)(ii) a blend of ionomer resin with ethylene/unsaturated ester copolymer, and/or polybutylene, and/or propylene homopolymer and/or propylene copolymer, (c)(iii) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, and anhydride-modified ethylene/alpha-olefin copolymer, (c)(iv) a blend of from 10 to 75 wt % ethylene/unsaturated ester copolymer with from 90 to 15 wt % polypropylene and/or propylene/ethylene copolymer, and/or polybutylene, and/or modified ethylene/alpha-olefin copolymer, and/or styrene homopolymer, and/or styrene/butadiene copolymer, (c)(v) a blend of ethylene/norbornene copolymer with ethylene/unsaturated ester copolymer and/or polypropylene and/or polybutylene, (c)(vi) a blend of from 90 to 15 wt % ethylene/alpha-olefin copolymer with from 10 to 75 wt % polypropylene and/or polybutylene and/or ethylene/norbornene, (c)(vii) a blend of from 90 to 25 wt % homogeneous propylene homopolymer and/or homogeneous propylene copolymer with from 10 to 75 wt % homogeneous ethylene/alpha-olefin copolymer and/or ethylene/unsaturated ester copolymer, (c)(viii) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer, (c)(ix) a blend of polyamide with polystyrene and/or ethylene/alpha-olefin copolymer and/or ethylene/vinyl acetate copolymer and/or styrene/butadiene copolymer, and (c)(x) a blend of polyamide 6 and polyamide 6I6T, with the incompatible polymer blend being in the first film portion or the second film portion, the incompatible polymer blend being present in the multilayer, heat-shrinkable film in an amount of at least 10 wt %, on a total film weight basis; and the inside layer of the packaging article is heat sealed to itself at a heat seal, the packaging article having a first side and a second side, the article having a skirt or header outward of the heat seal, the skirt or header comprising an article edge and a pair of tear initiators, each pair of tear initiators having a first tear initiator and a second tear initiator, the first tear initiator of the pair being in the first side of the article, and the second tear initiator of the pair being in the second side of the article, the article being capable of having a manually-initiated, manually-propagated first tear in the first side of the article, and a manually-initiated and manually-propagated second tear in the second side of the article, the first tear and the second tear each being capable of being propagated in a machine direction from the pair of first and second tear initiators, with each tear being propagated in the machine direction through the heat seal and down the length of the article, or across the article, with each tear being capable of being manually propagated in the machine direction through and to an opposite article edge, so that upon using the multilayer film to make a packaged product by placing a product inside the article with the article being sealed closed around the product so that a package is formed, and thereafter shrinking the film around the product, the resulting package can be manually opened, and the product readily removed from the package, by manually initiating machine-direction tears from the first and second tear initiators, with the tears being manually propagated through the seal and to the opposite edge of the article; and the multilayer film has a total free shrink at 85° C. of at least 90% measured in accordance with ASTM D2732, and an instrumented impact energy-to-break of at least 0.65 J/mil, measured in accordance with ASTM D3763.

B. The packaging article of sentence A, wherein the plastomer is present in the seal layer.

C. The packaging article of sentence A, wherein the plastomer is present in a core layer in the first film portion.

D. The packaging article of sentence A wherein the core layer in the first film portion comprises the incompatible polymer blend.

E. The packaging article of any one of previous sentences A to D wherein the film comprises the incompatible polymer blend (c)(i), which incompatible polymer blend further comprises the plastomer, with the ethylene homopolymer and/or ethylene/α-olefin copolymer being present in the incompatible polymer blend in an amount at least twice the weight percent of the plastomer in the blend, based on total blend weight.

F. The packaging article of sentence E, wherein the ethylene/unsaturated ester in the incompatible polymer blend has an ester content of at least 12 wt %, based on weight of ethylene/unsaturated ester copolymer.

G. The packaging article of sentence F, wherein the ethylene homopolymer and/or ethylene/α-olefin copolymer is present in the incompatible polymer blend in an amount of from 40 to 75 wt % based on blend weight, the plastomer is present in the incompatible polymer blend in an amount of from 5 to 30 wt % based on blend weight, and the ethylene/unsaturated ester is present in the incompatible polymer blend in an amount of from 10 to 50 wt % based on blend weight.

H. The packaging article of sentence F, wherein the ethylene homopolymer and/or ethylene/α-olefin copolymer is present in the incompatible polymer blend in an amount of from 45 to 70 wt % based on blend weight, the plastomer is present in the incompatible polymer blend in an amount of from 8 to 25 wt % based on blend weight, and the ethylene/unsaturated ester is present in the incompatible polymer blend in an amount of from 20 to 40 wt % based on blend weight.

G. The packaging article of sentence F, wherein the ethylene homopolymer and/or ethylene/α-olefin copolymer is present in the incompatible polymer blend in an amount of from 50 to 60 wt % based on blend weight, the plastomer is present in the incompatible polymer blend in an amount of from 10 to 20 wt % based on blend weight, and the ethylene/unsaturated ester is present in the incompatible polymer blend in an amount of from 25 to 35 wt % based on blend weight.

H. The packaging article of any one of previous sentences A to G, wherein the multilayer film contains the incompatible polymer blend in an amount of from 20 to 95 weight percent, based on the weight of the multilayer film.

I. The packaging article of any one of previous sentences A to G, wherein the multilayer film contains the incompatible polymer blend in an amount of from 30 to 70 wt %, based on the weight of the multilayer film.

J. The packaging article of any one of previous sentences A to I, wherein the oxygen barrier layer comprises polyvinylidene chloride.

K. The packaging article of any one of previous sentences A to I, wherein the film has a total thickness, before shrinking, of from 0.7 mil to 3.5 mils.

L. The packaging article of any one of previous sentences A to I, wherein the film has a total thickness, before shrinking, of from 1 mil to 3 mils.

M. The packaging article of any one of previous sentences A to I, wherein the film has a total thickness, before shrinking, of from 1.3 mils to 2 mils.

N. The packaging article of any one of previous sentences A to M, wherein the film has a total thickness, before shrinking, of from 1.5 mil to 1.8 mils.

O. The packaging article of any one of previous sentences A to N, wherein the polyester in the second outer layer comprises at least one member selected from the group consisting of polyethylene terephthalate homopolymer, polyethylene terephthalate copolymer, polybutylene terephthalate homopolymer, polybutylene terephthalate copolymer, polynaphthalene terephthalate homopolymer, polynaphthalene terephthalate copolymer, polyethylene furanoate homopolymer, and polyethylene furanoate copolymer, and amorphous polyester.

P. The packaging article of any one of previous sentences A to O, wherein the polyester has a melting point of from 240° C. to 275° C.

Q. The packaging article of any one of previous sentences A to P, wherein the multilayer film further comprises a tie layer between oxygen barrier layer and the outside layer, the tie layer comprising at least one member selected from the group consisting of anhydride-functional polyolefin, anhydride-functional ethylene/unsaturated acid copolymer, anhydride-functional olefin/unsaturated ester copolymer, cyclic olefin copolymer, acrylate-based polymer, polyurethane, styrene-based polymer.

R. The packaging article of any one of previous sentences A to Q, wherein the crosslinked polymer network is formed by irradiating the first film portion at a level of from 30 to 120 kGy.

S. The packaging article of any one of previous sentences A to R, wherein the multilayer film exhibits a post-shrink specular gloss at 60 degrees of at least 110 gloss units, measured in accordance with ASTM D2457.

T. The packaging article of any one of previous sentences A to S, wherein the multilayer film exhibits a total free shrink at 85° C. of at least 95%, measured in accordance with ASTM D2732.

U. The packaging article of any one of previous sentences A to T, wherein the ethylene/alpha-olefin plastomer has a melt index ≤1.1 dg/min.

V. The packaging article of any one of previous sentences A to U, wherein the plastomer has a peak melting point ≤88° C.

W. The packaging article of any one of previous sentences A to U, wherein the plastomer has a peak melting point ≤85° C.

X. The packaging article of any one of previous sentences A to U, wherein the plastomer has a peak melting point ≤82° C.

Y. The packaging article of any one of previous sentences A to U, wherein the plastomer has a peak melting point ≤80° C.

Z. The packaging article of any one of previous sentences A to U, wherein the plastomer has a peak melting point of from 45° C. to 90° C.

AA. The packaging article of any one of previous sentences A to U, wherein the plastomer has a peak melting point of from 50° C. to 85° C.

BB. The packaging article of any one of previous sentences A to U, wherein the plastomer has a peak melting point of from 55° C. to 85° C.

CC. The packaging article of any one of previous sentences A to U, wherein the plastomer has a peak melting point of from 45° C. to 80° C.

DD. The packaging article of any one of previous sentences A to U, wherein the ethylene/alpha-olefin plastomer has a density ≤0.908 g/cc$^3$.

EE. The packaging article of any one of previous sentences A to U, wherein the ethylene/alpha-olefin plastomer has a density ≤0.905 g/cc$^3$.

FF. The packaging article of any one of previous sentences A to U, wherein the ethylene/alpha-olefin plastomer has a density ≤0.902 g/cc$^3$.

GG. The packaging article of any one of previous sentences A to U, wherein the ethylene/alpha-olefin plastomer has a density ≤0.900 g/cc$^3$.

HH. The packaging article of any one of previous sentences A to U, wherein the ethylene/alpha-olefin plastomer has a density ≤0.895 g/cc$^3$.

II. The packaging article of any one of previous sentences A to U, wherein the ethylene/alpha-olefin plastomer has a density ≤0.890 g/cc$^3$.

JJ. The packaging article of any one of previous sentences A to U, wherein the ethylene/alpha-olefin plastomer has a density ≤0.886 g/cc$^3$.

KK. The packaging article of any one of previous sentences A to U, wherein the plastomer has a density of from 0.857 to 0.908 g/cm$^3$.

LL. The packaging article of any one of previous sentences A to U, wherein the plastomer has a density of from 0.86 to 0.905 g/cm$^3$.

MM. The packaging article of any one of previous sentences A to U, wherein the plastomer has a density of from 0.87 to 0.903 g/cm$^3$.

NN. The packaging article of any one of previous sentences A to U, wherein the plastomer has a density of from 0.875 to 0.902 g/cm$^3$.

OO. The packaging article of any one of previous sentences A to U, wherein the plastomer has a density of from 0.88 to 0.900 g/cm$^3$.

PP. The packaging article of any one of previous sentences A to U, wherein the plastomer has a density of from 0.88 to 0.895 g/cm$^3$.

QQ. The packaging article of any one of previous sentences A to U, wherein the plastomer has a density of from 0.88 to 0.89 g/cm$^3$.

RR. The packaging article of any one of previous sentences A to QQ, wherein the multilayer film has an instrumented impact energy-to-break of at least 0.70 J/mil measured in accordance with ASTM D3763, and the plastomer has a melt index of ≤1.1 grams/10 min, measured in accordance with ASTM D1238.

SS. The packaging article of any one of previous sentences A to RR, wherein the plastomer is present in the multilayer film in an amount of at least 3 wt %, on a total film weight basis.

TT. The packaging article of any one of previous sentences A to SS, wherein the multilayer film exhibits a total free shrink at 85° C. of at least 100%, measured in accordance with ASTM D2732.

UU. The packaging article of any one of previous sentences A to SS, wherein the multilayer film exhibits a total free shrink at 85° C. of at least 105%, measured in accordance with ASTM D2732.

VV. The packaging article of any one of previous sentences A to UU, wherein the header or skirt further comprises at least one grip assister for assisting grip of the multilayer film during manual tearing.

WW. The packaging article of sentence VV, wherein the grip assister has a hanging chad therein.

XX. The packaging article of any one of previous sentences A to WW, wherein the first tear initiator is aligned over the second tear initiator, and the skirt further comprise a first grip assister between the pair of tear initiators and a first end of the skirt, and a second grip assister between the pair of tear initiators and a second end of the skirt.

YY. The packaging article of sentence XX, wherein the first and second grip assisters each have a hanging chad therein.

ZZ. The packaging article of any one of previous sentences A to YY, wherein a portion of the skirt or header on the first side of the article is heat-set, and a corresponding portion of the skirt or header on the second side of the article is also heat-set.

AAA. The packaging article of sentence ZZ, wherein the heat-set portion of the first and second sides of the article comprises a perimeter seal of the inside layer of the film to itself.

BBB. The packaging article of any one of previous sentences A to AAA, wherein the packaging article is an end-seal bag and the first and second tear initiators are present in the bag skirt.

CCC. The packaging article of any one of previous sentences A to AAA, wherein the packaging article is a side-seal bag having a folded bottom, a first side seal, a second side seal, and an open top.

DDD. The packaging article of any one of previous sentences A to AAA, wherein the packaging article is a pouch having a bottom seal, a first side seal, and a second side seal.

EEE. The packaging article of any one of previous sentences A to AAA, wherein the packaging article is a form-fill-seal packaging article having a fin seal running the length of the package and first and second end seals, with the form-fill-seal packaging article enclosing a product therein.

FFF. The packaging article of any one of previous sentences A to EEE, wherein the packaging article has a patch adhered thereto, the patch comprising a patch film.

GGG. The packaging article of any one of previous sentences A to FFF, wherein the crosslinked polymer network has been strained by solid state orientation.

HHH. The packaging article of any one of previous sentences A to GGG, wherein the multilayer film comprises polyamide in an amount of from 0.1 to 10 wt %, based on total film weight.

III. The packaging article of any one of previous sentences A to GGG, wherein the multilayer film does not comprise polyamide.

JJJ. A packaging article comprises a multilayer, heat-shrinkable film comprising a first film portion laminated to a second film portion, wherein: A) the first film portion comprises a first layer which is a first outer layer and which is an inside layer of the packaging article and which serves as a heat-seal layer, the first film portion comprising a cross-linked polymer network; B) the second film portion comprises (b)(i) a second layer which is a second outer layer and which comprises polyester, the second outer layer being an outside layer of the packaging article, and (b)(ii) a third layer which is an oxygen barrier layer comprising at least one member selected from the group consisting of polyvinylidene chloride, saponified ethylene/vinyl acetate copolymer, polyamide, polyester, polypropylene, ethylene homopolymer, polyethylene naphthalate, polytrimethylene terephthalate, liquid crystal polymer, and $O_2$-scavenger, the third layer being between the first layer and the second layer; C) the multilayer, heat-shrinkable film further comprises an ethylene/alpha-olefin plastomer having peak melt point of less than 90° C., the plastomer being present in the first film portion or the second film portion, the plastomer being present in the multilayer, heat-shrinkable film in an amount of at least 3 wt %, based on total film weight; D) the multilayer, heat-shrinkable film further comprises an incompatible polymer blend comprising at least one member selected from the group consisting of: (c)(i) a blend of from 90 to 30 weight percent ethylene homopolymer and/or ethylene/alpha-olefin copolymer with from 10 to 70 weight percent ethylene/unsaturated ester copolymer having an unsaturated ester content of at least 10 weight percent, (c)(ii) a blend of ionomer resin with ethylene/unsaturated ester copolymer, and/or polybutylene, and/or propylene homopolymer and/or propylene copolymer, (c)(iii) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, and anhydride-modified ethylene/alpha-olefin copolymer, (c)(iv) a blend of from 10 to 75 weight percent ethylene/unsaturated ester copolymer with from 90 to 15 weight percent polypropylene and/or propylene/ethylene copolymer, and/or polybutylene, and/or modified ethylene/alpha-olefin copolymer, and/or styrene homopolymer, and/or styrene/butadiene copolymer, (c)(v) a blend of ethylene/norbornene copolymer with ethylene/unsaturated ester copolymer and/or polypropylene and/or polybutylene, (c)(vi) a blend of from 90 to 15 weight percent ethylene/alpha-olefin copolymer with from 10 to 75 weight percent polypropylene and/or polybutylene and/or ethylene/norbornene, (c)(vii) a blend of from 90 to 25 weight percent homogeneous propylene homopolymer and/or homogeneous propylene copolymer with from to 75 weight percent homogeneous ethylene/alpha-olefin copolymer and/or ethylene/unsaturated ester copolymer, (c)(viii) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer, (c)(ix) a blend of polyamide with polystyrene and/or ethylene/alpha-olefin copolymer and/or ethylene/vinyl acetate copolymer and/or styrene/butadiene copolymer, and (c)(x) a blend of polyamide 6 and polyamide 6I6T, with the incompatible polymer blend being in the first film portion or the second film portion, the incompatible polymer blend being present in the multilayer, heat-shrinkable film in an amount of at least 10 wt %, on a total film weight basis; and the inside layer of the packaging article is heat sealed to itself at a heat seal, the packaging article having a first side and a second side, the article having a skirt or header outward of the heat seal, the skirt or header comprising an article edge and a pair of tear initiators, each pair of tear initiators having a first tear initiator and a second tear initiator, the first tear initiator of the pair being in the first side of the article, and the second tear initiator of the pair being in the second side of the article, the article being capable of having a manually-initiated, manually-propagated first tear in the first side of the article, and a manually-initiated and manually-propagated second tear in the second side of the article, the first tear and the second tear each being capable of being propagated in a machine direction from the pair of first and second tear initiators, with each tear being propagated in the machine direction through the heat seal and down the length of the article, or across the article, with each tear being capable of being manually propagated in the machine direction through and to an opposite article edge, so that upon using the multilayer film to make a packaged product by placing a product inside the article with the article being sealed closed around the product so that a package is formed, and thereafter shrinking the film around the product, the resulting package can be manually opened, and the product readily removed from the package, by manually initiating machine-direction tears from the first and second tear initiators, with the tears being manually propagated through the seal and to the opposite edge of the article; and the multilayer film has a total free shrink at 85° C. of at least 90% measured in accordance with ASTM D2732, and an instrumented impact peak load strength of at least 66 Newtons/mil, measured in accordance with ASTM D3763.

KKK. The packaging article of sentence JJJ, wherein the instrumented impact peak load strength of the multilayer film is at least 70 Newtons/mil.

LLL. The packaging article of sentence JJJ, wherein the instrumented impact peak load strength of the multilayer film is at least 75 Newtons/mil.

MMM. The packaging article of sentence JJJ, wherein the instrumented impact peak load strength of the multilayer film is at least 77 Newtons/mil.

NNN. The packaging article of sentence JJJ, wherein the instrumented impact peak load strength of the multilayer film is at least 80 Newtons/mil.

OOO. A packaging article comprises a multilayer, heat-shrinkable film comprising a first film portion laminated to a second film portion, wherein: A) the first film portion comprises a first layer which is a first outer layer and which is an inside layer of the packaging article and which serves as a heat-seal layer, the first film portion comprising a cross-linked polymer network; B) the second film portion comprises (b)(i) a second layer which is a second outer layer and which comprises polyester, the second outer layer being an outside layer of the packaging article, and (b)(ii) a third layer which is an oxygen barrier layer comprising at least one member selected from the group consisting of polyvinylidene chloride, saponified ethylene/vinyl acetate copolymer, polyamide, polyester, polypropylene, ethylene homopolymer, polyethylene naphthalate, polytrimethylene terephthalate, liquid crystal polymer, and $O_2$-scavenger, the third layer being between the first layer and the second layer; C) the multilayer, heat-shrinkable film further comprises an ethylene/alpha-olefin plastomer having peak melt point of less than 90° C., the plastomer being present in the first film portion or the second film portion, the plastomer being present in the multilayer, heat-shrinkable film in an amount of at least 3 wt %, based on total film weight; D) the multilayer, heat-shrinkable film further comprises an incompatible polymer blend comprising at least one member selected from the group consisting of: (c)(i) a blend of from 90 to 30 weight percent ethylene homopolymer and/or ethylene/alpha-olefin copolymer with from 10 to 70 weight percent ethylene/unsaturated ester copolymer having an unsaturated ester content of at least 10 weight percent, (c)(ii) a blend of ionomer resin with ethylene/unsaturated ester copolymer, and/or polybutylene, and/or propylene homopolymer and/or propylene copolymer, (c)(iii) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, and anhydride-modified ethylene/alpha-olefin copolymer, (c)(iv) a blend of from 10 to 75 weight percent ethylene/unsaturated ester copolymer with from 90 to 15 weight percent polypropylene and/or propylene/ethylene copolymer, and/or polybutylene, and/or modified ethylene/alpha-olefin copolymer, and/or styrene homopolymer, and/or styrene/butadiene copolymer, (c)(v) a blend of ethylene/norbornene copolymer with ethylene/unsaturated ester copolymer and/or polypropylene and/or polybutylene, (c)(vi) a blend of from 90 to 15 weight percent ethylene/alpha-olefin copolymer with from 10 to 75 weight percent polypropylene and/or polybutylene and/or ethylene/norbornene, (c)(vii) a blend of from 90 to 25 weight percent homogeneous propylene homopolymer and/or homogeneous propylene copolymer with from 10 to 75 weight percent homogeneous ethylene/alpha-olefin copolymer and/or ethylene/unsaturated ester copolymer, (c)(viii) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer, (c)(ix) a blend of polyamide with polystyrene and/or ethylene/alpha-olefin copolymer and/or ethylene/vinyl acetate copolymer and/or styrene/butadiene copolymer, and (c)(x) a blend of polyamide 6 and polyamide 6I6T, with the incompatible polymer blend being in the first film portion or the second film portion, the incompatible polymer blend being present in the multilayer, heat-shrinkable film in an amount of at least 10 wt %, on a total film weight basis; and the inside layer of the packaging article is heat sealed to itself at a heat seal, the packaging article having a first side and a second side, the article having a skirt or header outward of the heat seal, the skirt or header comprising an article edge and a pair of tear initiators, each pair of tear initiators having a first tear initiator and a second tear initiator, the first tear initiator of the pair being in the first side of the article, and the second tear initiator of the pair being in the second side of the article, the article being capable of having a manually-initiated, manually-propagated first tear in the first side of the article, and a manually-initiated and manually-propagated second tear in the second side of the article, the first tear and the second tear each being capable of being propagated in a machine direction from the pair of first and second tear initiators, with each tear being propagated in the machine direction through the heat seal and down the length of the article, or across the article, with each tear being capable of being manually propagated in the machine direction through and to an opposite article edge, so that upon using the multilayer film to make a packaged product by placing a product inside the article with the article being sealed closed around the product so that a package is formed, and thereafter shrinking the film around the product, the resulting package can be manually opened, and the product readily removed from the package, by manually initiating machine-direction tears from the first and second tear initiators, with the tears being manually propagated through the seal and to the opposite edge of the article; and the multilayer film has a total free shrink at 85° C. of at least 90% measured in accordance with ASTM D2732, and a Truburst strength of at least 8 psi/mil, measured in accordance with ASTM D3786.

PPP. The packaging article of sentence OOO, wherein the Truburst strength of the multilayer film is at least 9 psi/mil.

QQQ. The packaging article of sentence OOO, wherein the Truburst strength of the multilayer film is at least 10 psi/mil.

RRR. A process for making a multilayer, heat-shrinkable film that can be converted into a heat-shrinkable packaging article exhibiting post-shrink full-length tear in a machine direction, comprises: A) extruding a first film portion comprising a first layer which is a first outer layer and which is to serve as an inside layer of the packaging article and which is to serve as a heat-seal layer; B) quenching the first film portion; C) irradiating the first film portion so that a cross-linked polymer network is formed in the first film portion; D) extrusion-coating a second film portion onto the first film portion after the first film portion has been irradiated, the extrusion coating resulting in a laminate of the first and second film portions, the second film portion comprising (d)(i) a second layer which is a second outer layer and which comprises polyester, the second outer layer being to serve as an outside layer of the packaging article, and (d)(ii) a third layer which is an oxygen barrier layer comprising at least one member selected from the group consisting of polyvinylidene chloride, saponified ethylene/vinyl acetate copolymer, polyamide, polyester, polypropylene, ethylene homopolymer, polyethylene naphthalate, polytrimethylene terephthalate, liquid crystal polymer, and $O_2$-scavenger, the third layer being between the first layer and the second layer; E) reheating the laminate to a temperature of from 88° C. to 100° C.; F) biaxially orienting the laminate in the solid state, resulting in the multilayer, heat-shrinkable film, wherein the first film portion and/or the second film portion are provided with at least one layer comprising an incompatible polymer blend comprising at least one member selected from the group consisting of: (i) a blend of from 90 to 30 wt % ethylene homopolymer and/or ethylene/alpha-olefin copolymer with from 10 to 70 wt % ethylene/unsaturated ester copolymer having an unsaturated ester content of at least 10 wt %, (ii) a blend of ionomer resin with ethylene/unsaturated ester copolymer, and/or polybutylene, and/or propylene homopolymer and/or propylene copolymer, (iii) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, and anhydride-modified ethylene/alpha-olefin copolymer, (iv) a blend of from 10 to 75 wt ethylene/unsaturated ester copolymer with from 90 to 15 wt % polypropylene and/or propylene/ethylene copolymer, and/or polybutylene, and/or modified ethylene/alpha-olefin copolymer, and/or styrene homopolymer, and/or styrene/butadiene copolymer, (v) a blend of ethylene/norbornene copolymer with ethylene/unsaturated ester copolymer and/or polypropylene and/or polybutylene, (vi) a blend of from 90 to 15 wt % ethylene/alpha-olefin copolymer with from 10 to 75 wt % polypropylene and/or polybutylene and/or ethylene/norbornene, (vii) a blend of from 90 to 25 wt % homogeneous propylene homopolymer and/or homogeneous propylene copolymer with from 10 to 75 wt % homogeneous ethylene/alpha-olefin copolymer and/or ethylene/unsaturated ester copolymer, (viii) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer, (ix) a blend of polyamide with polystyrene and/or ethylene/alpha-olefin copolymer and/or ethylene/vinyl acetate copolymer and/or styrene/butadiene copolymer, and (x) a blend of polyamide 6 and polyamide 6I6T, with the incompatible polymer blend being in the laminate in an amount of at least 10 wt %, on a total film weight basis; and wherein the first film portion and/or the second film portion comprises a plastomer having peak melt point of less than 90° C., the plastomer being present in the multilayer, heat-shrinkable film in an amount of at least 3 wt % based on total film weight, and the multilayer film has a total free shrink at 85° C. of at least 90% measured in accordance with ASTM D2732, and an instrumented impact energy-to-break of at least 0.65 J/mil, measured in accordance with ASTM D3763.

SSS. The process of sentence SSS, wherein the first film portion is irradiated to a level of from 30 to 120 kGy.

TTT. The process of any one of previous sentences RRR and SSS, wherein the oxygen barrier layer comprises polyvinylidene chloride.

UUU. The process of any one of previous sentences RRR to TTT, wherein the first film portion is extruded from an annular extrusion die as a tubing and the second film portion is extruded over the tubing from an annular extrusion coating die, and the laminate is a tubular laminate.

VVV. The process of sentence UUU, wherein the biaxial orientation in the solid state is carried out by passing the tubular laminate over a trapped bubble while drawing the tubular laminate in the machine direction.

WWW. The process of any one of previous sentences RRR to TTT, wherein the first film portion is extruded from a first flat die as a sheet and the second film portion is extruded from a second flat die as a coating over the sheet and the laminate is a flat laminate.

XXX. The process of sentence WWW, wherein the biaxial orientation in the solid state is carried out by drawing the flat laminate in a tenter frame.

YYY. The process of any one of previous sentences RRR to XXX, wherein the laminate is biaxially oriented to a total orientation of from 10× to 16×.

What is claimed is:
1. A packaging article comprising a multilayer, heat-shrinkable film comprising a first film portion laminated to a second film portion, wherein:
  A) the first film portion comprises a first layer which is a first outer layer and which is an inside layer of the packaging article and which serves as a heat-seal layer, the first film portion comprising a cross-linked polymer network;
  B) the second film portion comprises (b)(i) a second layer which is a second outer layer and which comprises polyester, the second outer layer being an outside layer of the packaging article, and (b)(ii) a third layer which is an oxygen barrier layer comprising at least one member selected from the group consisting of polyvinylidene chloride, saponified ethylene/vinyl acetate copolymer, polyamide, polyester, polypropylene, ethylene homopolymer, polyethylene naphthalate, polytrimethylene terephthalate, liquid crystal polymer, and $O_2$-scavenger, the third layer being between the first layer and the second layer;
  C) the multilayer, heat-shrinkable film further comprises an ethylene/alpha-olefin plastomer having peak melt point of less than 90° C., the ethylene/alpha-olefin plastomer being present in the first film portion or the second film portion, the ethylene/alpha-olefin plastomer being present in the multilayer, heat-shrinkable film in an amount of at least 3 wt %, based on total film weight;
  D) the multilayer, heat-shrinkable film further comprises an incompatible polymer blend comprising at least one member selected from the group consisting of:
    (c)(i) a blend of from 90 to 30 wt % ethylene homopolymer and/or ethylene/alpha-olefin copolymer with from 10 to 70 wt % ethylene/unsaturated ester copolymer having an unsaturated ester content of at least 10 wt %,

(c)(ii) a blend of ionomer resin with ethylene/unsaturated ester copolymer, and/or polybutylene, and/or propylene homopolymer and/or propylene copolymer, (c)(iii) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, and anhydride-modified ethylene/alpha-olefin copolymer, (c)(iv) a blend of from 10 to 75 wt % ethylene/unsaturated ester copolymer with from 90 to 15 wt % polypropylene and/or propylene/ethylene copolymer, and/or polybutylene, and/or modified ethylene/alpha-olefin copolymer, and/or styrene homopolymer, and/or styrene/butadiene copolymer, (c)(v) a blend of ethylene/norbornene copolymer with ethylene/unsaturated ester copolymer and/or polypropylene and/or polybutylene, (c)(vi) a blend of from 90 to 15 wt % ethylene/alpha-olefin copolymer with from 10 to 75 wt % polypropylene and/or polybutylene and/or ethylene/norbornene, (c)(vii) a blend of from 90 to 25 wt % homogeneous propylene homopolymer and/or homogeneous propylene copolymer with from 10 to 75 wt % homogeneous ethylene/alpha-olefin copolymer and/or ethylene/unsaturated ester copolymer, (c)(viii) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer, (c)(ix) a blend of polyamide with polystyrene and/or ethylene/alpha-olefin copolymer and/or ethylene/vinyl acetate copolymer and/or styrene/butadiene copolymer, and (c)(x) a blend of polyamide 6 and polyamide 616T, with the incompatible polymer blend being in the first film portion or the second film portion, the incompatible polymer blend being present in the multilayer, heat-shrinkable film in an amount of at least 10 wt %, on a total film weight basis; and the inside layer of the packaging article is heat sealed to itself at a heat seal, the packaging article having a first side and a second side, the article having a skirt or header outward of the heat seal, the skirt or header comprising an article edge and a pair of tear initiators, each pair of tear initiators having a first tear initiator and a second tear initiator, the first tear initiator of the pair being in the first side of the article, and the second tear initiator of the pair being in the second side of the article, the article being capable of having a manually-initiated, manually-propagated first tear in the first side of the article, and a manually-initiated and manually-propagated second tear in the second side of the article, the first tear and the second tear each being capable of being propagated in a machine direction from the pair of first and second tear initiators, with each tear being propagated in the machine direction through the heat seal and down the length of the article, or across the article, with each tear being capable of being manually propagated in the machine direction through and to an opposite article edge, so that upon using the multilayer film to make a packaged product by placing a product inside the article with the article being sealed closed around the product so that a package is formed, and thereafter shrinking the film around the product, the resulting package can be manually opened, and the product readily removed from the package, by manually initiating machine-direction tears from the first and second tear initiators, with the tears being manually propagated through the seal and to the opposite edge of the article; and the multilayer film has a total free shrink at 85° C. of at least 90% measured in accordance with ASTM D2732, and an instrumented impact energy-to-break of at least 0.65 J/mil, measured in accordance with ASTM D3763.

2. The packaging article according to claim 1, wherein the ethylene/alpha-olefin plastomer is present in the seal layer.

3. The packaging article according to claim 1, wherein the film has a total thickness, before shrinking, of from 1.3 mils to 2 mils.

4. The packaging article according to claim 1, wherein the multilayer film further comprises a tie layer between oxygen barrier layer and the outside layer, the tie layer comprising at least one member selected from the group consisting of anhydride-functional polyolefin, anhydride-functional ethylene/unsaturated acid copolymer, anhydride-functional olefin/unsaturated ester copolymer, cyclic olefin copolymer, acrylate-based polymer, polyurethane, styrene-based polymer.

5. The packaging article according to claim 1, wherein the crosslinked polymer network is formed by irradiating the first film portion at a level of from 30 to 120 kGy.

6. The packaging article according to claim 1, wherein the multilayer film exhibits a post-shrink specular gloss at 60 degrees of at least 110 gloss units, measured in accordance with ASTM D2457.

7. The packaging article according to claim 1, wherein the multilayer film exhibits a total free shrink at 85° C. of at least 95%, measured in accordance with ASTM D2732.

8. The packaging article according to claim 1, wherein the ethylene/alpha-olefin plastomer has a peak melting point of from 50° C. to 85° C.

9. The packaging article according claim 1, wherein the ethylene/alpha-olefin plastomer has a density≤0.908 g/cc$^3$.

10. The packaging article according to claim 1, wherein the multilayer film has an instrumented impact energy-to-break of at least 0.70 J/mil measured in accordance with ASTM D3763, and the ethylene/alpha-olefin plastomer has a melt index of ≤ 1.1 grams/10 min, measured in accordance with ASTM D1238.

11. The packaging article according to claim 1, wherein the packaging article is a form-fill-seal packaging article having a fin seal running the length of the package and first and second end seals, with the form-fill-seal packaging article enclosing a product therein.

12. The packaging article according to claim 1, wherein the packaging article has a patch adhered thereto, the patch comprising a patch film.

13. The packaging article according to claim 1, wherein the crosslinked polymer network has been strained by solid state orientation.

14. The packaging article according to claim 1, wherein the multilayer film comprises polyamide in an amount of from 0.1 to 10 wt %, based on total film weight.

15. The packaging article according to claim 1, wherein the multilayer film does not comprise polyamide.

16. A packaging article comprising a multilayer, heat-shrinkable film comprising a first film portion laminated to a second film portion, wherein:

A) the first film portion comprises a first layer which is a first outer layer and which is an inside layer of the packaging article and which serves as a heat-seal layer, the first film portion comprising a cross-linked polymer network;

B) the second film portion comprises (b)(i) a second layer which is a second outer layer and which comprises polyester, the second outer layer being an outside layer of the packaging article, and (b)(ii) a third layer which is an oxygen barrier layer comprising at least one member selected from the group consisting of polyvinylidene chloride, saponified ethylene/vinyl acetate copolymer, polyamide, polyester, polypropylene, ethylene homopolymer, polyethylene naphthalate, polytrimethylene terephthalate, liquid crystal polymer, and $O_2$-scavenger, the third layer being between the first layer and the second layer;

C) the multilayer, heat-shrinkable film further comprises an ethylene/alpha-olefin plastomer having peak melt point of less than 90° C., the ethylene/alpha-olefin plastomer being present in the first film portion or the second film portion, the ethylene/alpha-olefin plastomer being present in the multilayer, heat-shrinkable film in an amount of at least 3 wt %, based on total film weight;

D) the multilayer, heat-shrinkable film further comprises an incompatible polymer blend comprising at least one member selected from the group consisting of:

(c)(i) a blend of from 90 to 30 weight percent ethylene homopolymer and/or ethylene/alpha-olefin copolymer with from 10 to 70 weight percent ethylene/unsaturated ester copolymer having an unsaturated ester content of at least 10 weight percent, (c)(ii) a blend of ionomer resin with ethylene/unsaturated ester copolymer, and/or polybutylene, and/or propylene homopolymer and/or propylene copolymer, (c)(iii) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, and anhydride-modified ethylene/alpha-olefin copolymer, (c)(iv) a blend of from 10 to 75 weight percent ethylene/unsaturated ester copolymer with from 90 to 15 weight percent polypropylene and/or propylene/ethylene copolymer, and/or polybutylene, and/or modified ethylene/alpha-olefin copolymer, and/or styrene homopolymer, and/or styrene/butadiene copolymer, (c)(v) a blend of ethylene/norbornene copolymer with ethylene/unsaturated ester copolymer and/or polypropylene and/or polybutylene, (c)(vi) a blend of from 90 to 15 weight percent ethylene/alpha-olefin copolymer with from 10 to 75 weight percent polypropylene and/or polybutylene and/or ethylene/norbornene, (c)(vii) a blend of from 90 to 25 weight percent homogeneous propylene homopolymer and/or homogeneous propylene copolymer with from 10 to 75 weight percent homogeneous ethylene/alpha-olefin copolymer and/or ethylene/unsaturated ester copolymer, (c)(viii) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer, (c)(ix) a blend of polyamide with polystyrene and/or ethylene/alpha-olefin copolymer and/or ethylene/vinyl acetate copolymer and/or styrene/butadiene copolymer, and (c)(x) a blend of polyamide 6 and polyamide 616T, with the incompatible polymer blend being in the first film portion or the second film portion, the incompatible polymer blend being present in the multilayer, heat-shrinkable film in an amount of at least 10 wt %, on a total film weight basis; and the inside layer of the packaging article is heat sealed to itself at a heat seal, the packaging article having a first side and a second side, the article having a skirt or header outward of the heat seal, the skirt or header comprising an article edge and a pair of tear initiators, each pair of tear initiators having a first tear initiator and a second tear initiator, the first tear initiator of the pair being in the first side of the article, and the second tear initiator of the pair being in the second side of the article, the article being capable of having a manually-initiated, manually-propagated first tear in the first side of the article, and a manually-initiated and manually-propagated second tear in the second side of the article, the first tear and the second tear each being capable of being propagated in a machine direction from the pair of first and second tear initiators, with each tear being propagated in the machine direction through the heat seal and down the length of the article, or across the article, with each tear being capable of being manually propagated in the machine direction through and to an opposite article edge, so that upon using the multilayer film to make a packaged product by placing a product inside the article with the article being sealed closed around the product so that a package is formed, and thereafter shrinking the film around the product, the resulting package can be manually opened, and the product readily removed from the package, by manually initiating machine-direction tears from the first and second tear initiators, with the tears being manually propagated through the seal and to the opposite edge of the article; and the multilayer film has a total free shrink at 85° C. of at least 90% measured in accordance with ASTM D2732, and an instrumented impact peak load strength of at least 66 Newtons/mil, measured in accordance with ASTM D3763.

17. The packaging article according to claim 16, wherein the ethylene/alpha-olefin plastomer is present in the seal layer.

18. The packaging article according to claim 16, wherein the crosslinked polymer network has been strained by solid state orientation.

19. A packaging article comprising a multilayer, heat-shrinkable film comprising a first film portion laminated to a second film portion, wherein:

A) the first film portion comprises a first layer which is a first outer layer and which is an inside layer of the packaging article and which serves as a heat-seal layer, the first film portion comprising a cross-linked polymer network;

B) the second film portion comprises (b)(i) a second layer which is a second outer layer and which comprises polyester, the second outer layer being an outside layer of the packaging article, and (b)(ii) a third layer which is an oxygen barrier layer comprising at least one member selected from the group consisting of polyvinylidene chloride, saponified ethylene/vinyl acetate copolymer, polyamide, polyester, polypropylene, ethylene homopolymer, polyethylene naphthalate, polytrimethylene terephthalate, liquid crystal polymer, and $O_2$-scavenger, the third layer being between the first layer and the second layer;

C) the multilayer, heat-shrinkable film further comprises an ethylene/alpha-olefin plastomer having peak melt point of less than 90° C., the ethylene/alpha-olefin plastomer being present in the first film portion or the second film portion, the ethylene/alpha-olefin plastomer being present in the multilayer, heat-shrinkable film in an amount of at least 3 wt %, based on total film weight;

D) the multilayer, heat-shrinkable film further comprises an incompatible polymer blend comprising at least one member selected from the group consisting of:
- (c)(i) a blend of from 90 to 30 weight percent ethylene homopolymer and/or ethylene/alpha-olefin copolymer with from 10 to 70 weight percent ethylene/unsaturated ester copolymer having an unsaturated ester content of at least 10 weight percent,
- (c)(ii) a blend of ionomer resin with ethylene/unsaturated ester copolymer, and/or polybutylene, and/or propylene homopolymer and/or propylene copolymer,
- (c)(iii) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, and anhydride-modified ethylene/alpha-olefin copolymer,
- (c)(iv) a blend of from 10 to 75 weight percent ethylene/unsaturated ester copolymer with from 90 to 15 weight percent polypropylene and/or propylene/ethylene copolymer, and/or polybutylene, and/or modified ethylene/alpha-olefin copolymer, and/or styrene homopolymer, and/or styrene/butadiene copolymer,
- (c)(v) a blend of ethylene/norbornene copolymer with ethylene/unsaturated ester copolymer and/or polypropylene and/or polybutylene,
- (c)(vi) a blend of from 90 to 15 weight percent ethylene/alpha-olefin copolymer with from 10 to 75 weight percent polypropylene and/or polybutylene and/or ethylene/norbornene,
- (c)(vii) a blend of from 90 to 25 weight percent homogeneous propylene homopolymer and/or homogeneous propylene copolymer with from 10 to 75 weight percent homogeneous ethylene/alpha-olefin copolymer and/or ethylene/unsaturated ester copolymer,
- (c)(viii) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer,
- (c)(ix) a blend of polyamide with polystyrene and/or ethylene/alpha-olefin copolymer and/or ethylene/vinyl acetate copolymer and/or styrene/butadiene copolymer, and
- (c)(x) a blend of polyamide 6 and polyamide 616T, with the incompatible polymer blend being in the first film portion or the second film portion, the incompatible polymer blend being present in the multilayer, heat-shrinkable film in an amount of at least 10 wt %, on a total film weight basis; and the inside layer of the packaging article is heat sealed to itself at a heat seal, the packaging article having a first side and a second side, the article having a skirt or header outward of the heat seal, the skirt or header comprising an article edge and a pair of tear initiators, each pair of tear initiators having a first tear initiator and a second tear initiator, the first tear initiator of the pair being in the first side of the article, and the second tear initiator of the pair being in the second side of the article, the article being capable of having a manually-initiated, manually-propagated first tear in the first side of the article, and a manually-initiated and manually-propagated second tear in the second side of the article, the first tear and the second tear each being capable of being propagated in a machine direction from the pair of first and second tear initiators, with each tear being propagated in the machine direction through the heat seal and down the length of the article, or across the article, with each tear being capable of being manually propagated in the machine direction through and to an opposite article edge, so that upon using the multilayer film to make a packaged product by placing a product inside the article with the article being sealed closed around the product so that a package is formed, and thereafter shrinking the film around the product, the resulting package can be manually opened, and the product readily removed from the package, by manually initiating machine-direction tears from the first and second tear initiators, with the tears being manually propagated through the seal and to the opposite edge of the article; and the multilayer film has a total free shrink at 85° C. of at least 90% measured in accordance with ASTM D2732, and Truburst strength of at least 8 psi/mil, measured in accordance with ASTM D3786.

20. The packaging article according to claim 19, wherein the ethylene/alpha-olefin plastomer is present in the seal layer.

* * * * *